(12) United States Patent
Rosenfeld et al.

(10) Patent No.: US 10,181,142 B2
(45) Date of Patent: Jan. 15, 2019

(54) REAL-TIME INTERNET CAPABLE DEVICE INFORMATION INTERCHANGE FOR COORDINATED QUEUING AT LOCATIONS

(71) Applicant: Jane Technologies, Inc., Santa Cruz, CA (US)

(72) Inventors: Socrates Munaf Rosenfeld, Santa Cruz, CA (US); Abraham Munaf Rosenfeld, Boston, MA (US); Benjamin Aaron Green, Newton, MA (US); Scott Robert Tracy-Inglis, Houston, TX (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

(21) Appl. No.: 15/790,865

(22) Filed: Oct. 23, 2017

(65) Prior Publication Data

US 2018/0047078 A1 Feb. 15, 2018

Related U.S. Application Data

(63) Continuation of application No. 15/342,557, filed on Nov. 3, 2016, now Pat. No. 9,836,772.

(60) Provisional application No. 62/344,337, filed on Jun. 1, 2016.

(51) Int. Cl.
*G06Q 30/06* (2012.01)
*G06Q 10/06* (2012.01)
*G06Q 10/08* (2012.01)

(52) U.S. Cl.
CPC ... *G06Q 30/0607* (2013.01); *G06Q 10/06316* (2013.01); *G06Q 10/083* (2013.01); *G06Q 30/0635* (2013.01)

(58) Field of Classification Search
CPC .................................................... G06Q 30/06
See application file for complete search history.

(56) References Cited

U.S. PATENT DOCUMENTS

| | | | |
|---|---|---|---|
| 5,220,501 A | 6/1993 | Lawlor | |
| 6,202,054 B1 | 3/2001 | Lawlor | |
| 6,519,571 B1 | 2/2003 | Guheen | |
| 9,836,772 B1 | 12/2017 | Rosenfeld et al. | |
| 2001/0051905 A1* | 12/2001 | Lucas | G06Q 10/06 705/29 |
| 2002/0069093 A1* | 6/2002 | Stanfield | G06Q 10/02 705/5 |
| 2002/0138358 A1 | 9/2002 | Scheer | |
| 2007/0124216 A1* | 5/2007 | Lucas | G06Q 10/087 705/26.1 |
| 2010/0070376 A1* | 3/2010 | Proud | G06O 20/20 705/21 |
| 2010/0286993 A1 | 11/2010 | Lovelace | |

(Continued)

OTHER PUBLICATIONS

GrubHub: http://www.grubhub.com/, 4 pages, downloaded Nov. 3, 2016.

(Continued)

*Primary Examiner* — Kurtis Gills
(74) *Attorney, Agent, or Firm* — Fish & Richardson P.C.

(57) ABSTRACT

Among other things, a central server maintains information representative of requests communicated through the Internet from devices at request locations. Each of the requests represents a proposed reservation for services to be managed by devices at delivery locations.

9 Claims, 106 Drawing Sheets

(56) References Cited

U.S. PATENT DOCUMENTS

Figures 1, 2, 3:
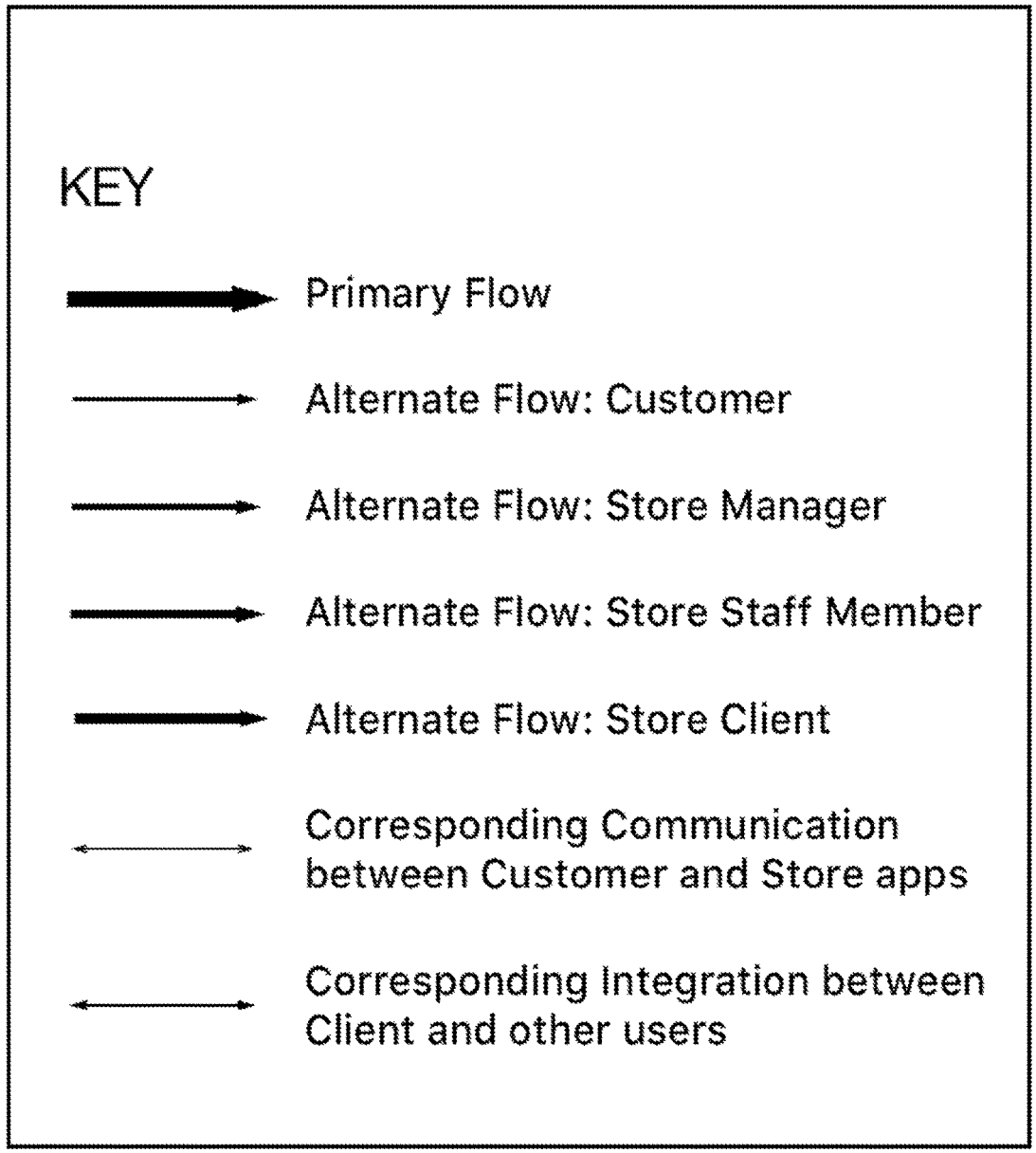

2011/0208852 A1    8/2011  Looney
2013/0290041 A1*  10/2013  Harley .................. G06Q 10/02
                                                                    705/5
2016/0232515 A1    8/2016  Jhas
2016/0343057 A1*  11/2016  Andon .................. G06Q 10/02

OTHER PUBLICATIONS

BestBuy: http://www.bestbuy.com/, 3 pages, downloaded Nov. 3, 2016.
Apple: http://www.apple.com/, 17 pages, downloaded Nov. 3, 2016.
IKEA: http://www.ikea.com/us/en/, 4 pages, downloaded Nov. 3, 2016.
KGS Buildings: http://www.kgsbuildings.com, 5 pages, downloaded Nov. 3, 2016.
Transaction history U.S. Appl. No. 62/344,337, filed Jun. 1, 2016.
Transaction history, U.S. Appl. No. 15/342,557, filed Nov. 3, 2016 and allowed claims.
Baker: http://info.trybaker.com/baker-greenbits-integrat, Baker Greenbits Integration, 3 pages, downloaded Jan. 18, 2018.
Baker: https://help.greenbits.com/hc/en-us/articles/115001272351-Menu-Feed-Setup-for-Baker, Menu Feed Setup for Baker—Help Center, 6 pages, downloaded Jan. 18, 2018.
Shopify: http://www.skuiq.com/shopify-retail-operations-software/, Shopify Integration—Lightspeed, Clover, Vend, Erply, Square, 3 pages, downloaded Jan. 18, 2018.
Shopify: https://hikeup.com/us/shopify/, Hike + Shopify | Connecting POS & eCommerce Platforms Seamlessly, 4 pages, downloaded Jan. 18, 2018.

* cited by examiner

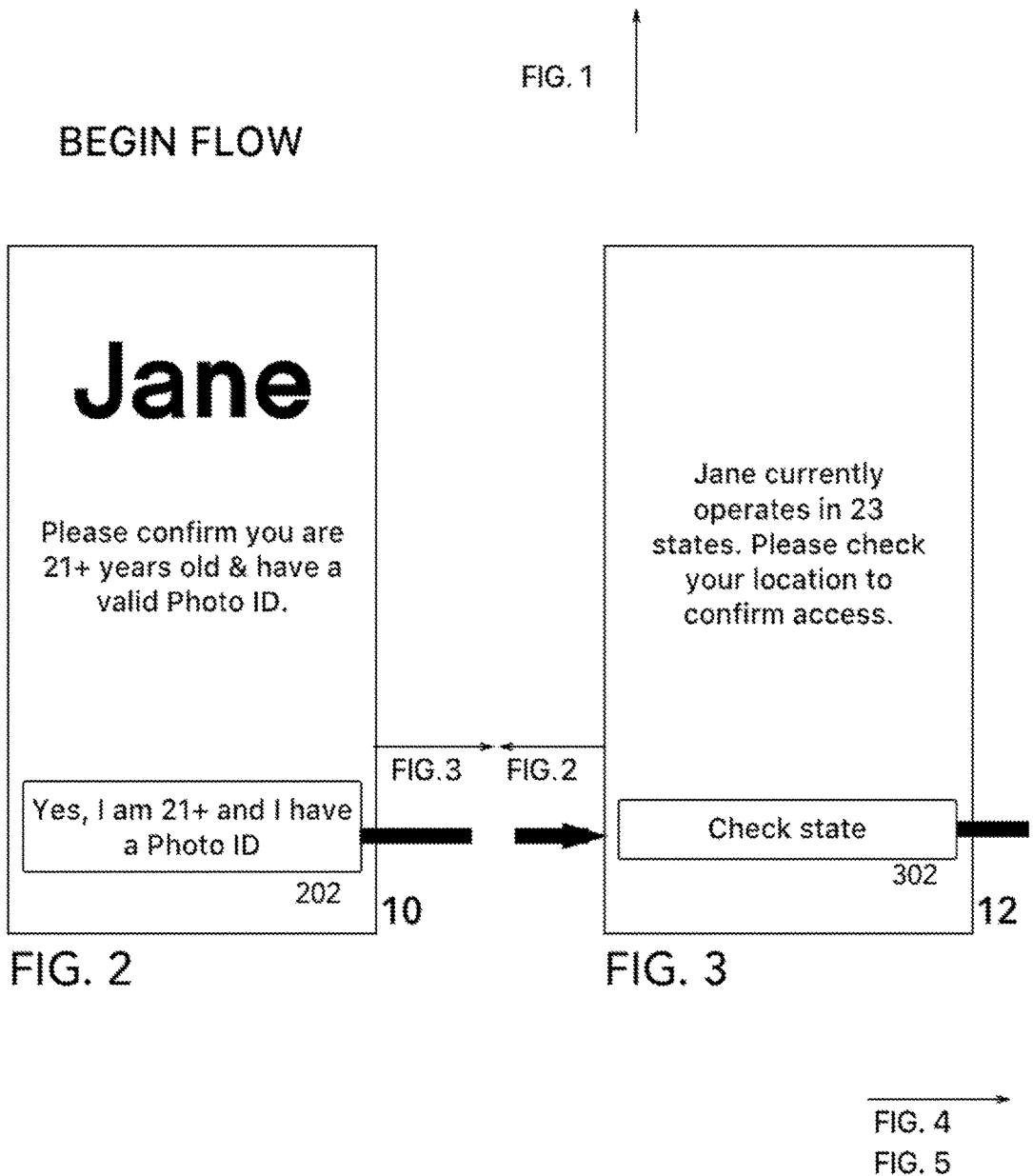

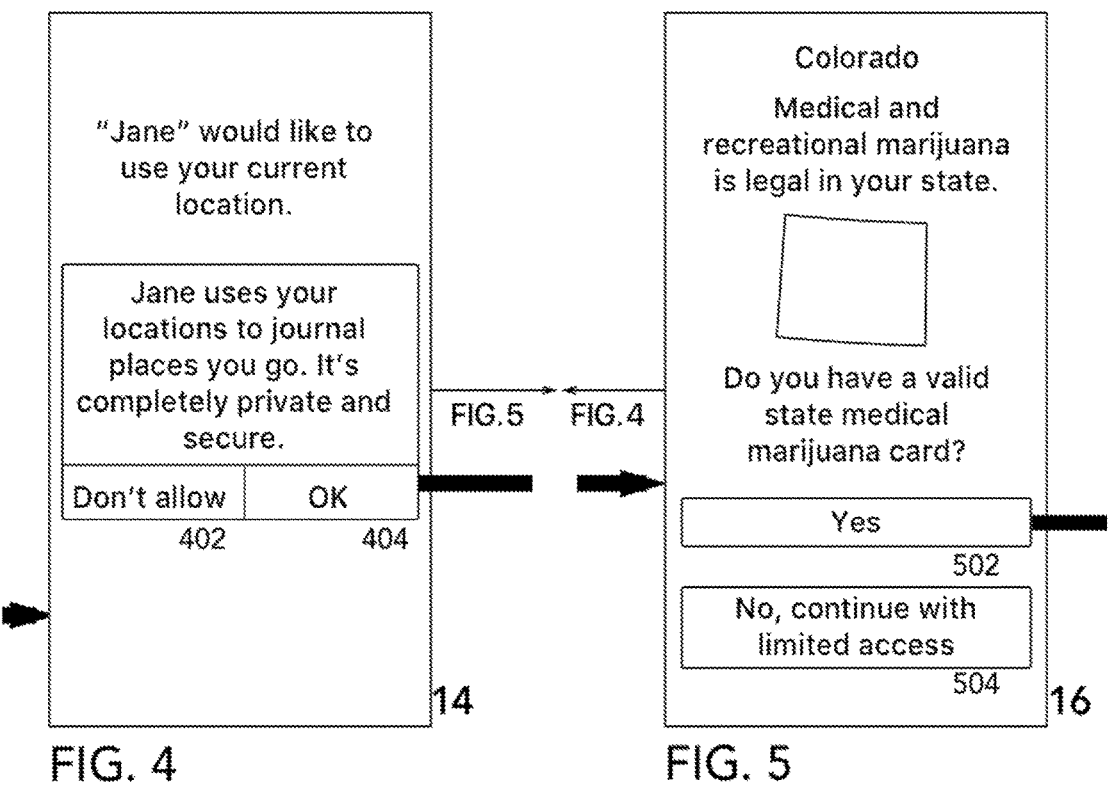

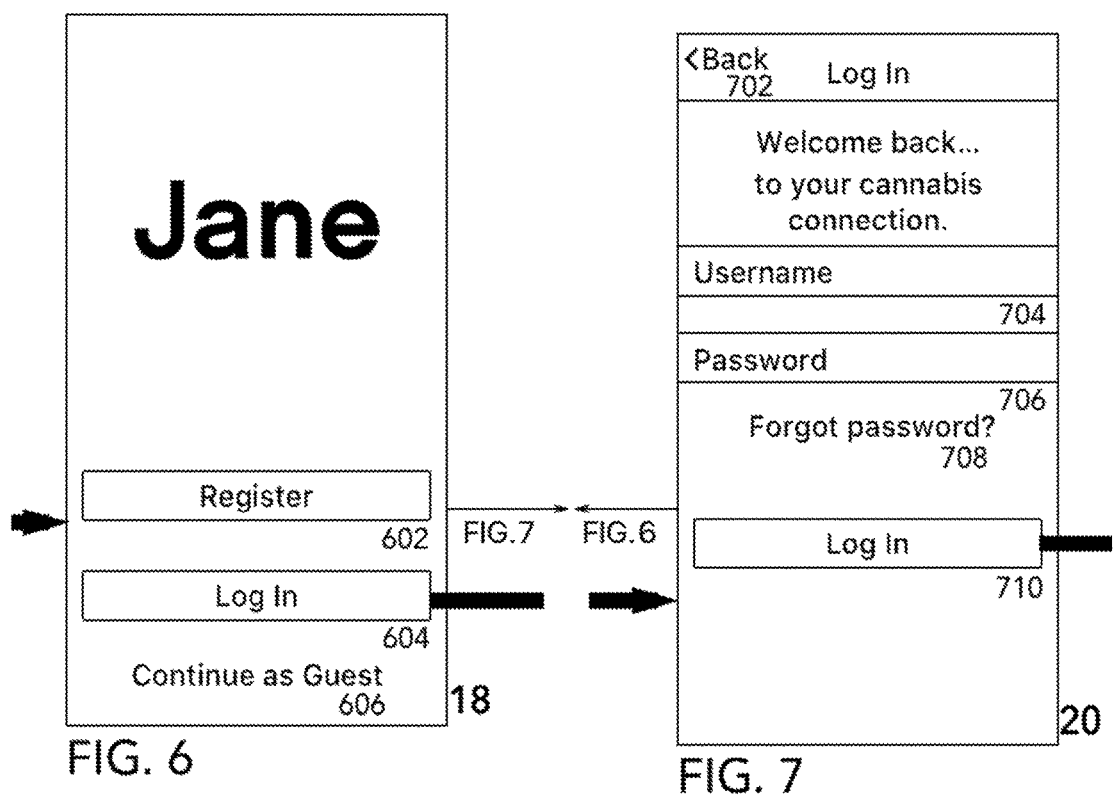

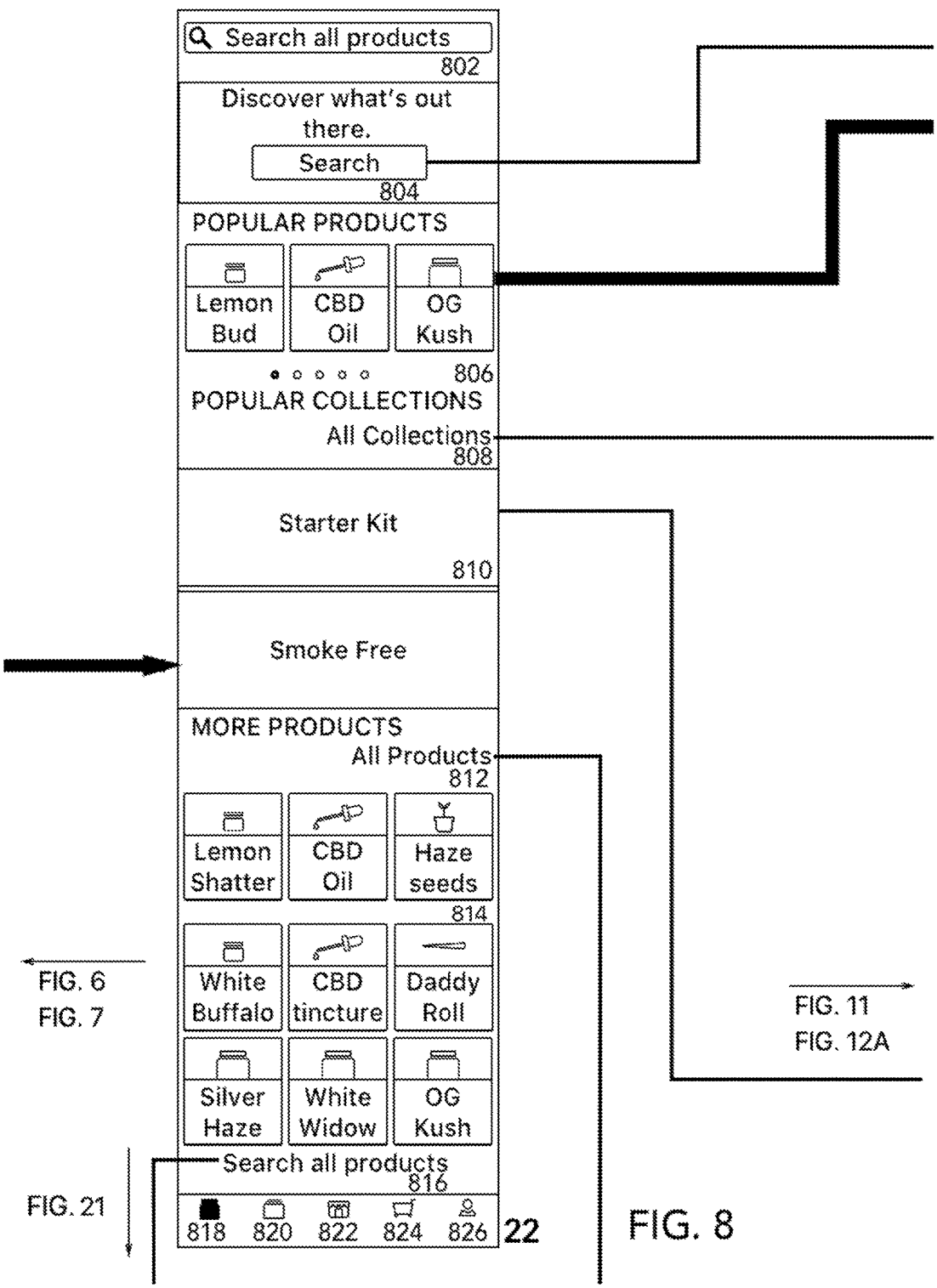

FIG. 101

FIG. 19
FIG. 20

| Cancel | Filters | Apply |
| 1602 | | 1604 |

Show Favorites only ⊙ 1606

SERVICES

Pickup ⊙ 1608

Delivery ⊙ 1610

Medical ⊙ 1612

Recreational ⊙ 1614

Takes Credit Cards ⊙ 1616

Wheelchair Access ⊙ 1618

Clear all filters 1620

Price 1702

Proximity 1704

Popularity 1706

Cancel 1708

‹ Close  1902  Upload Photo ID

Upload a valid Government Photo ID to make a reservation

One-time upload: this will help Stores validate your identity.

You haven't uploaded a Photo ID

[⌾ Upload]
1904

🔒 Jane keeps personal information safe, secure, and anonymous.

‹ Close  2002  Upload MMJ Card

Upload a valid State Medical Marijuana Card to make a medical reservation.

One-time upload: this will help Stores validate your identity.

You haven't uploaded front of MMJ Card

[⌾ Upload]
2004

You haven't uploaded back of MMJ Card

[⌾ Upload]
2006

🔒 Jane keeps personal information safe, secure, and anonymous.

46

FIG. 34 ↓↑

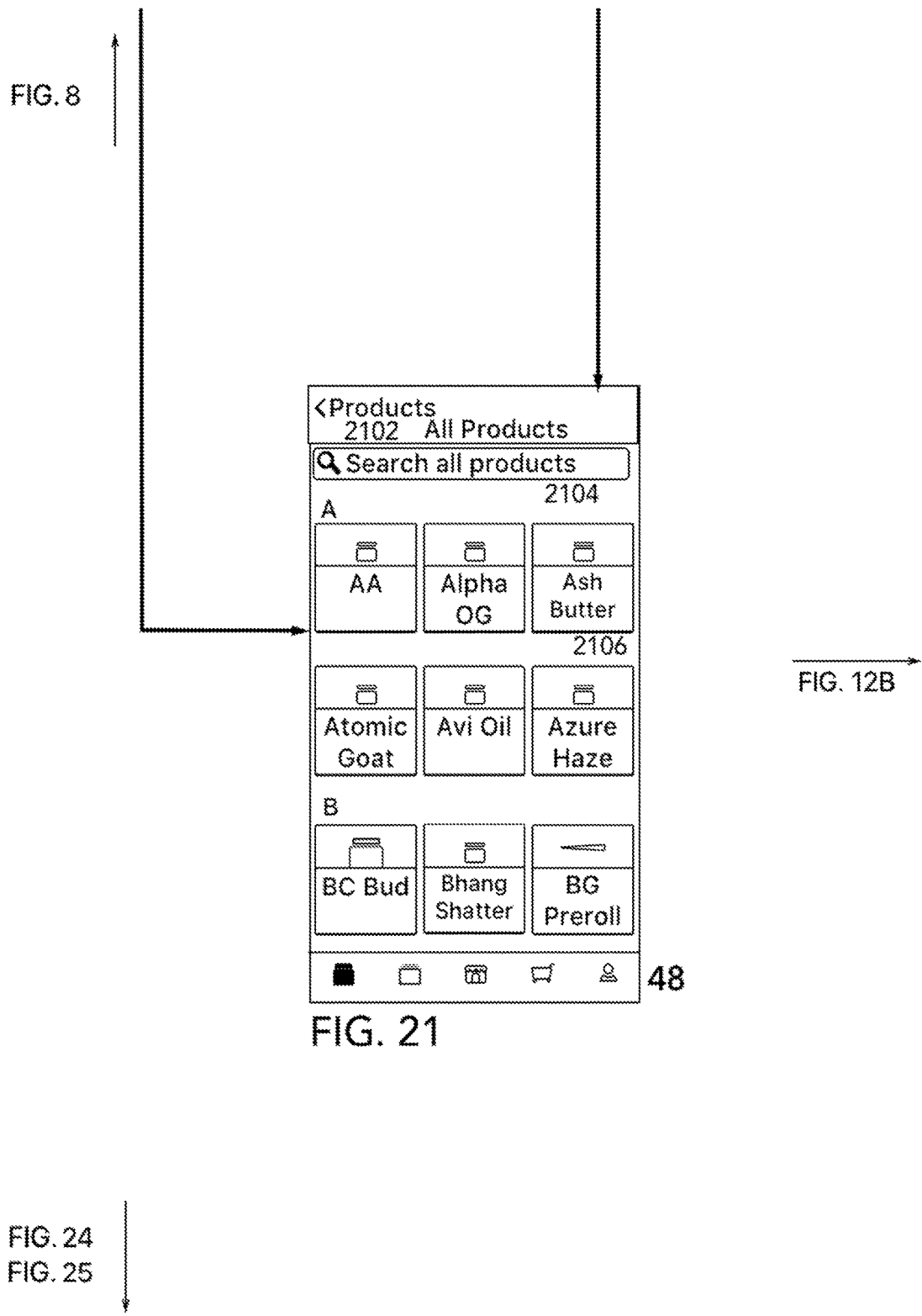

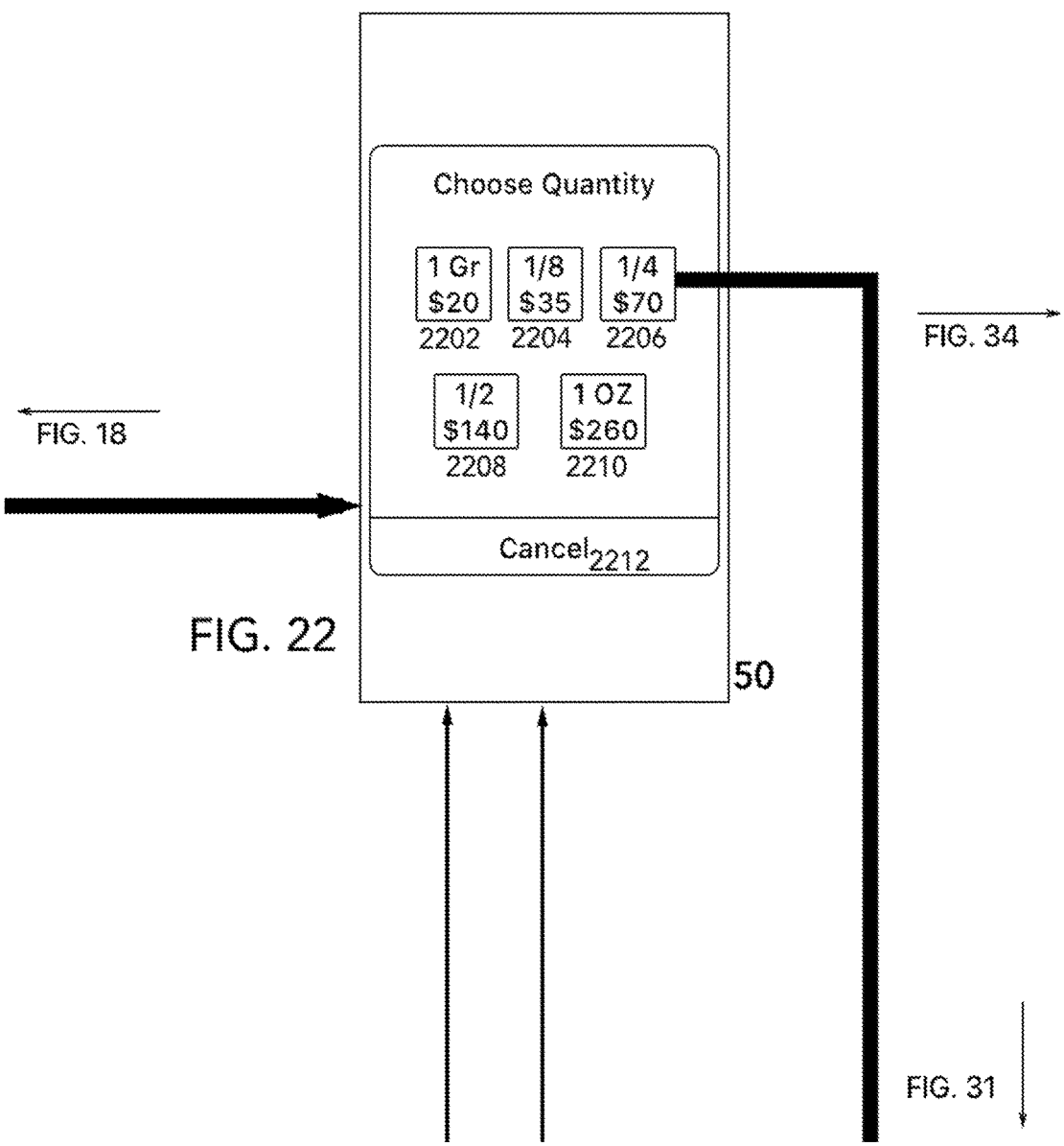

| < Checkout | Save |
| 2302 Address | 2304 |

Street  12 East Street
                    2306

City    Denver
                    2308

State   Colorado
                    2310

ZIP     Enter ZIP
                    2312

Done
2314

Arkensas
California
Colorado 2316
Connecticut
Delaware
                    52

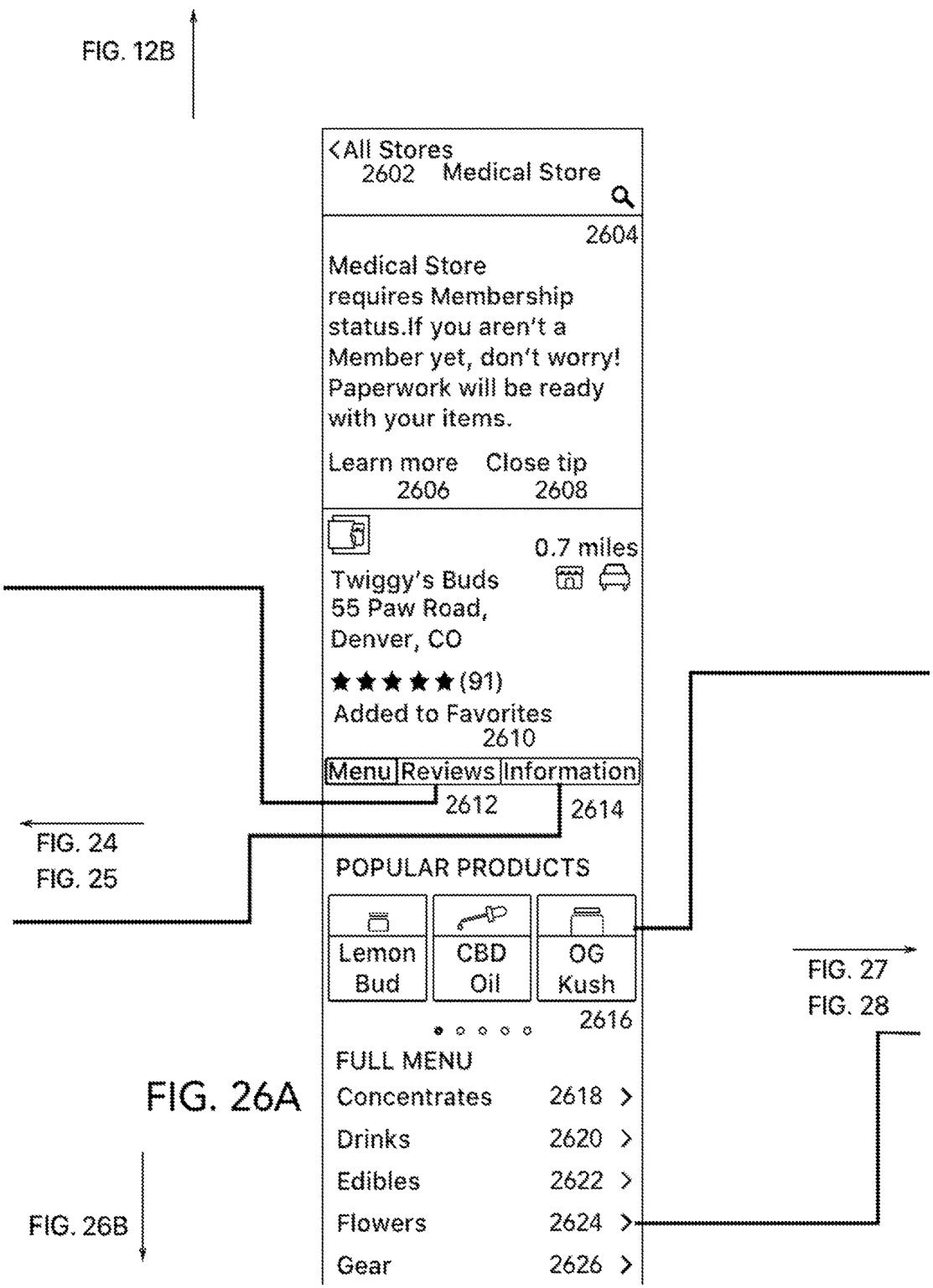

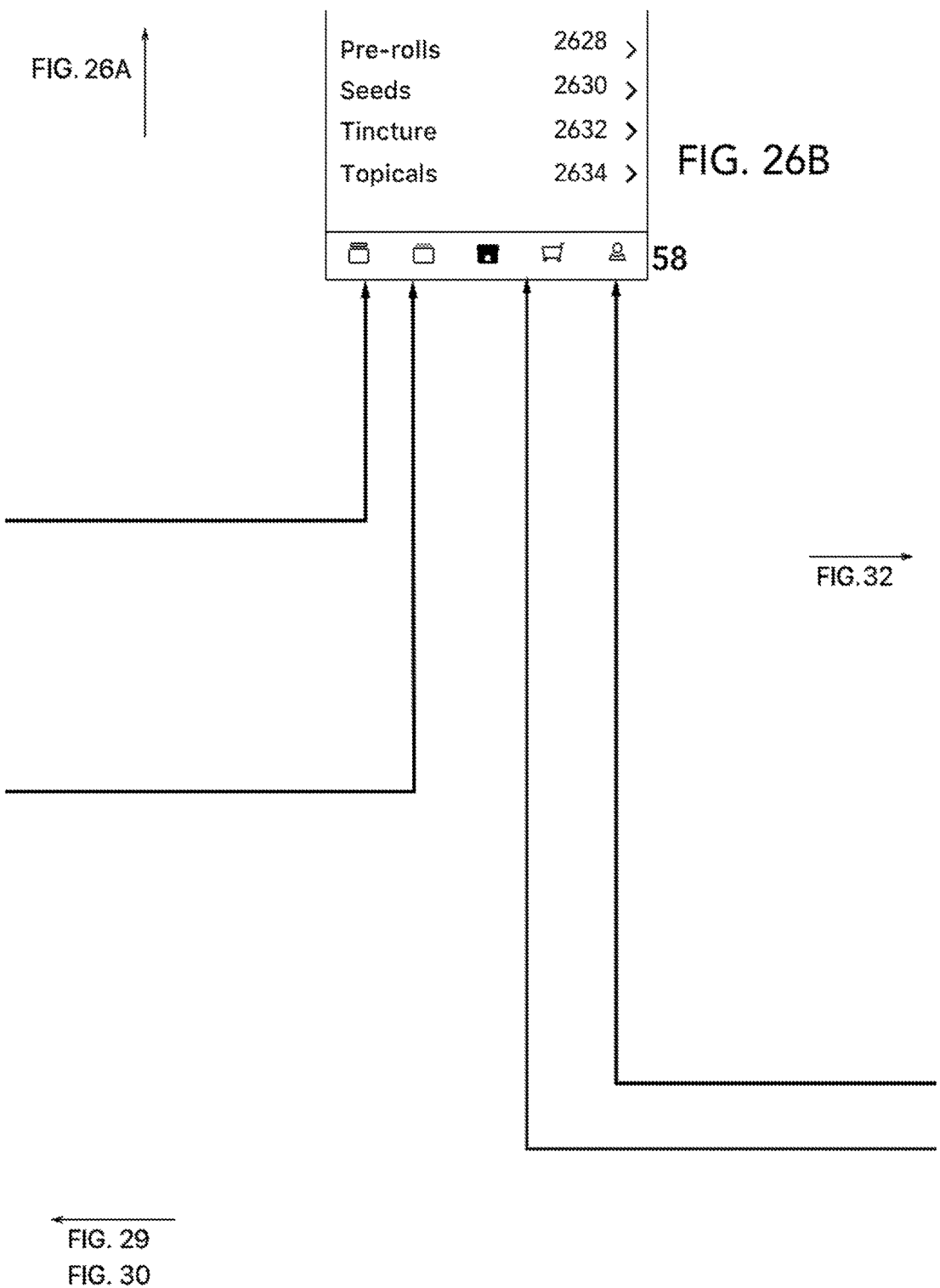

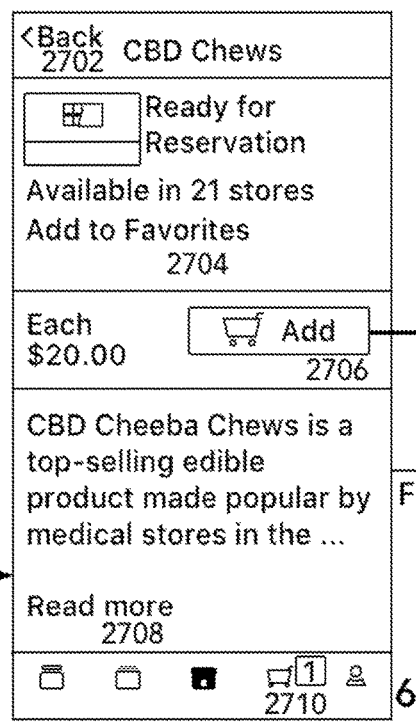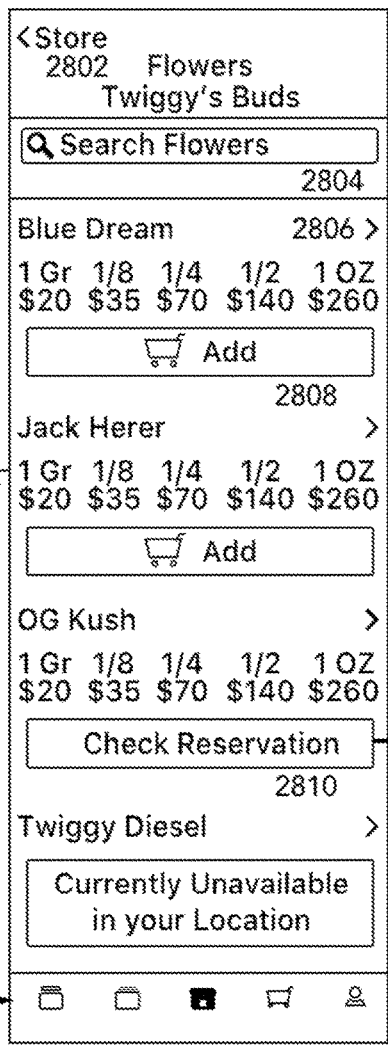

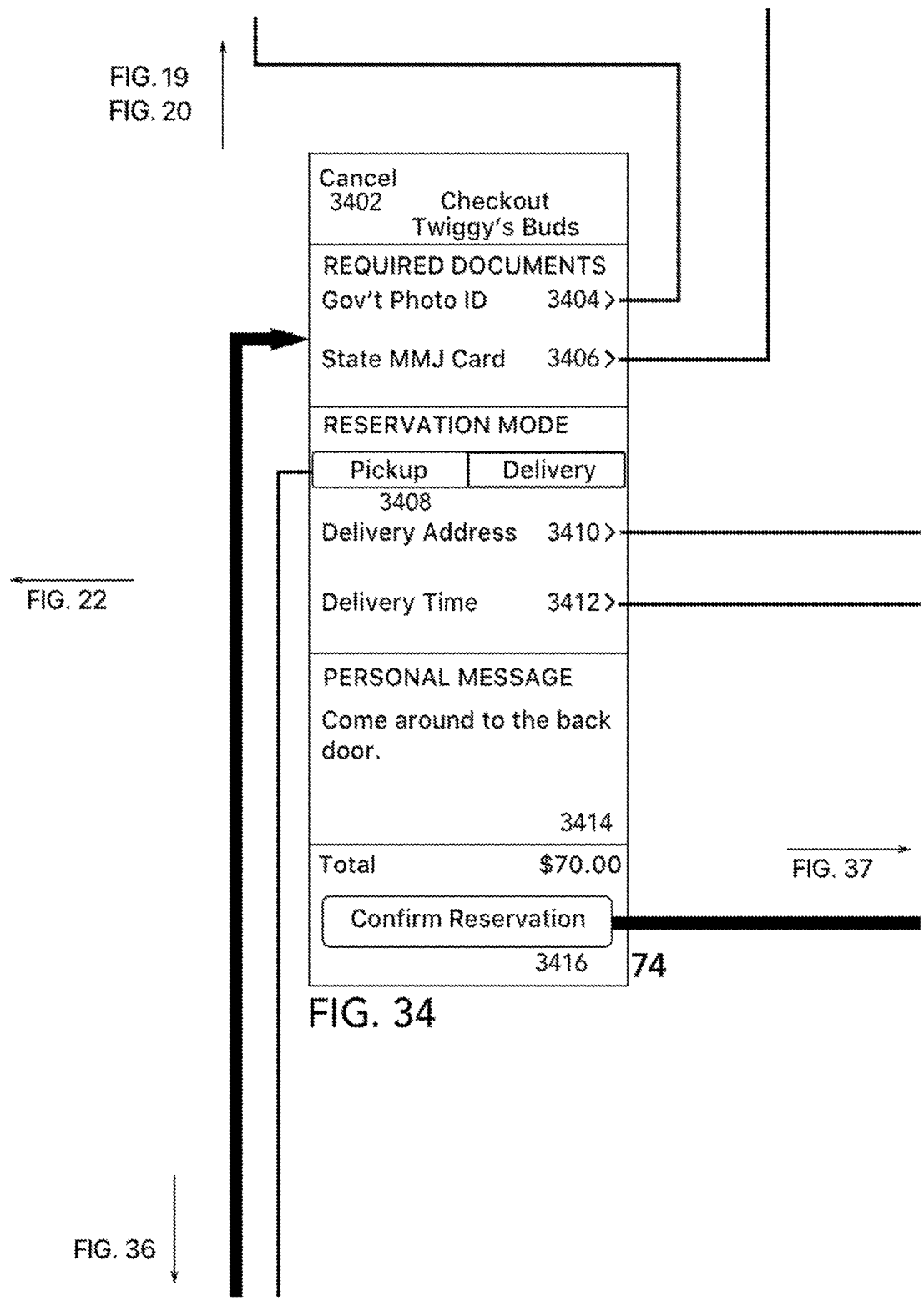

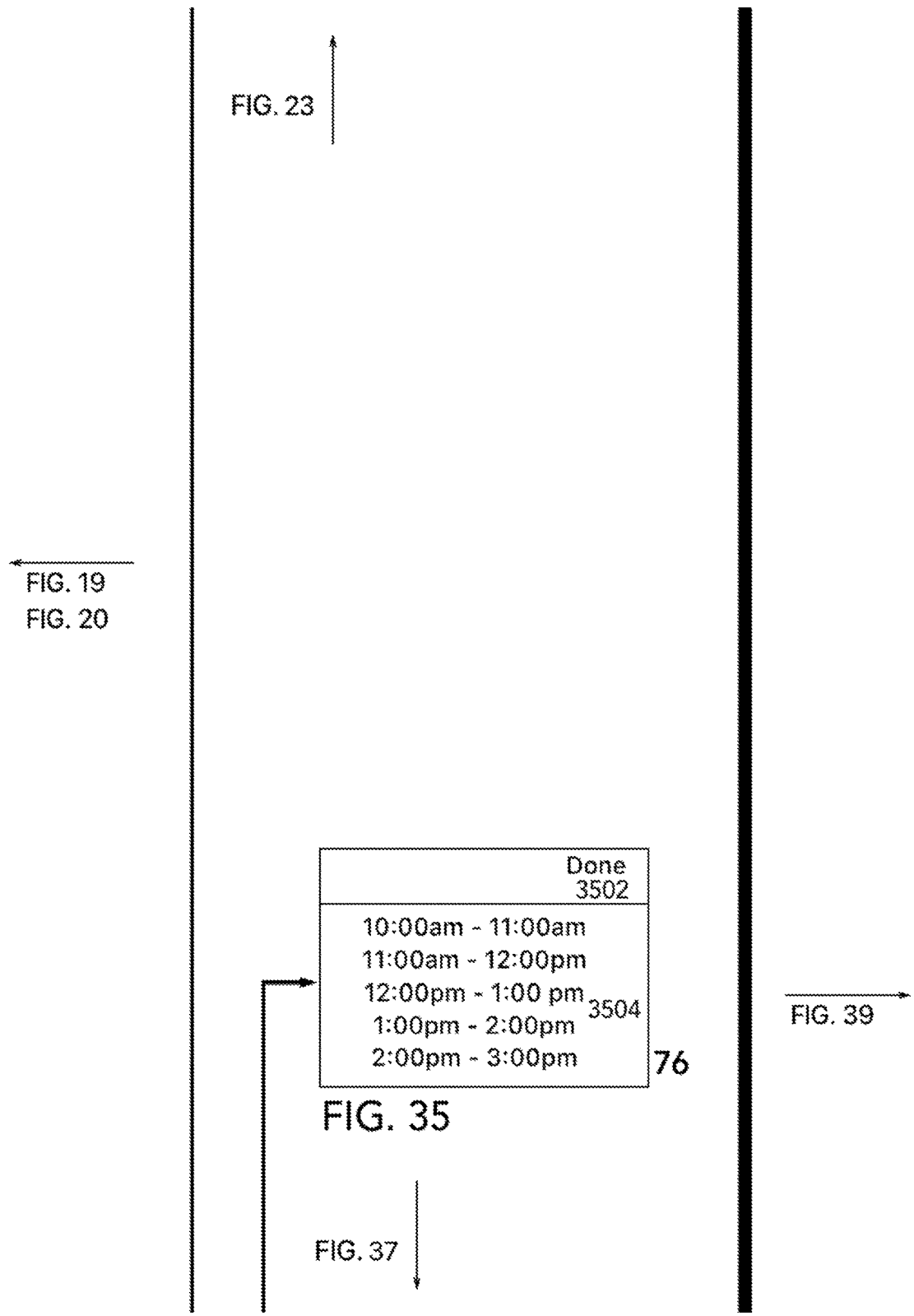

FIG. 35

CONTINUED ON
MANAGER PAGE

FIG. 34

| Your Profile | Settings 3702 |
|---|---|
| MaryLover15 MaryLover15@gmail.com | |
| PERSONAL INFO | |
| Identification | 3704 > |
| Contact Info | 3706 > |
| Memberships & Favorites | 3708 > |
| RESERVATIONS | |
| ● Twiggy's Buds April 20, 2016 | 3710 > |
| ○ Organic Grows April 10, 2016 | 3712 > |

<Profile Reservation
4202
| Tracking | Receipt | Contact |
| 4204 | | 4206 |
| Total | | $70.00 |

OG Kush
Quantity: 1/4 OZ
$70.00

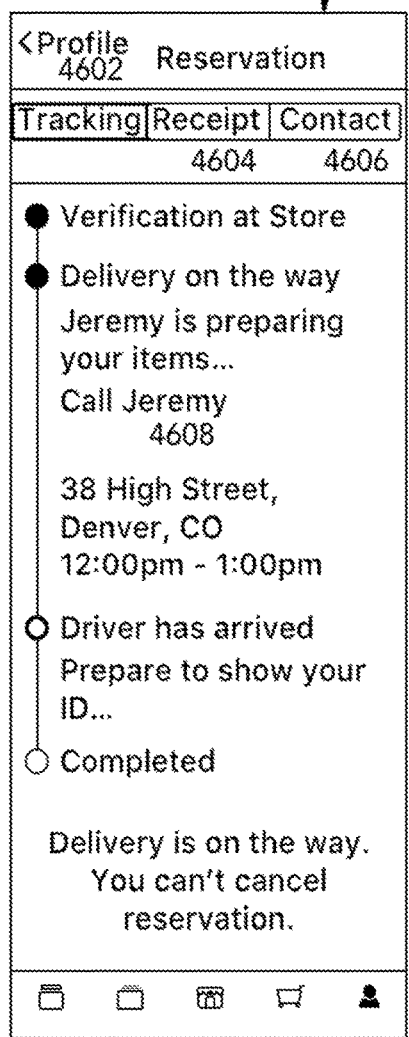
FIG. 46
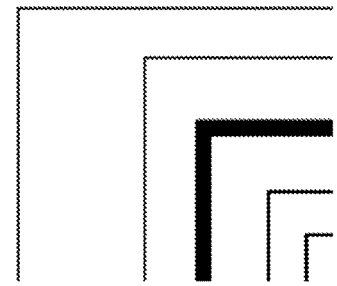

END FLOW

FIG. 52 →

```
<Back    Learn more
 4902
      Using Jane as a...
                              FIG.50    FIG.49
Manager
Review and assign
customers incoming
reservations to your Staff
Members.

Staff Member
Receive requests from
your Manager, view
details, update statuses,
and complete customers
reservations.
                                                    104
```

FIG. 49

```
           Log In

Welcome to your cannabis
      connection.
Learn more
  5002
Name or email
                    5004
Password
                    5006
   Forgot password?
        5008

┌─────────────┐
      │    Log In   │
      └─────────────┘
         5010              106
```

FIG. 50

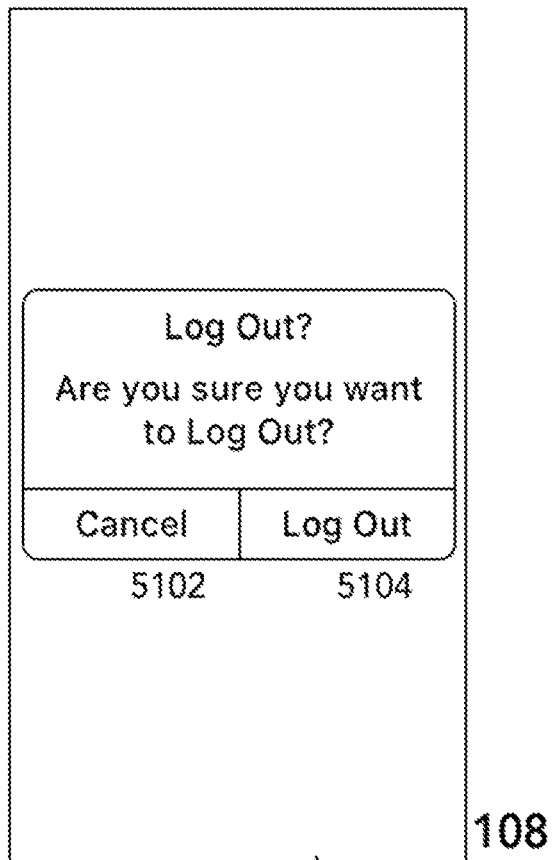

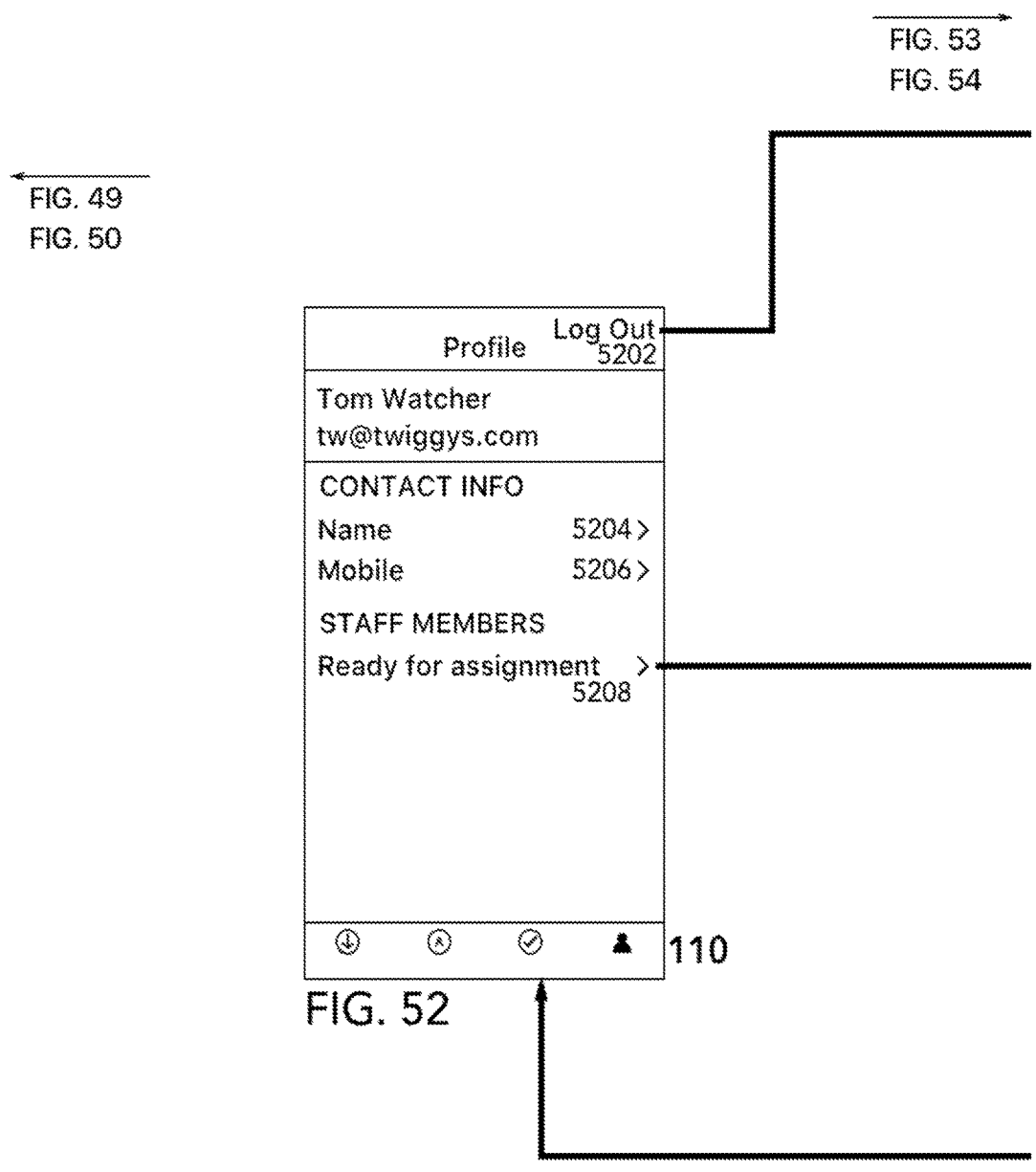

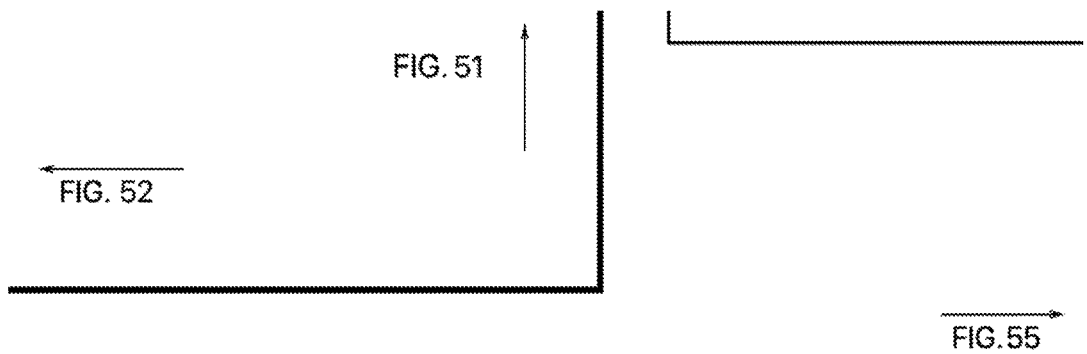

FIG.53
FIG.54

Completed Reservations

A6
⏲ 12:00pm - 1:00pm
🚗 38 High Street, Denver, CO
👤 MaryLover15
★★★★★     12:30pm
5502

A4
⏲ 12:00pm - 1:00pm
🚗 77 Lake Drive, Denver, CO
👤 BurtZee
★★★★★     12:15pm
5504

A3
⏲ 12:00pm - 1:00pm
🚗 8 Emerald Road, Denver, CO
👤 Kathy66
★★★★★     12:10pm

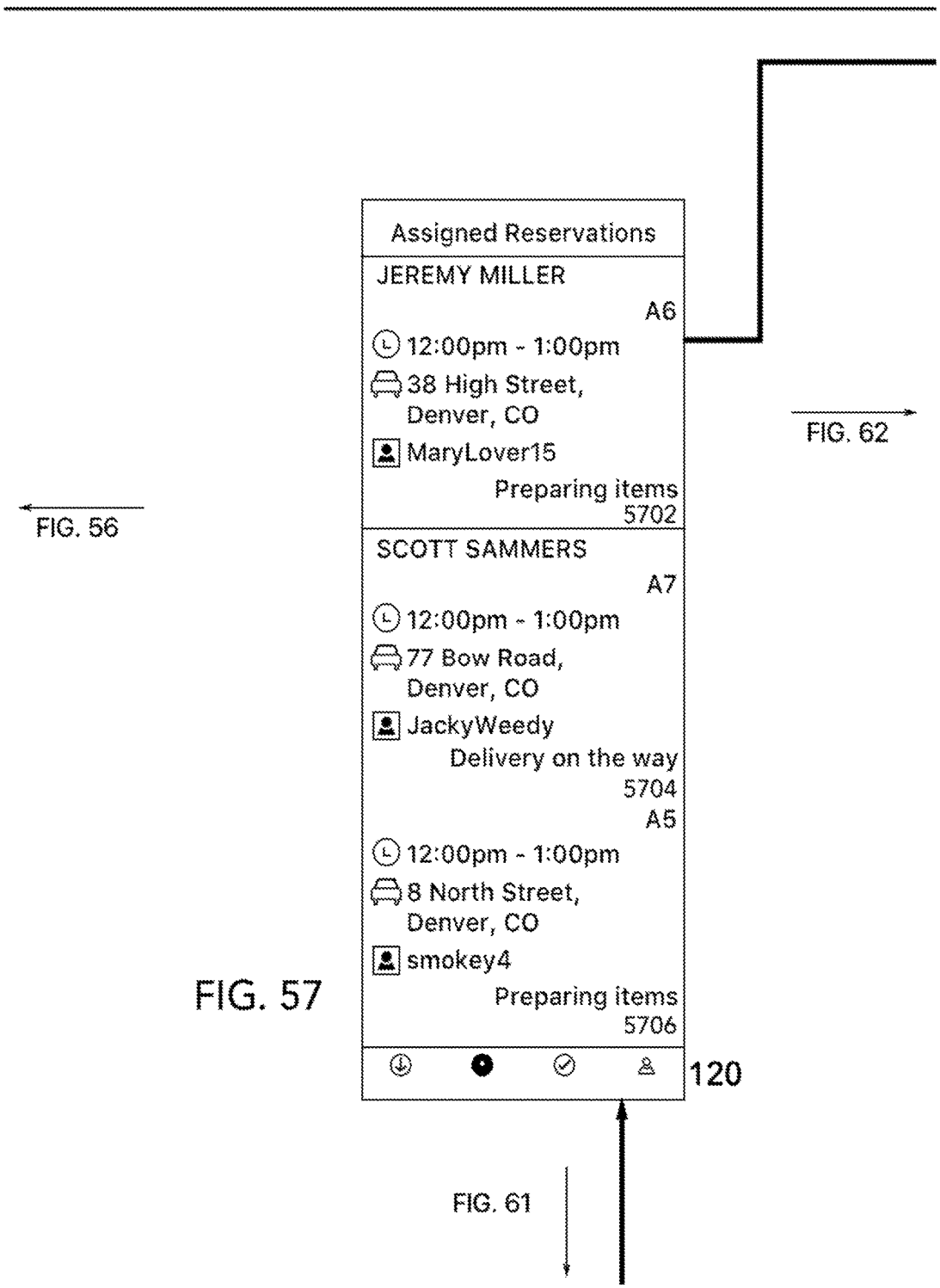

FIG. 55

STORE MANAGER PAGES

Incoming Reservations

A7
12:00pm - 1:00pm
77 Bow Road, Denver, CO
JackyWeedy    0 min

A6
12:00pm - 1:00pm
38 High Street, Denver, CO
MaryLover15    1 min
5802

A5
12:00pm - 1:0pm
8 North Street, Denver, CO
smokey4    5 min
5804

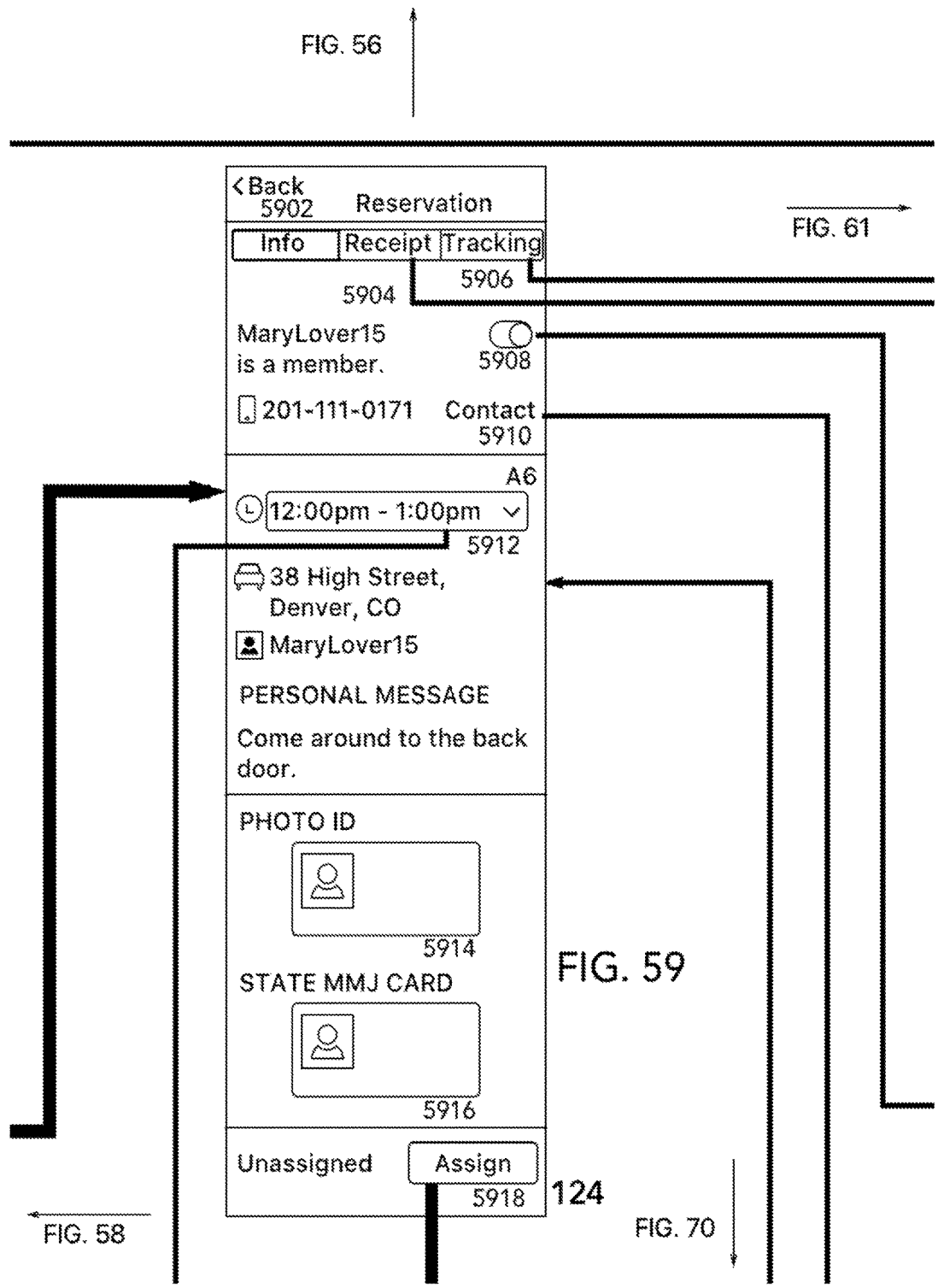

FIG. 59                                              FIG. 60

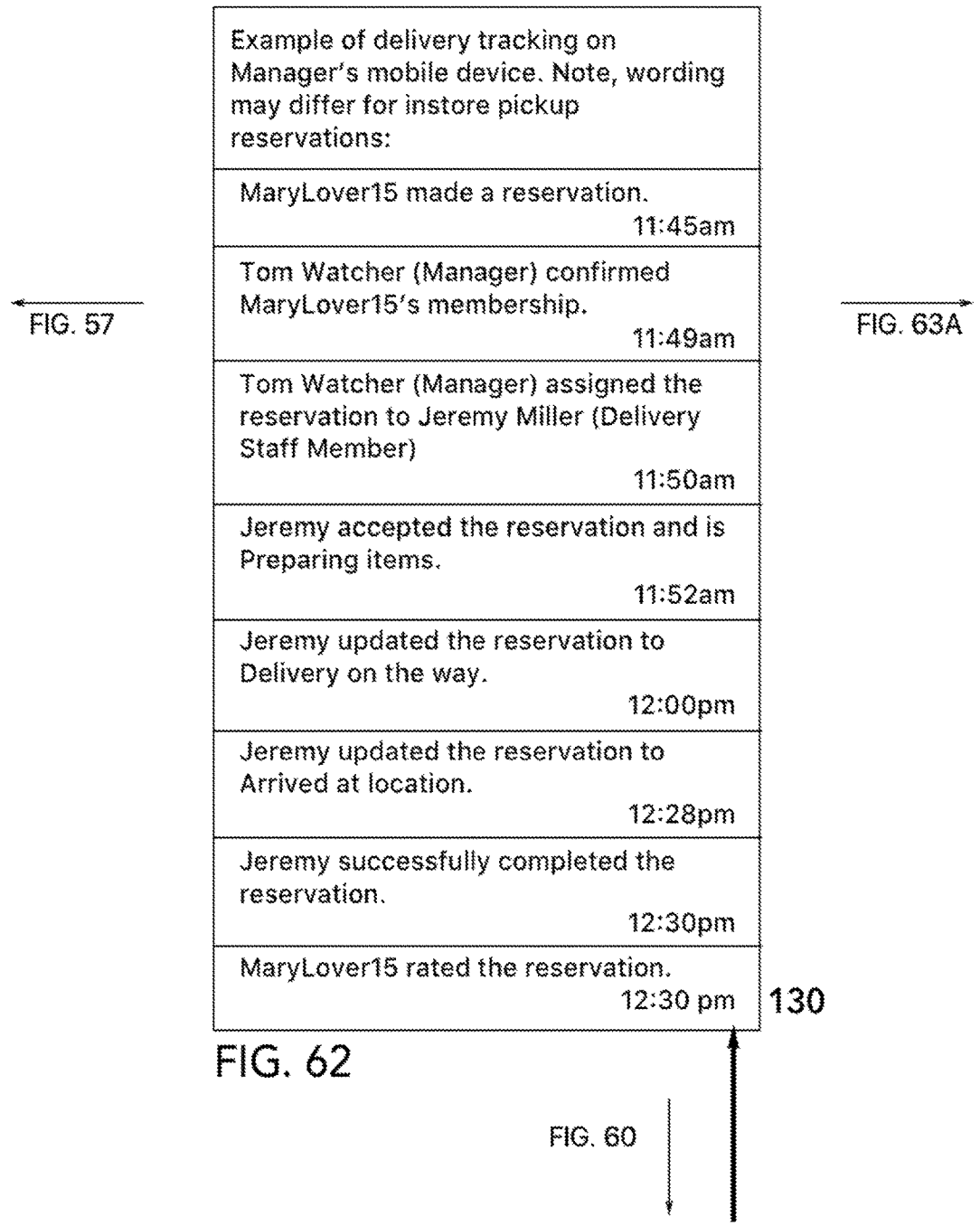

FIG. 106

Membership status
If you are a medical store (not recreational) you may only sell to customers who are members to your Store. As a result, we need to see which customers are members on the incoming reservations.

Manager

← FIG. 62

| MaryLover15 ⊙ |
| is not yet a member. |
| Your assigned Staff |
| Member to provide all |
| necessary paperwork to |
| customer at reservation. | 134

FIG. 64

Manager checks Membership status via internal tools and then can switch it on in our app. Our suggestion is in red, but ultimately, it is up to the Manager to confirm and approve Customers.

| MaryLover15 ⊙ |
| is a member. | 136

FIG. 65

If the Manager confirms membership status, show just this confirmation. This is merely a tool that staff member can reference.

Staff Member

MaryLover15
is not yet a member.
1. Bring membership application to location of sale.
2. Ensure customer fills out application.
3. Complete reservation and record paperwork.

138  If the Manager didn't approve membership status, then the staff member would see this, and understand that these steps should be completed before finalizing reservation.

FIG. 66

MaryLover15
is a member.

140  Or staff member sees that everything is OK here.

CONTINUED FROM
CUSTOMER PAGE

← FIG. 23

| < Back 6802 | Reservation |
| Info | Receipt | Tracking |
6804 6806

MaryLover15 is a member. ⊙ 6808

📱 201-111-0171   Contact 6810

A6
🕐 12:00pm - 1:00pm ⌄
6812

🚗 38 High Street, Denver, CO

👤 MaryLover15

PERSONAL MESSAGE

Come around to the back door.

PHOTO ID

6814

STATE MMJ CARD

6816

Pending Reschedule Confirmation
(1:00pm - 2:00pm)
6818

```
< Back
  6902      Reservation
  ┌──────┬───────┬────────┐
  │ Info │Receipt│Tracking│
  └──────┴───────┴────────┘
     6904    6906
  MaryLover15      ⊂⊃
  is a member.     6908

📱 201-111-0171   Contact
                    6910
                         A6
  ⏱ [12:00pm - 1:00pm  ∨]
                        6912

🚗 38 High Street,
     Denver, CO

👤 MaryLover15

PERSONAL MESSAGE
  Come around to the back
  door.

Cancel          Request
  6914           reschedule
                       6916
  11:00pm - 12:00pm
  12:00pm - 1:00pm
   1:00pm - 2:00pm  6918
   2:00pm - 3:00pm
   3:00pm - 4:00pm
                         144
```

FIG. 69

LOGIC FOR MANAGEMENT TO
RESCHEDULE RESERVATION TIME WITH
CUSTOMER.
NOTE: Ability to reschedule is unavailable if
reservation has been assigned to a staff
member by manager.

```
< Back           Assign
  7002          7004
       Choose Staff
─────────────────────────
Assign to self      ○
                   7008
1 reservation assigned
─────────────────────────
 ASSIGN TO
🚗 Jeremy Miller    ●
                   7006
1 reservation assigned 🚗 Scott Sammers    ○

2 reservations assigned
```

< Back
 7102   Reservation

| Info | Receipt | Tracking |
       7104     7106

MaryLover15
is a member.    7108

📱 201-111-0171   Contact
                 7110

A6
🕒 12:00pm - 1:00pm
🚗 38 High Street,
   Denver, CO
👤 MaryLover15

PERSONAL MESSAGE
Come around to the back
door.

PHOTO ID

[photo]
       7112

STATE MMJ CARD

[photo]
       7114

Assigned to    | Unassign |
Jeremy Miller    7116    148

FIG. 71

FIG. 76

CONTINUED ON
STAFF PAGE

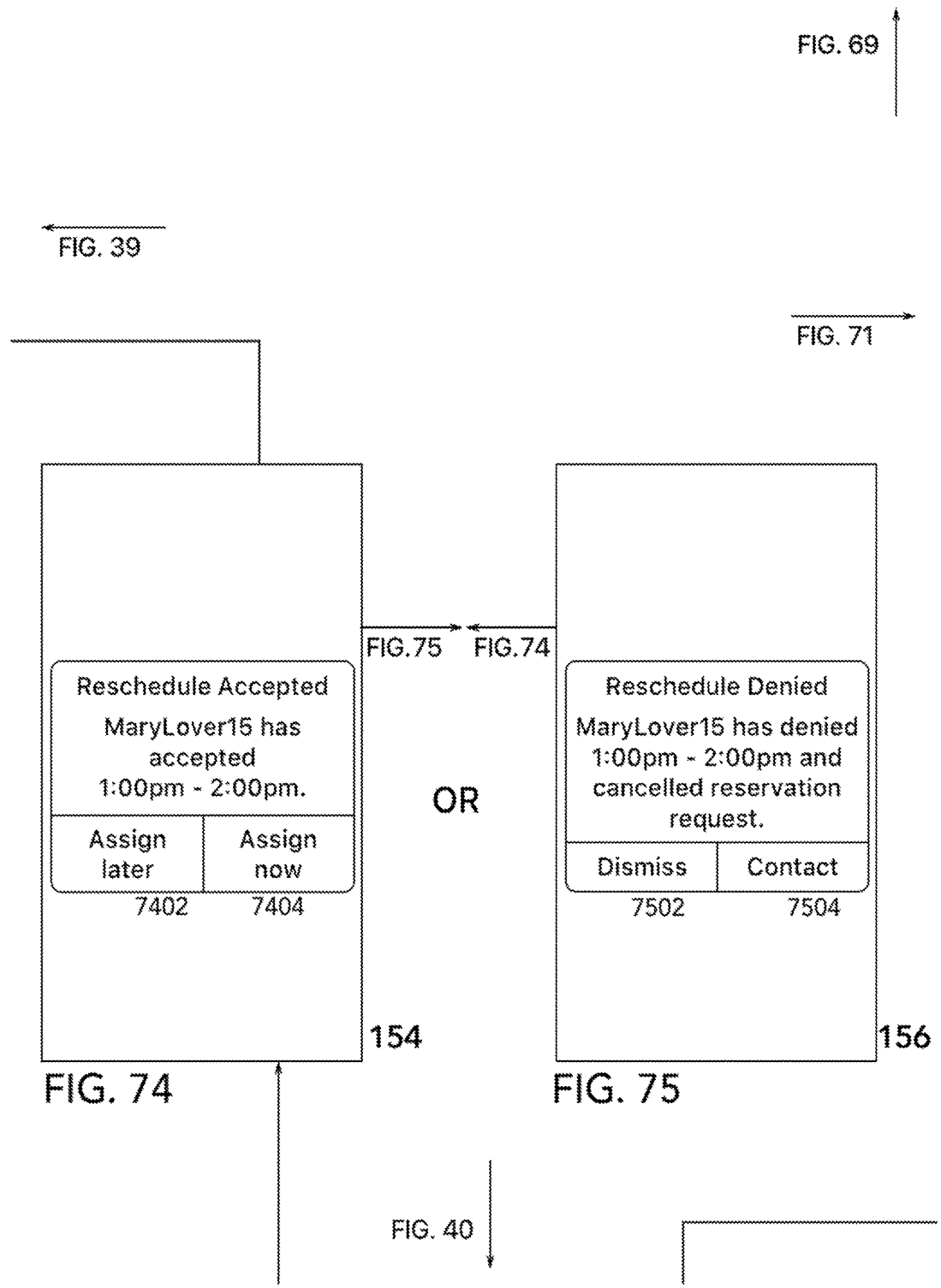

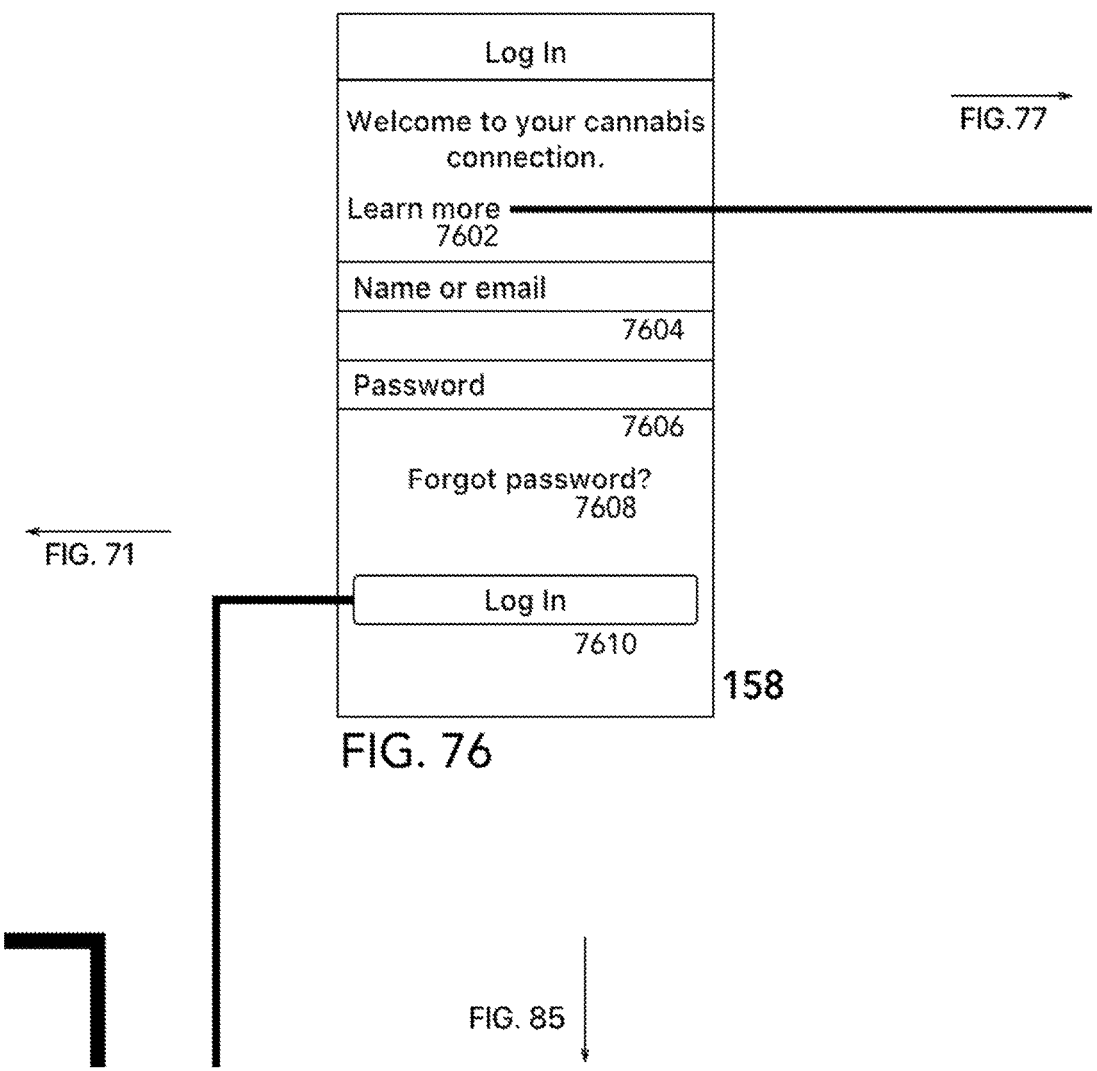

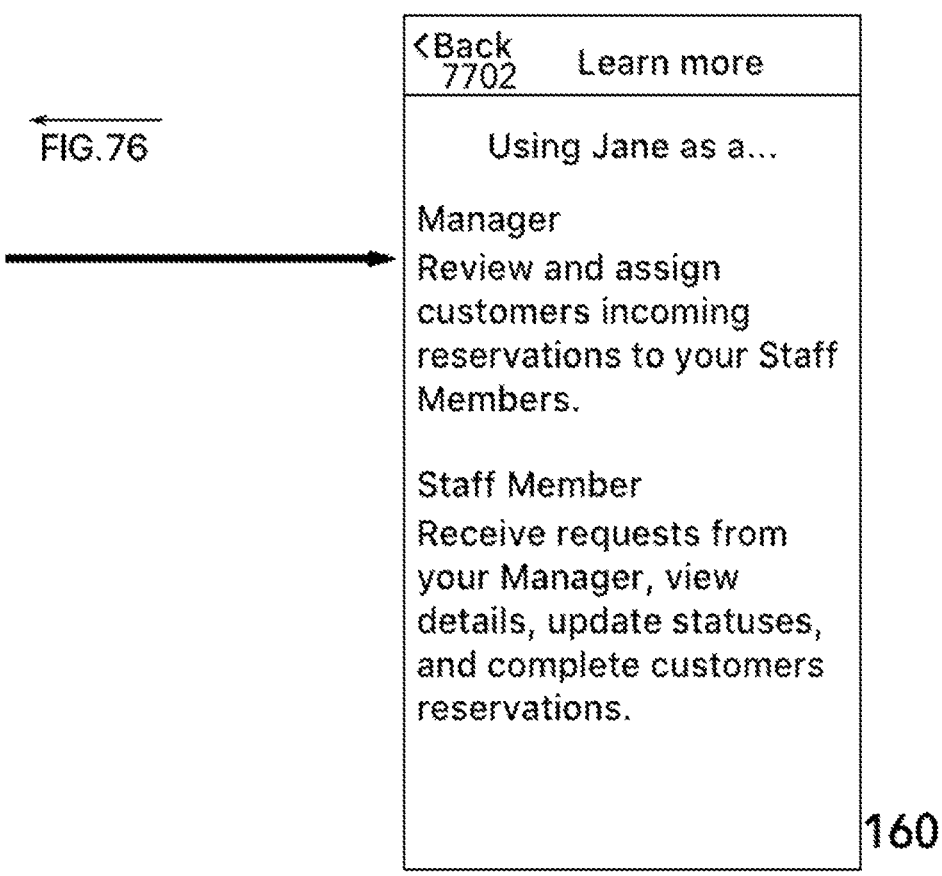

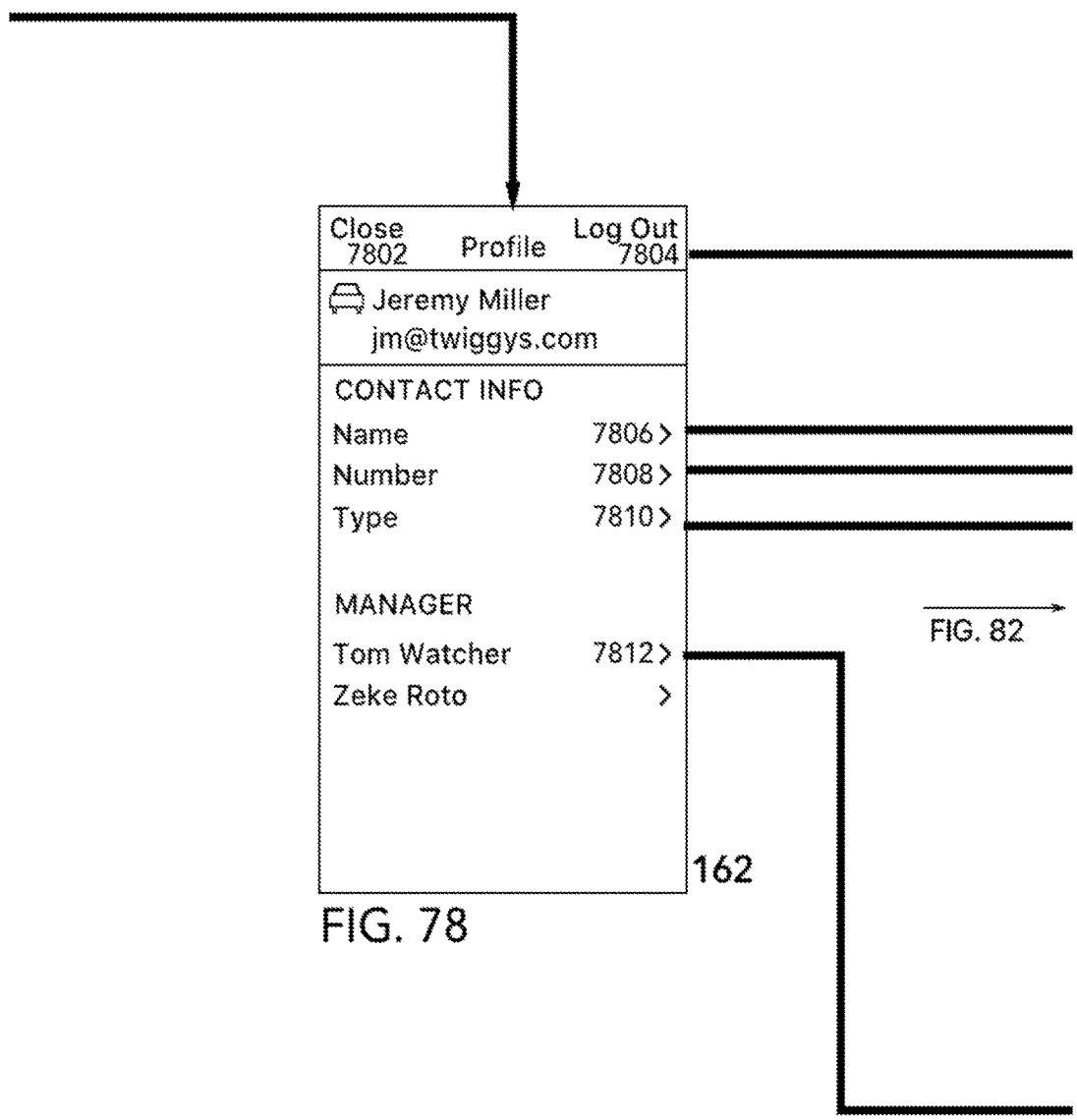

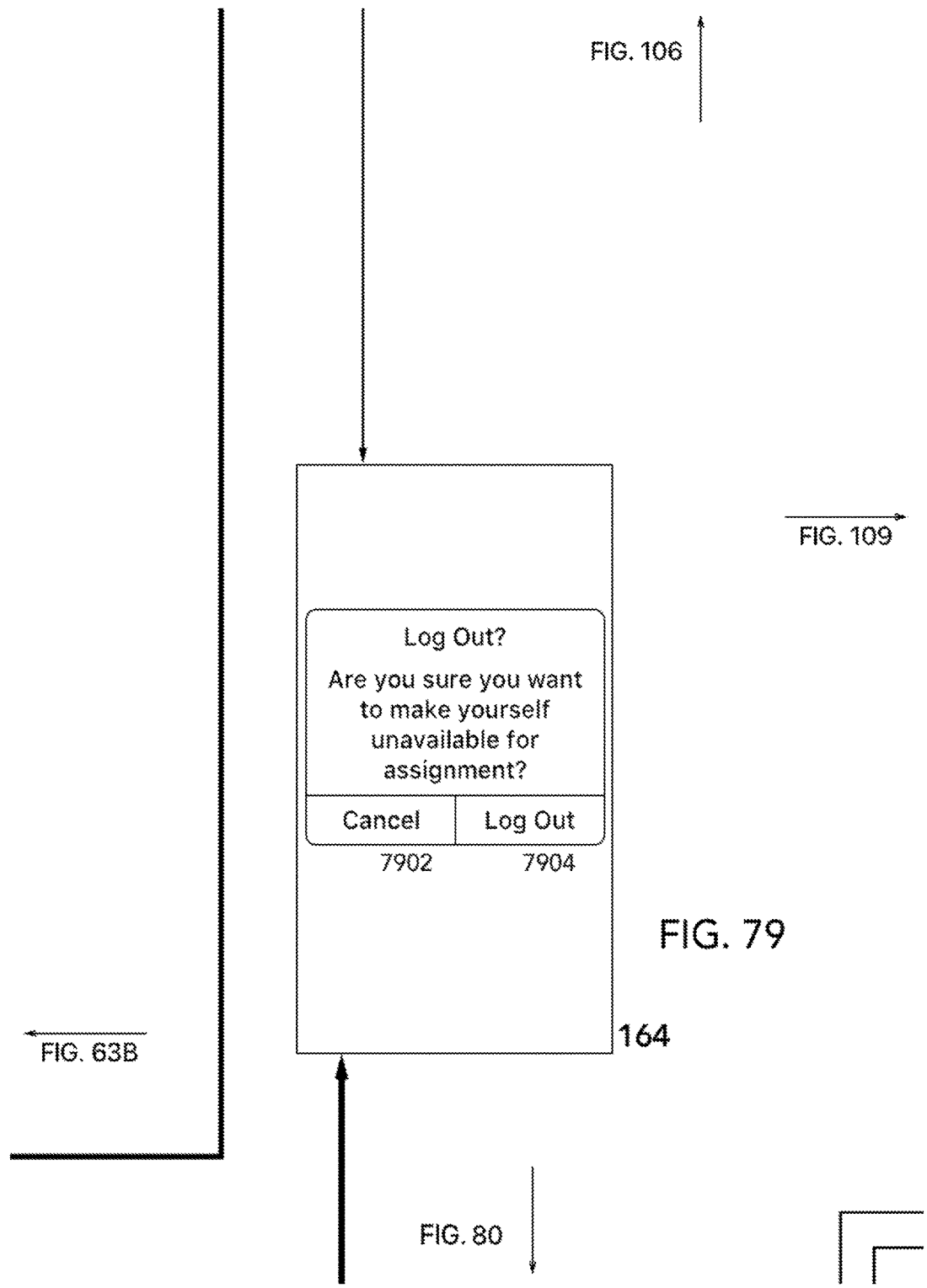

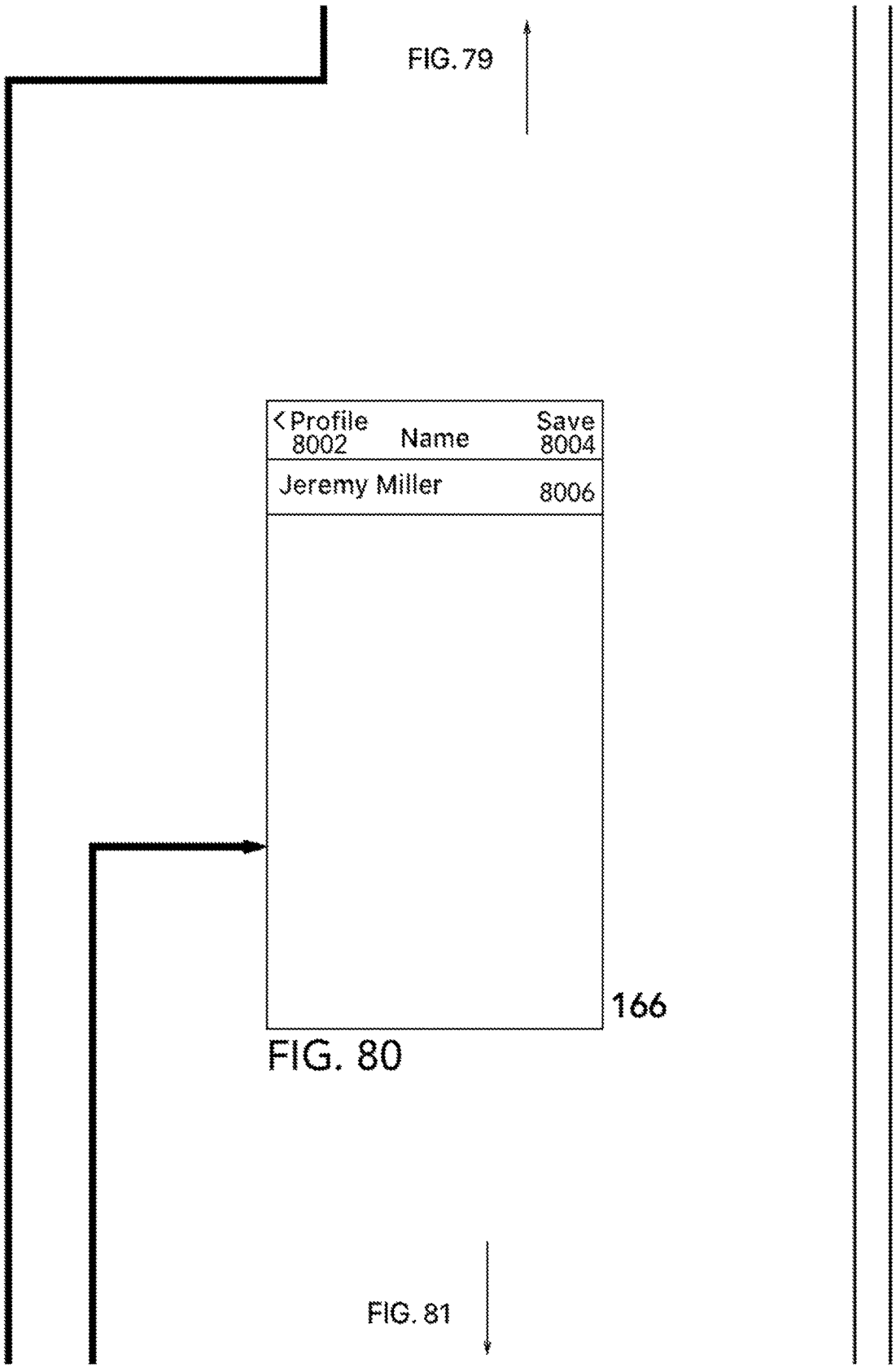

FIG. 80

| ‹ Profile | Number | Save |
| 8102 | | 8104 |
| 202-555-0175 | | 8106 |

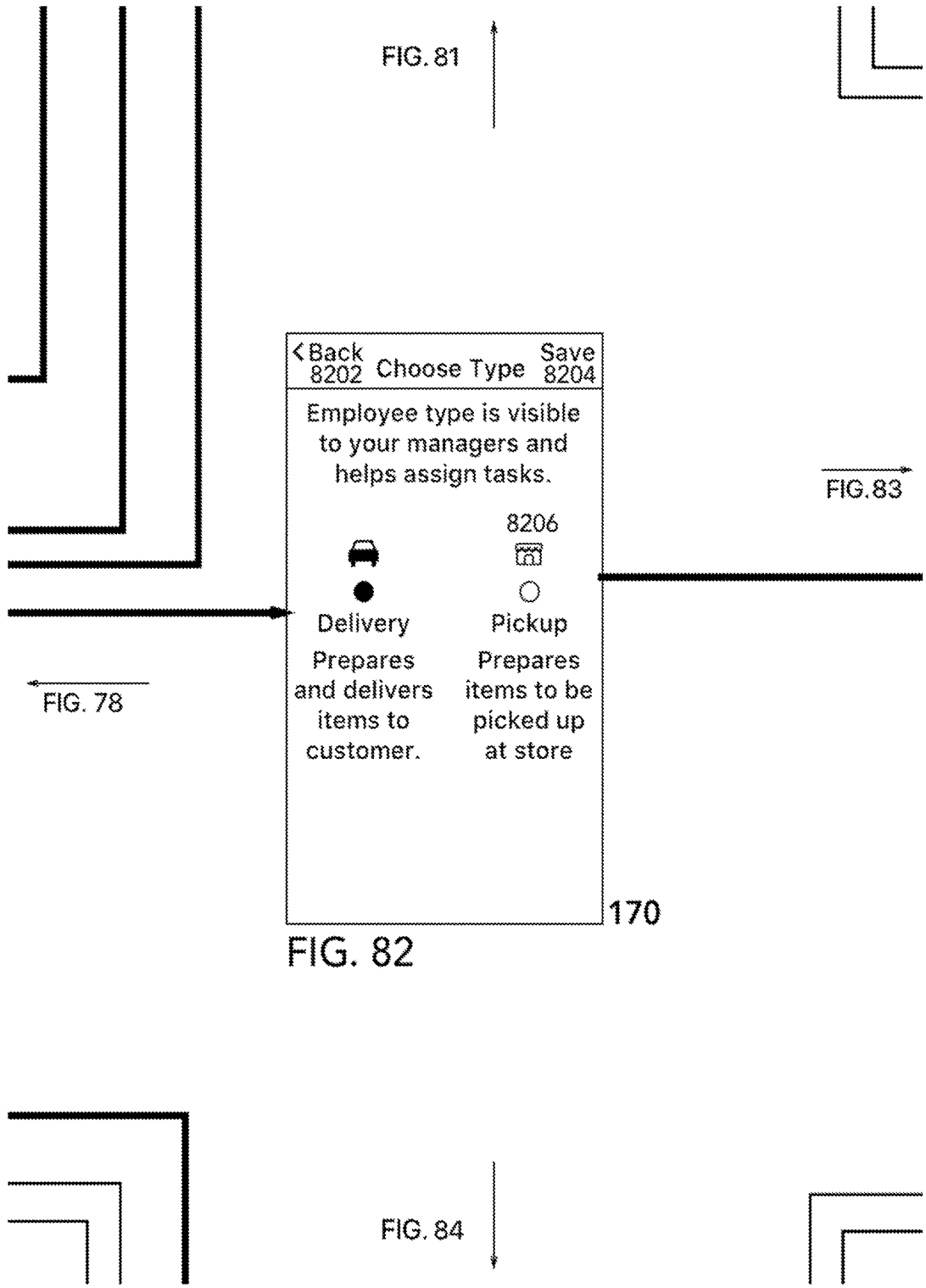

FIG. 82
< Profile  Contact Manager
  8402
Tom Watcher
tw@twiggys.com
202-111-0171
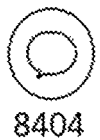  
8404      8406
174
FIG. 84

STORE STAFF MEMBER PAGES

```
⛄ 8602    Reservations
┌─────────────────────────┐
│ In Progress │ Completed │
├─────────────────────────┤
│                    8604 │
│                      A6 │
│ 🕐 12:00pm - 1:00pm     │
│ 🚗 38 High Street,      │
│    Denver, CO           │
│ 👤 MaryLover15          │
│             ★ ★ ★ ★ ★   │
│    April 20, 2016 12:30pm│
│                    8606 │
│                      A1 │
│ 🕐 11:00 AM - 12:00 PM  │
│ 🚗 11 Carol Street,     │
│    Denver, CO           │
│ 👤 sunshine_daydream    │
│             ★ ★ ★ ★ ★   │
│    April 20, 2016 11:45 AM│
└─────────────────────────┘
                         178
```

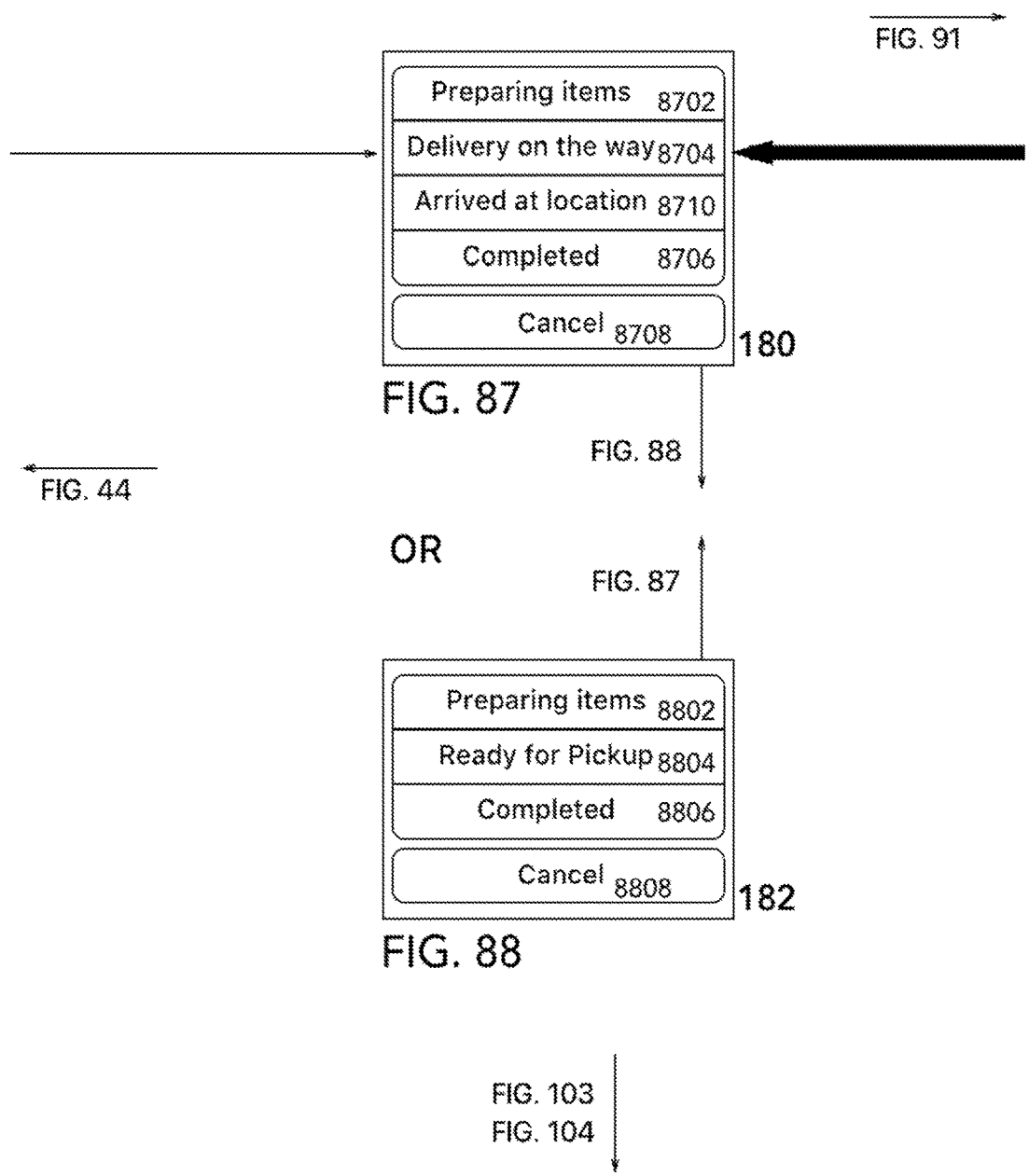

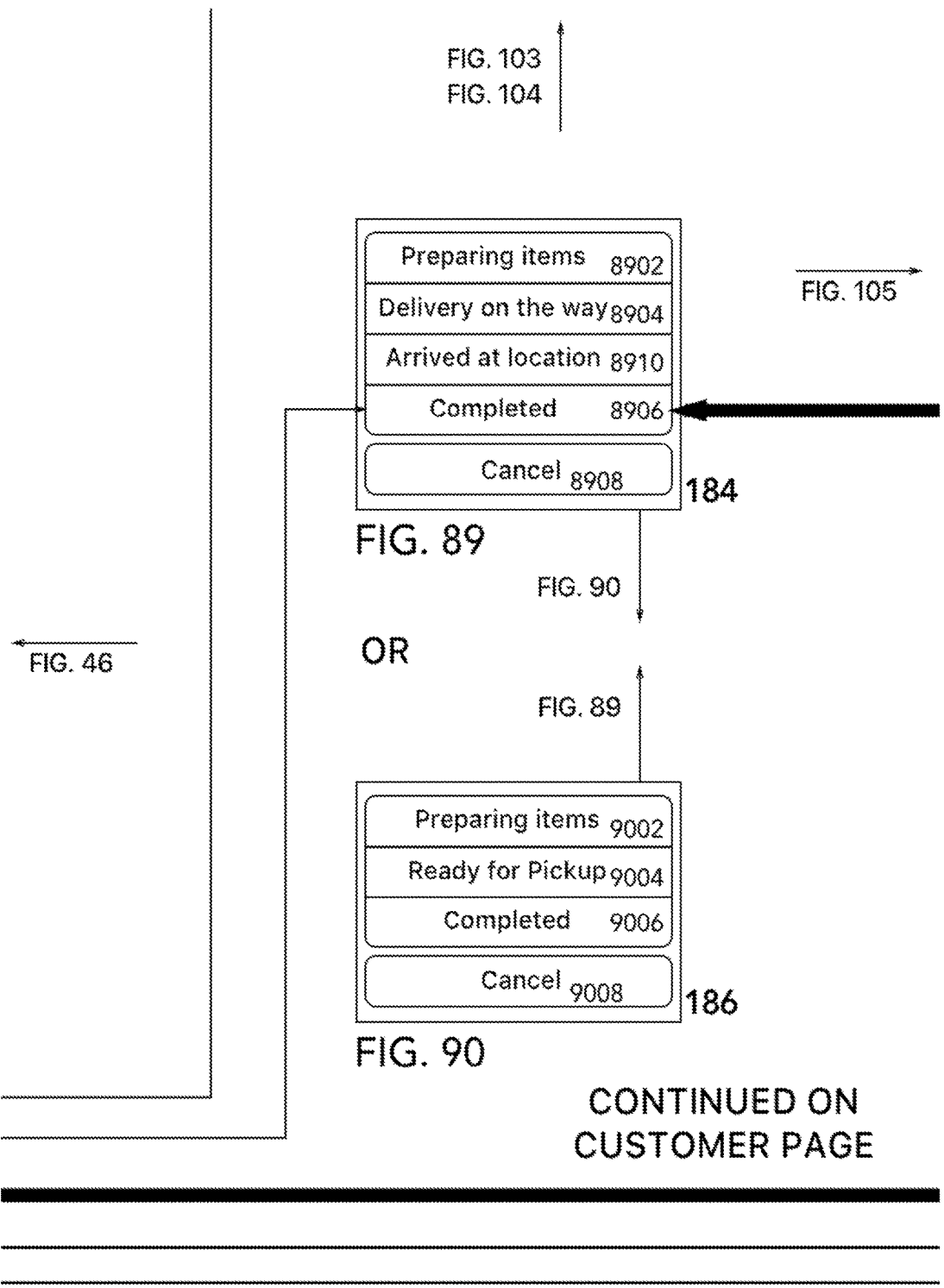

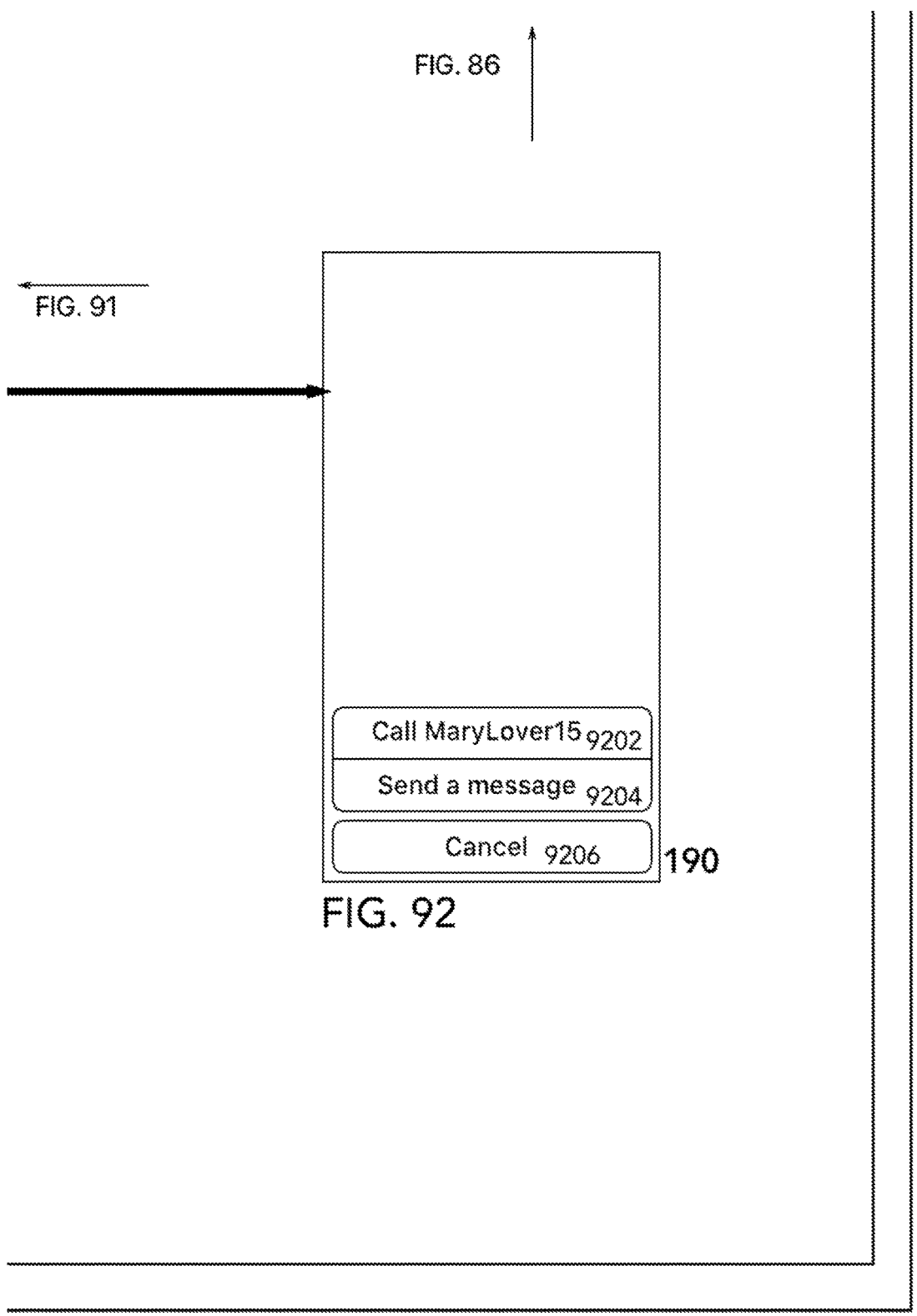

← FIG.100A

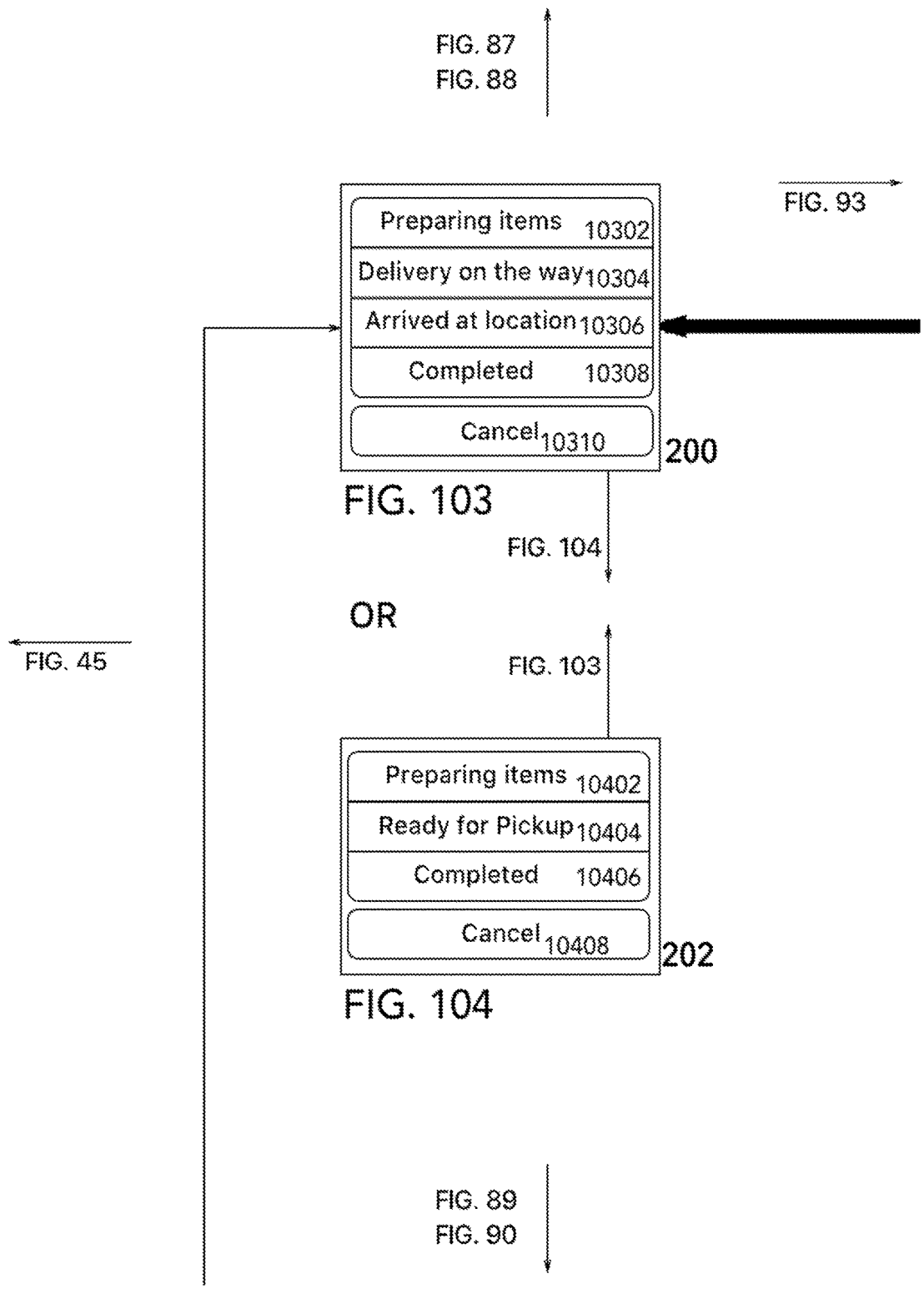

Figure 106:
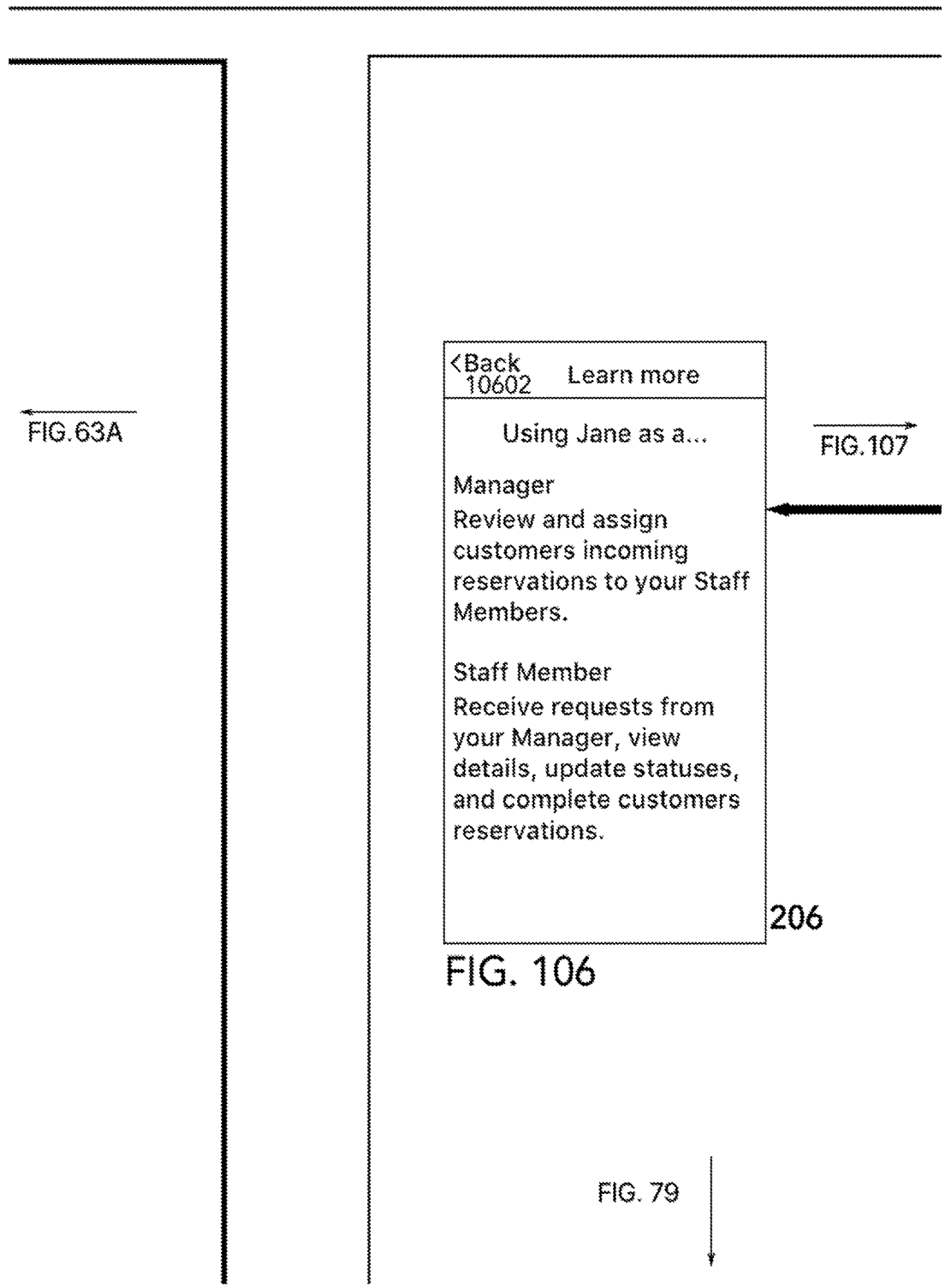
Figure 108:
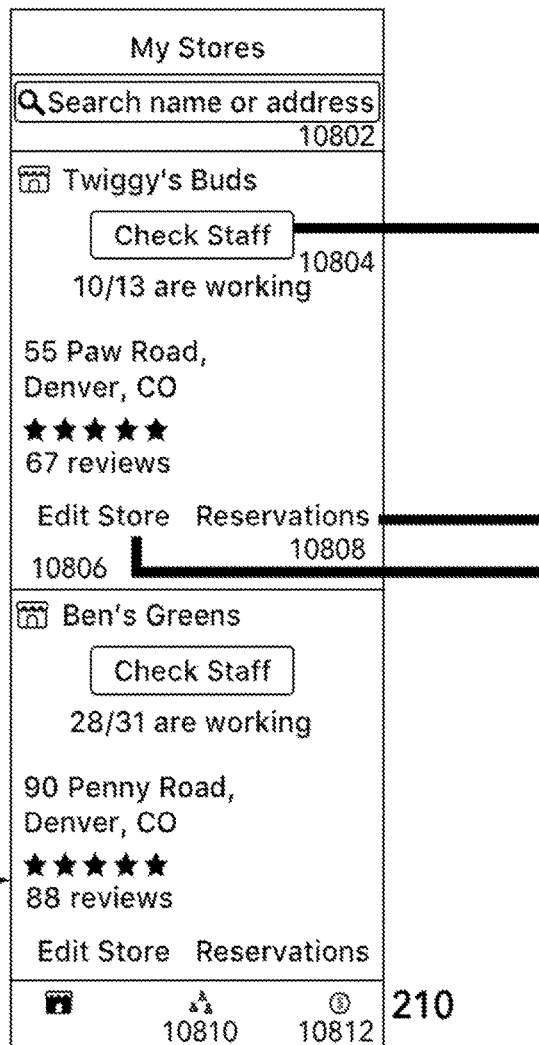

←FIG.106
FIG. 108→
Log In
Welcome to your cannabis connection.
Learn more
10702
Name or email
10704
Password
10706
Forgot password?
10708
Log In
10710
208
FIG. 107
FIG. 109

FIG. 107

| My Staff |
| 44 Staff in 2 Stores |
| Invite |
| 10902 |

MANAGERS

Henry, Jeffery  ☑
Ben's Greens    10904

Lee, Simon      ☑
Ben's Greens

Roto, Zeke      ☑
Twiggy's Buds

Watcher, Tom    ☑
Twiggy's Buds

STAFF MEMBERS

Abraham, Carol  ☑
Twiggy's Buds   10906

Antoine, William ☑
Ben's Greens

```
┌─────────────────────────┐
│ <Back    Completed      │
│  11502   Reservations   │
├─────────────────────────┤
│ 🏠 Twiggy's Buds        │
│    55 Paw Road,         │
│    Denver, CO           │
├─────────────────────────┤
│ 🔍Search     Sort by    │
│    11504      11506     │
├─────────────────────────┤
│ RESERVATIONS            │
├─────────────────────────┤
│ A6 Delivery      $70.00 │
│ ★★★★★                   │
│ Marks, Barbara          │
│ @MaryLover15            │
│ Staff: Miller, Jeremy   │
│       4/20/16 12:45pm   │
│                  11508  │
├─────────────────────────┤
│ A6 Pickup        $91.00 │
│ ★★★★★                   │
│ Cohn, Steve             │
│ @snowman99              │
│ Staff: Blake, Jordan    │
│       4/20/16 12:40pm   │
├─────────────────────────┤
│   🗄    ⚛     ⓢ         │
└─────────────────────────┘
```
224

FIG. 115

FIG. 112

REAL-TIME INTERNET CAPABLE DEVICE INFORMATION INTERCHANGE FOR COORDINATED QUEUING AT LOCATIONS

This application is a continuation application of and claims priority to U.S. application Ser. No. 15/342,557, filed on Nov. 3, 2016, which claims the benefit of the filing date and priority of United States patent application Ser. 62/344,337, filed on Jun. 1, 2016, the entire contents of both applications are incorporated here by reference.

This description relates to real-time Internet capable device information interchange for coordinated queuing at locations.

Here we describe technology in which two or more (and potentially a very large number of) Internet capable devices, for example mobile devices such as cell phones, that are at two (or more) different places, can issue requests for service to be provided through two or more (and potentially a large number of) Internet capable devices (which also may be moving) at two or more (and potentially a large number of) servicing locations. The requests for service can be requests for reservations to be queued for delivery of physical units at the servicing locations.

The service requests may need to be served in real time by queuing the requests for service using Internet-capable devices at servicing locations that contain the physical units that are to be delivered. Among other things we describe technology for sending the requests, receiving the requests, queuing the requests, and managing the deliveries in real time by timed and coordinated communications through the Internet among the Internet-based devices and with cloud-based servers.

Among other things, the Internet capable devices can have displays and interactive technologies that facilitate user assistance in causing the service requests to be made and received, and the queuing and management of deliveries to be coordinated.

As a result of the implementation of the technology that we describe here, the Internet capable devices, the software running on them, the cloud-based servers, and other equipment can perform the sending and receiving of the requests and the queuing, management, and delivery more quickly, efficiently, simply, compliantly, and safely than would otherwise be possible.

Although we describe specific examples and applications here, the technology that we describe for coordination of the requests, services, queuing, management, and delivery of physical units can provide these advantages in a broad range of contexts, applications, and implementations.

In some contexts, in which the technology is applied, the storage and delivery of the physical units are controlled, for example, by a government and delivery of the physical units is regulated to control the parties to whom delivery can be made and the places where the physical units can be delivered, among other things. In such cases, the service requests sent from the Internet-capable devices can represent reservations for service to be given at specified locations at which the physical units will be delivered. The reservations can be associated with specific available physical units in inventory at the specified locations. Because multiple reservation requests may be delivered from the Internet-capable devices, the server or the Internet capable devices at the places where the physical units will be delivered must receive, manage, and maintain queues for the reservation requests at each place so that the queues and the services can be provided in a disciplined, predictable, and understandable order. Although users of the Internet capable devices will view on displays and provide input through their input devices to facilitate the reservations, the queuing, the performance of the services, and the deliveries of the physical units at the locations, the communication of information among the devices and with the server and the other equipment at each location facilitates the implementation of the queues, the reservations, the coordination, and the management of services in a way that is quick, efficient, simple, and effective in the context of delivery of regulated physical units.

The locations at which the services, for example, the delivery of the physical units, are to be rendered can be physical stores that maintain point of sale systems that manage inventories of the physical units. Information about the physical inventories can be shared through communications over the Internet with the devices and the cloud servers to facilitate the functions of the system.

The system that we describe here (which we sometimes refer to as a reservation system) provides significant value to the stores (the client), their management and staff, and their customers. We sometimes use the word store as shorthand to refer to any kind of location at which the delivery of the physical units occurs.

For a store, whose ownership can access the platform via the "Client" user role, the system collects valuable data (and stores it in the cloud-based servers) that can be captured at the individual store level or in aggregate (i.e. for retail chains). The store has access to information about staff optimization, fleet efficiency, inventory turnover, and customer insights relative to a single retail location, its respective retail chain, or its competition. In addition to data, the reservation system provides a digital storefront corresponding to a physical store that displays the store's product in real-time on any internet-capable device. As a result, this makes its entire physical inventory continuously visible to all users without the store having to purchase additional hardware or commit any additional resources.

For the store's management and staff, the system provides a means to remotely process incoming demand, which then can be balanced across an available workforce for subsequent fulfillment. By organizing the inputs onto a consistent platform, the manager is able to process customer demand with greater efficiency. Also, the system provides the store manager with visibility on an individual staff member's workload without having to be co-located, which then could provide insight on future staffing and scheduling matters. Furthermore, the system automatically updates the status of a reservation based on various user inputs. Thus, the manager can view the status of all ongoing and completed reservations at the store, the staff member can view the status of his assigned reservations, and the customer can view the status of her specific reservation—all without having to make a phone call, send a text message, or email, or have an in-person discussion. Moreover, the mobile capability of the platform frees the manager from having to be physically present at an on-site workstation, and as a result, managers are able to process and assign customer demand to staff members across multiple stores, all from a single remote device connected to the internet. Lastly, the ability to accept reservations in advance will reduce customer lines and increase transaction throughput at retail locations. For example, if a long line forms at a store that closes in 15 minutes, the store might have to deny service to customers at the end of the line, and thus, unnecessarily lose out on sales. By allowing customers the ability to browse, compare, and select a store's products remotely, store management and staff will provide the flexibility and visibility to accommodate demand volatility and minimize operational bottlenecks.

For the customer, the system provides a means to remotely search, compare, and reserve products across an aggregated network of stores or at an individual store—without ever having to set foot in the physical retail location itself. Most stores have a digital presence associated with the overall brand that is separate from its physical presence provided by its retail locations. This reservation platform provides the physical retail locations with a digital presence, and in doing so, extends its products and services of their retail infrastructure to an audience of customers who would otherwise not have access to those stores via the internet. Using the company J. Crew as an example, customers can visit www.jcrew.com to browse, select, and order items directly from their online store, but perhaps the item is not in inventory, the shipping fees may be too expensive, or perhaps the customer needs the product right away. If J. Crew was "powered by Jane," then the customer would have the same ability to browse, select, and reserve items for purchase from multiple retail locations at once, all from the convenience and privacy of her internet-capable device.

Within the cannabis industry, and similar to such industries as alcohol or tobacco, there exist regulatory constraints that make this system useful. Colorado, for example, has regulatory constraints specific to the legalized recreational and medicinal cannabis industry. First, retail stores (both recreational and medical) must confirm a customer's identification and other pertinent documentation before granting access inside the store. As a result, the system contains a repository upon which the customer can upload the required documentation, and where the store's management and staff can validate the customer's identification prior to accepting the reservation request. Second, regulatory constraints require the store's staff to supervise a customer (and the displayed products) when inside the retail location, which results in slowed service and long customer waiting times. Thus, by enabling customers to make educated purchasing decisions remotely in advance, store staff members are able to process more transactions and customer wait times are reduced. Third, sales can be processed only at the store's licensed premises. Thus, the system enables customers to reserve products that are prepared by the staff, available at the store at a pre-determined time, and made ready for purchase upon pickup in-store. Lastly, stores are not authorized to display or store cannabis products outside of the licensed premises. Thus, the system enables stores to digitally showcase their products, and provide customers remote access to those products—all within compliance of the law. Within the cannabis industry, where its products have been proven to restore the well-being of its customers, regulatory constraints make it difficult for customers to browse, compare, and reserve items from multiple stores at once. The result is usually one where the customer is relegated to limited products, long lines, and misinformation from biased staff members. With this system, however, customers are afforded the access to make an informed decision, and stores are empowered to extend their reach to customers who would otherwise be unreachable.

Thus, in general, in an aspect, a central server maintains information representative of requests communicated through the Internet from devices at request locations. Each of the requests represents a proposed reservation for services to be managed by devices at delivery locations. The services include managing, by the devices at the delivery locations, the preparation for delivery of physical units identified in the requests. There are facilities to receive (at the central server through the Internet from inventory management devices at the delivery locations) and to update at the central server information that identifies physical units currently available for delivery at the delivery locations. Processes at the central server identify—based on the information about the physical units currently available for delivery and on the requests—and generate data that represents queues of reservations for delivery of the physical units at respective delivery locations. There are facilities to send the queue data from the central server through the Internet to the devices at the respective delivery locations. There are facilities to receive (at the central server through the Internet from the devices at the respective delivery locations) information indicating acceptance or rejection of reservations in the queues. Processes update at the central server the data that represents the queues based on the acceptances or rejections. There are facilities to send from the central servers through the Internet to the devices at the delivery locations, updated information about the queues. There are facilities to receive (from the devices at the delivery locations through the Internet at the central server) data confirming the servicing of reservations in the queues. Processes at the central server update the information that identifies physical units currently available for delivery at the delivery locations and the data that represents the queues, based on the data confirming the servicing of the reservations.

Implementations may include one or combinations of two or more of the following features. The inventory management devices at the delivery locations comprise point-of-sale devices. The devices at the delivery locations are associated with managers of the delivery locations. The devices at the delivery locations are associated with managed staff of the delivery locations. The physical units comprise retail products. The physical units comprise cannabis. The access to the physical units is controlled in accordance with governmental regulations. The devices at the request locations belong to consumers. The central server sends catalog data through the Internet to the devices at the request locations. The catalog data includes displayable information representing inventory of the physical units available at the delivery locations. The central server sends control data through the Internet to the devices at the delivery locations that enables the devices at the delivery locations to control the servicing of reservations to comply with governmental regulations. The delivery locations comprise competitive physical retail stores.

The central server sends management data through the Internet to the devices at the delivery locations that enables the devices at the delivery locations to manage allocation of reservations among managed staff.

Other aspects, features, implementations, and advantages will become apparent from the following description and from the claims.

Figure 95A:
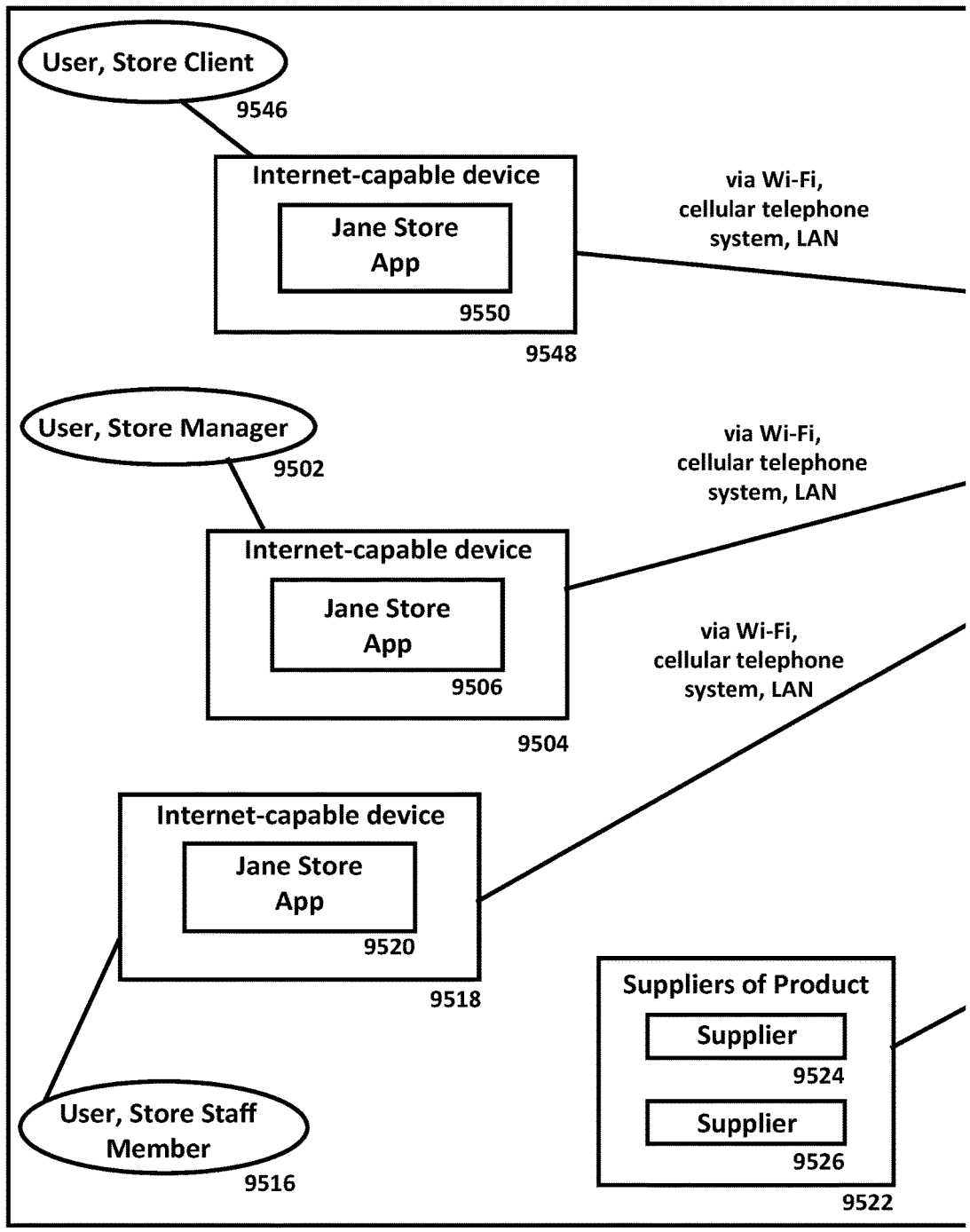
Figure 95B:
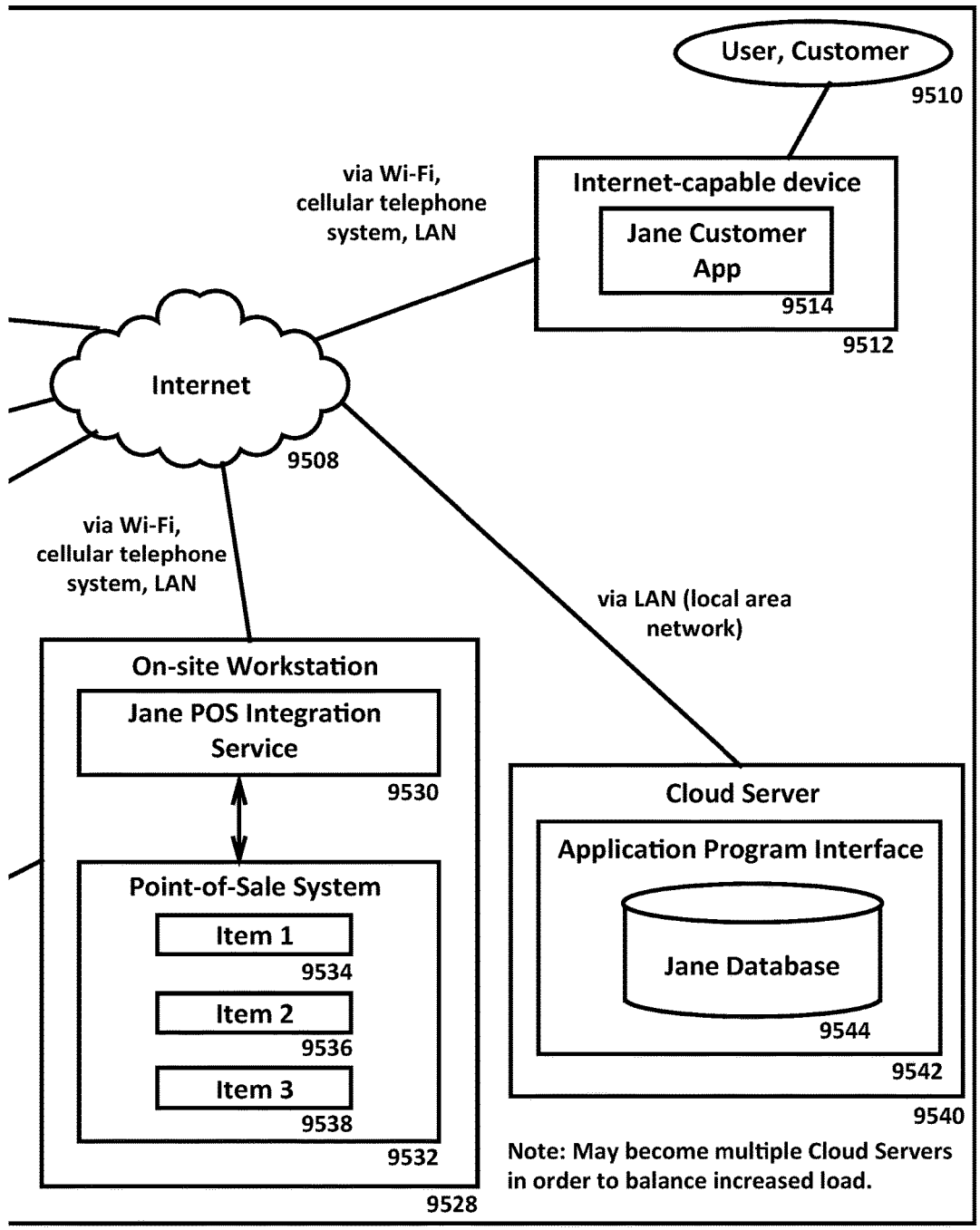
Figure 99:
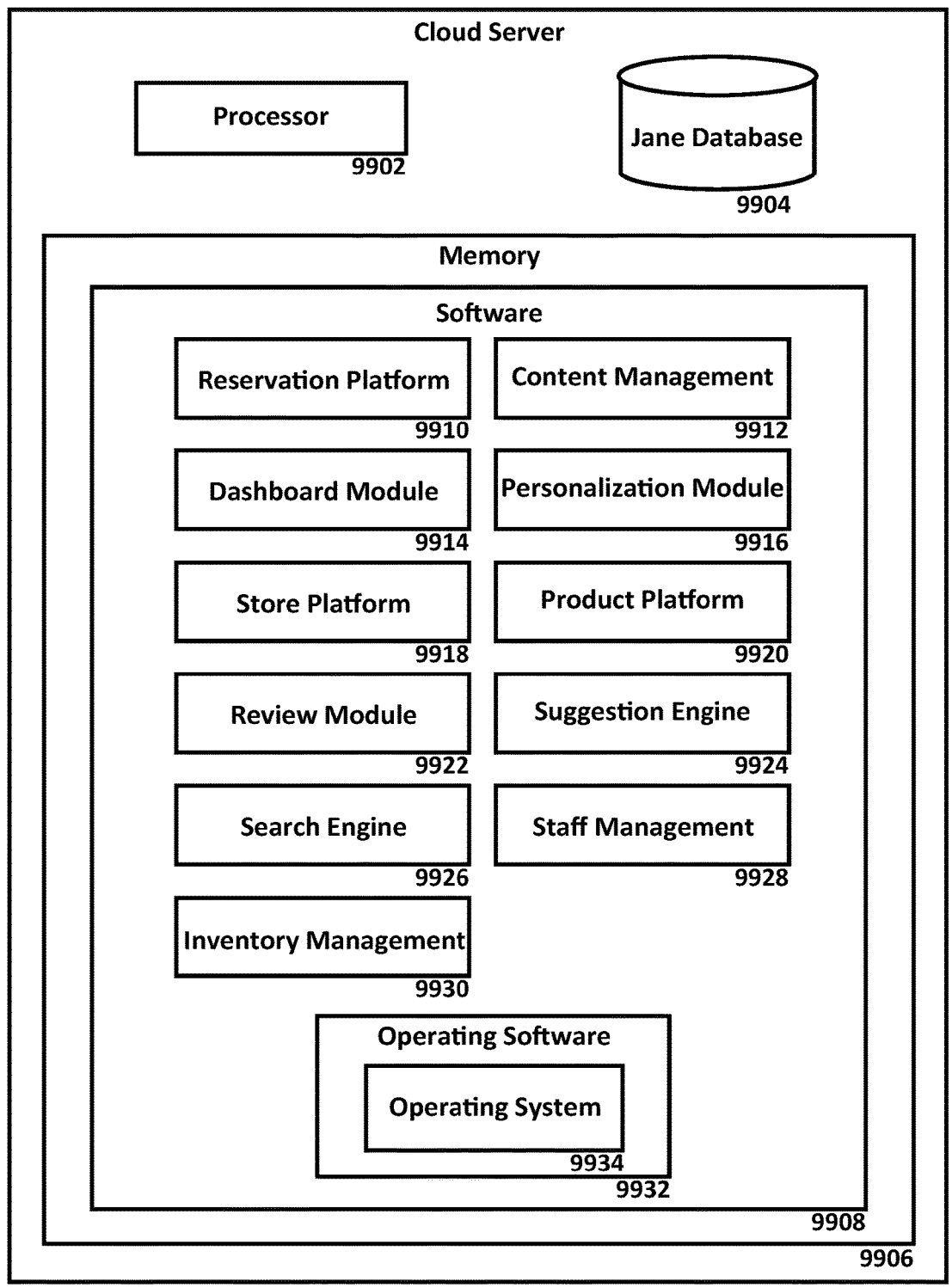
Figures 100A, 100B:
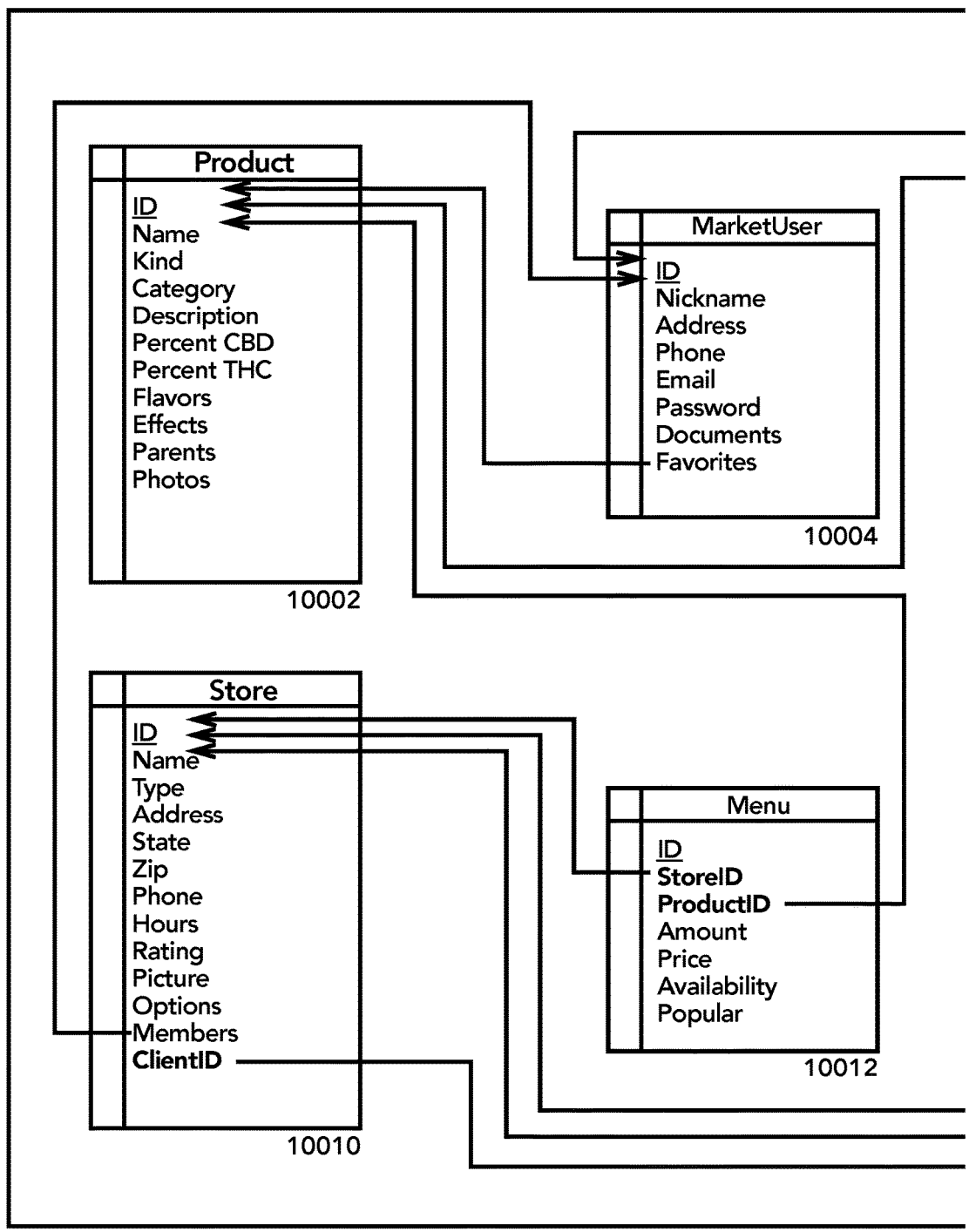

Our discussion is accompanied by the following figures.
FIG. 1 is a key to markings on later figures.
FIGS. 2 through 94 and 101 through 121 are illustrations of pages of a user interface.
FIGS. 95A, 95B, through 99 are block diagrams.
FIGS. 100A and 100B show a database schema.
We begin with FIG. 95, which illustrates the framework and elements of the technology.

An overview of FIG. 95 shows four key users within the technology (we sometimes refer to the technology as a system): a Customer user (Oval 9510), a Store Manager user (Oval 9502), a Store Staff Member user (Oval 9516), and a Store Client user (Oval 9546). Note that the suppliers of the product (the physical units), represented by Blocks 9524 and 9526 within group Block 9522, exist within and participate with other parties in the system without being direct users of the system.

We sometimes refer to elements of the system using the word "Jane." Jane refers to one possible example implementation of the technology and the system and may relate, by way of example only, to technology and a system offered by a venture named Jane Technologies. The use of the word Jane in this description does not limit the breadth of the nature, implementation, or use of the technology that is intended.

In FIG. 95, a customer (who can be at any arbitrary location and can be moving) accesses a Jane Customer App (Block 9514) running on her Internet-capable device (for example, an iPhone app running on an iPhone), as outlined in Block 9518. An Internet-capable device can be defined as a personal computer, laptop, notebook, smartphone (iPhone, Android, etc.), tablet, or any other piece of hardware with the capability to connect to the Internet via Wi-Fi, cellular telephone system, or local area network (LAN), for example. Although only one customer is shown in FIG. 95, the system serves two or more (and up to a very large number such as a million or more) customers at different locations and all possibly in motion. The customer users can be at locations different from the places where the physical units are to be delivered.

A store manager accesses a Jane Store App (Block 9506) via his Internet-capable device, as outlined in Block 9504, while a store staff manager accesses a Jane Store App (Block 9520) via his Internet-capable device, as outlined in Block 9518. The store manager and the customer can be located in a physical store, for example. As with the customer, although only one store manager and one store staff member are shown on FIG. 95, there can be more than one store manager or more than one store staff member at each physical store and there can be two or more (and up to a very large number such as dozens or hundreds) of physical stores. The stores that we refer to may in some cases not be at fixed physical locations, for example they could be set up in tents or trailer trucks or even smaller mobile arrangements.

In general, the customer utilizes the Jane Customer App to search, compare, and reserve products from stores; the store manager utilizes the Jane Store App to verify, accept, and assign reservations, and the store staff manager utilizes the Jane Store App to prepare, fulfill, and complete assigned reservations. The Internet capable devices and the applications running on them facilitate these activities, making them simple, efficient, fast, and safe.

Also within the system, Block 9528 depicts a store's on-site workstation, which could be a personal computer, laptop, notebook, smartphone (iPhone, Android, etc.), tablet, or any other piece of hardware with the capability to connect to the Internet via Wi-Fi, cellular telephone system, or LAN, for example. Within the on-site workstation, there exists a point-of-sale (POS) system (Block 9532) that inventories items from suppliers, as represented by Blocks 9534, 9536, 9538. The Jane POS integration service (Block 9530) integrates with the POS system to relay and present items to the platform (we sometimes refer to the technology or system as a platform) in real-time. In this way, the requests sent from the customers' devices are accurate and can be served because it is known by the system at the time the requests are sent that the specific physical units to be delivered to fulfill the requests are available at known places.

Also, within the system shown in FIG. 95, a cloud server is represented by Block 9540, which is a logical server that is built, hosted and delivered through a cloud computing platform over the Internet via LAN, for example. Cloud servers possess and exhibit similar capabilities and functionality to a typical server, but are accessed remotely from a cloud service provider. Within the cloud server is the platform's Application Program Interface (API), which is displayed in Block 9542 and specifies how the various software components should interact with one another. The platform's API contains a Jane Database, depicted in Shape 9544, which collects the necessary information that is organized for easy access, management, and updating. Note that central to this system is the Internet, depicted in Shape 9508, which in some embodiments is the communication network that allows all system devices, workstations, and servers to connect and exchange information.

The central server and database receive, store, and fetch information and use it to keep the Internet-capable devices of the system current in real time on inventories and places where delivery of physical units can be made, so that requests for reservations sent by the customers' devices will be accurate and known to be correctly and completely serviceable from inventory at known locations.

With reference back to the store manager in Oval 9502, he utilizes the platform for such functions as profile personalization, customer verification, inventory review, reservation verification, reservation acceptance or denial, reservation rescheduling, reservation assignment (or unassignment) to staff members, reservation tracking, contacting staff members or customers, and customer membership confirmation. Within the system, the Internet-capable device of the store manager is the first point-of-contact within the store who receives each reservation request, which is forwarded by the server. The device presents the proposed reservation through the display to the store manager who can control the communications made by his device with respect to the requested reservations. If he chooses to deny the request, the process is terminated there, his device communicates the rejection to the server and the server communicates it to the customer's device. If he accepts the request, the process continues. Thus, the platform provides the store manager (through his device and its communications through the server to the customer devices) with the unique ability to communicate in effect directly with the customer in real-time via connected platforms (e.g. reservation rescheduling process), view availability and assign reservations to staff members, and track ongoing and completed reservation activity.

Block 9504 represents the store manager's Internet-capable device, upon which the Jane Store App (Block 9506) operates, and upon which the platform's notifications appear and where email/text message/phone calls may occur. The device connects the store manager to the Jane Store App, and once connected, his inputs will be shared throughout the parts of the system by communications from the device via the Internet. Upon utilization of the platform, the device becomes a unique tool for the store manager by transforming it into a tool that can verify inventory, manage staff, process incoming customer requests, and track the status of ongoing or completed reservations. Moreover, through the Internet, this device transforms into a mobile tool that can simultaneously communicate with customer and staff member users, the system's database, and the store's on-site workstation. The result is that the devices and the server themselves and through communication via the Internet can coordinate the queuing of requests, the verification of inventory, and the disciplined delivery of physical units at the locations where it is available.

Block 9506 depicts the Jane Store App, which provides many such functions to the store manager as profile personalization, customer verification, inventory review, reservation verification, reservation acceptance or denial, reservation rescheduling, reservation assignment (or unassignment) to staff members, reservation tracking, contacting staff members or customers, and customer membership confirmation. Note that the store manager may log in or out of the platform at any time. Upon signing in, the Jane Store App serves as the portal through which the store manager can access and participate within the system. When the store manager connects to the Jane Store App on his Internet-capable device, he thus connects through the Internet to the platform's API in Block 9542 (via the cloud server in Block 9540) and accesses necessary data via the Jane Database detailed in Shape 9544. As it relates to the store manager, the Jane Customer App is unique in the sense that it allows management to verify inventory, manage staff, process incoming customer requests, and track ongoing or completed reservations all from a single mobile platform in real-time.

In our discussion we sometimes refer to actions taken directly by the customer, the manager, the client or the store staff. In most cases, these descriptions are short-hand for the fact that the customer, manager, or store staff is merely interacting with the devices, which are performing and effecting the functions by the execution of applications and communication of messages among them.

Shape 9508 represents the Internet, which serves as global communication network, allowing all system devices, workstations, and servers worldwide to connect and exchange information and together and in coordination perform the functions and provide the services that we describe. Via the Internet, the customer, store manager, and staff member are able to connect to the system on their respective devices via Wi-Fi, cellular telephone system, or LAN. Because of the Internet, the platform (via Wi-Fi, cellular telephone system, or LAN) is able to integrate into the store's on-site workstation in order to access and present inventory items in real-time. Furthermore, the Internet allows access via LAN to the platform's API in order to access the system's data. This process is unique because the Internet is central to the entire system's ability to aggregate all disparate customer and store information onto a single platform, while simultaneously granting access to devices worldwide for various purposes. The store's inventory items are dynamically integrated and uploaded onto the system, and customers with access to the system can view those items in real-time.

Oval 9510 depicts the customer who utilizes the platform for such functions as profile personalization, document upload, content customization, content search, store comparisons, favorite products and stores, cart building, reservation request, store contact, reschedule acceptance or denial, reservation tracking, notification management, and reservation review. Within the general operation of the system, it is the customer who decides what items (e.g., physical units) are to be requested, from what locations (e.g., stores), at what times, and in what manner.

The process cannot continue unless the customer through the customer's device requests a reservation, and the process is not complete until the customer completes the required reservation review. Note how the customer's reservation request can affect the status of items presented by the store on the platform's API. For example, if the customer adds an item to her cart that was the last of its kind in the store's inventory, it would thus make this item unavailable to other customers in the digital store and the physical store alike.

Upon the customer making the reservation request, the platform provides the customer with the unique ability to communicate directly with the store manager and staff member in real-time via connected platforms, view and request items linked in real-time to POS systems within the store (therefore assuring the available inventory), and search for products by price, proximity, or popularity across an aggregated network of retail locations. Also, not only is she able to request delivery or in-store pickup of her items, but also the platform provides the unique ability for the customer to track the ongoing status of her reservation from the onset of the request through delivery or pickup (We sometimes use the word delivery to refer both to delivery or pick up.). Lastly, she is able to provide a review of each of her reservations at each of the locations (e.g., stores). That is, instead of providing a review of the store only once, by aggregating reviews on a per transaction level, the platform provides a more accurate review system that is rooted in the consistency of product and service.

Block 9512 represents the customer's Internet-capable device, upon which the Jane Customer App (Block 9514) operates, and upon which the platform's notifications, videos and photos appear, and where email or text messages or phone calls may occur. The device connects the customer to the Jane Customer App, and once connected, her inputs will be shared by the device throughout the parts of the system via the Internet.

For example, if the customer uses her device to search for a product under a specific set of parameters, and the store's product meets those parameters, the data will be pulled from the Jane database connected to the store's on-site workstation, and presented in real-time to the customer on her device via the Internet. Upon utilization of the platform, the device becomes a unique tool for the customer by transforming it into a tool that can aggregate, search, and organize products, reserve those products from a connected network of rated stores, and track the reservations through completion. Moreover, through the Internet, this device transforms into a mobile tool that can simultaneously communicate with the specific store's manager and staff member users, the system's database, and the store's on-site workstation.

Block 9514 depicts the Jane Customer App, which enables the device to provide functions to the customer such as profile personalization, document upload, content customization, content search, store comparisons, favorite products and stores, cart building, reservation request, store contact, reschedule acceptance or denial, reservation tracking, notification management, and reservation review. Note that the customer may log in or out of the platform at any time. Upon signing in, the Jane Customer App serves as the portal through which the customer can access and participate within the system.

When the customer connects to the Jane Customer App on her Internet-capable device, she thus connects through the Internet to the platform's API in Block 9542 and accesses necessary data via the Jane Database detailed in Shape 9544. In doing so, the customer is provided real-time access to an individual store's menu items. The Jane Customer App is unique in the sense that it allows the customer to search and request from an aggregated listing of menu items across multiple store locations in real-time, and connect to store managers and staff members on a single platform. Also, the customer can build a cart and request a reservation that can be tracked and acted on from multiple parties across multiple devices. Moreover, the Jane Customer App creates a unique mobile marketplace, whereby the reviews associated with each retail store location are aggregated on a per-transaction basis, encouraging more accurate ratings rooted in consistent performance over time. Through the Jane Customer App, the store and its management can optimize staff efficiency, reduce lines, track inventory, and access more customers.

Oval 9502 shows the store's staff member, who utilizes the platform for such functions as profile customization, customer verification, inventory review, reservation preparation, fulfilling reservations (delivery or in-store pickup), updating reservation status, contacting store managers or customers, and customer identification confirmation. Note that when the staff member logs out of the platform, he is no longer available and cannot participate within the system, where the staff member is the store's responsible party. He receives the reservation assignment and executes accordingly, and in doing so, the staff member symbolizes the physical and virtual bridge between the customer and the store itself. The platform provides the staff member with the unique ability to communicate directly with the customer in real-time via connected platforms, fulfill assigned reservations, provide status updates to the store manager and customer for ongoing reservation activity, track ongoing and completed reservations, and verify customer identification.

Block 9518 represents the staff member's Internet-capable device, upon which the Jane Store App (Block 9520) operates, and upon which the platform's notifications appear and where email/text message/phone calls may occur. The device connects the staff member to the Jane Store App, and once connected, his inputs will be shared throughout the parts of the system via the Internet. For example, the staff member can access the Jane Database through the platform on his device. In doing so, he can access any assigned reservation to verify such data as the customer's cart items, identification documents, and membership status. Upon utilization of the platform, the device becomes a unique tool for the store manager by transforming it into a tool that can verify inventory, communicate to management and customers, update the status of ongoing reservations, verify customer information, and track all ongoing and completed assigned reservations. Moreover, through the Internet, this device transforms into a mobile tool that can simultaneously communicate with customer and staff member users, the system's database, and the store's on-site workstation.

Block 9520 represents the Jane Store App, which enables the device to provide functions to the staff member such as profile customization, customer verification, inventory review, reservation preparation, fulfilling reservations (delivery or in-store pickup), updating reservation status, contacting store managers or customers, and customer identification confirmation. Note that the staff member may log in or out of the platform at any time, portraying his availability accordingly to his manager via the platform. Upon signing in, the Jane Store App serves as the portal through which the staff member can access and participate within the system. When the staff member connects to the Jane Store App on his Internet-capable device, he thus connects through the Internet to the platform's API in Block 9542 (via the cloud server in Block 9540) and accesses necessary data via the Jane Database detailed in Shape 9544. As it relates to the store manager, the Jane Customer App is unique in the sense that it allows staff members to serve as the connection between the physical customer, through the virtual system, and the physical store. Also, provides the staff member with the unique ability to verify inventory, update reservation status in real-time, communicate directly with the customer, verify customer documentation, and review ongoing and completed assigned reservations—all from a single mobile platform. Through the Jane Customer App, the store and its staff members can optimize task efficiency, reduce lines, track inventory, and communicate with more customers.

Oval 9546 depicts the store's ownership (the client), who utilizes the platform for such functions as adding new users (store managers and staff members), showcasing or hiding certain products, monitoring ongoing or completed reservations, and managing other general store information. Note that when the client logs out of the platform, she is no longer available and cannot participate within the system. Also note that unlike the managers and staff members, the client is not directly involved in the store-to-customer interaction. Instead, she assumes more of a supervisory role with access throughout the entire store(s) ongoing and completed history of reservations. Via the platform, she will be able to know which specific manager and staff member was involved in each reservation, and furthermore, be able to link the specific customer review with them, as well. Not only does this platform provide the client with real-time data on all ongoing store operations and product inventory, but also it provides the client with historical data that will help inform future operations.

Block 9548 represents the client's Internet-capable device, upon which the Jane Store App (Block 9550) operates, and upon which the platform's notifications appear and where email/text message/phone calls may occur. The device connects the client to the Jane Store App, and once connected, her inputs will be shared throughout the parts of the system via the Internet. For example, the client can access the Jane Database through the platform on her device. In doing so, she can access any ongoing or completed reservation to verify such data as the customer's cart items, when the assigned staff member completed the reservation, and the customer's specific review and rating of that reservation. Upon utilization of the platform, the device becomes a unique tool for the client by transforming it into a tool that can manage the display of digital inventory, onboard new employees, monitor current store operations, and link specific customer ratings to specific menu items, managers, and staff members. Moreover, through the Internet, this device transforms into a mobile tool that can simultaneously monitor staff, fleet, and inventory operations across the entire store(s), while accessing the system's database and the store's on-site workstation in real-time.

Block 9550 represents the Jane Store App, which enables the device to provide functions to the client such as profile customization, adding new users (managers and staff members), managing inventory display, ongoing reservation monitoring, and completed reservation review. Note that the client may log in or out of the platform at any time. Upon signing in, the Jane Store App serves as the portal through which the client can access and participate within the system. When the client connects to the Jane Store App on her Internet-capable device, she thus connects through the Internet to the platform's API in Block 9542 (via the cloud server in Block 9540) and accesses necessary data via the Jane Database detailed in Shape 9544. As it relates to the client, the Jane Customer App is unique in the sense that it allows ownership to monitor all store operations in real-time, through the virtual system, and the physical store. Also, it provides the client to assign specific customer reviews with individual managers and staff members, learn patterns in individual customer shopping experience, analyze and compare store operations on an individual and aggregate level, and receive product data that will help inform future inventory operations—all from a single mobile platform. Through the Jane Customer App, the store and its ownership can monitor operations in real-time, easily onboard new employees, and compare historical performance by store or individual employee level.

Block 9522 represents suppliers of product (e.g., physical units), and is further depicted as individual suppliers in Blocks 9524 and 9526. A supplier can be a cultivator of cannabis product, a consumer packaged goods company, a product line owner, or even a large industry distributor. Suppliers are not specific users of the system, but the products they supply to stores become integrated into the system as soon as they have been processed onto the store's on-site workstation (Block 9528) containing the POS system (Block 9532). Once processed onto the POS system, the supplier's product information and location across stores are captured in the Jane database and made available to all users of the entire system via the Internet. This process is unique in the sense that it benefits suppliers. By being passively involved in the system, suppliers still have the ability to showcase the availability and information of their products in real-time to an aggregated network of customers across multiple Internet-capable devices.

Block 9528 depicts the store's on-site workstation, which hosts both the POS system (Block 9532) and the Jane POS Integration Service (Block 9530), and is used by the on-site store managers and staff members. By hosting the POS system, the workstation also contains (among other systems) the store's inventory management system, payment system, and customer management system. By also hosting the Jane POS Integration Service, the workstation possesses the ability to pull any necessary data from the POS system into the Jane API (Block 9542) and Database (Block 9544), and ultimately make that data available to all system users. This process is unique in the sense that the software can integrate with hardware in the store, while also simultaneously integrating with all other user devices in real-time. With this platform and through the on-site workstation, customers can view menu items in real-time, and store managers and staff members can validate inventory and customer information. By allowing the platform to plug into the on-site workstation, it essentially transforms it into a hub of data that continuously feeds directly into the system.

Block 9530 shows the Jane POS Integration Service, which actively connects the store's POS system located within the store to the Jane database, making the store's inventory items available to customers in real-time. Via the Internet, the Jane POS Integration Service exists within the store's server as the system's virtual bridge between the Jane API (Box 9542) and the Jane Database (Block 9544). This is unique in the sense that system software (the Jane POS Integration Service) located within store hardware (on-site workstation) can connect another piece of store hardware (POS system) to software (Jane Database) to be instantly displayed using software (Jane Customer and Store Apps) on multiple pieces of hardware (Internet-capable devices) simultaneously. In essence, the Jane POS Integration System takes inventory items in the physical store, and makes them available to system customers in a virtual store.

Block 9532 represents the store's point-of-sale (POS) system, which is operated by on-site store managers and staff members and located within the on-site workstation. Its functions include (among other things) the ability to record and track customer orders, process cash, credit and debit card transactions, connect to other systems in a network, and manage inventory. The POS system inventories items (Blocks 9534, 9536, and 9538) received from suppliers (Block 9522) and sends that information via the Internet and through the Jane POS Integration Service (Block 9530) to the API (9542) and ultimately the Jane Database (9544). This process of pulling items catalogued in the POS systems into the Jane Database is continuous, with updates occurring in real-time. In doing so, the platform transforms the POS system from just a piece of hardware located in the physical store to a hub and integrator of real-time menu items that are continuously uploaded onto the system and made available to all users at multiple locations simultaneously.

Block 9540 depicts the cloud server, which connects the Jane API (Block 9542) and the Jane Database (Block 9544) to the rest of the system and its Internet-connected devices. Note, the system could connect to multiple cloud servers in order to balance increased load requirements, thus making the system more flexible and scalable in real-time. By storing the API and database, the cloud server stores all shared data within the entire system, and allows for real-time connection to on-site workstations and user devices including mobile devices alike. Using the cloud server is unique in the sense that the system can grow infinitely and accommodate an innumerable number of stores and their data, while simultaneously accommodating an unlimited number of users and their data.

Block 9542 shows the Application Program Interface (API), which is contained within the cloud server (Block 9540) and specifies how the various software components should interact within the system. The API not only secures the Jane Database (Shape 9544) against unauthorized access, but also relays information between the database and the Store App (Blocks 9506 and 9520), the Customer App (Block 9514), and the POS Integration Service (Block 9530). Within this system, the API has the unique ability to pull information from various types of devices in various locations (e.g. on-site workstations within a store), aggregate that information into one operational repository, and simultaneously synchronize the flow of that information across multiple software platforms across the world (e.g. Jane Customer and Store Apps).

Shape 9544 depicts the Jane Database, which is secured within and connected to the rest of the system through the API (Block 9542). It stores the entire system's repository of information. It stores and continuously updates the store information from the on-site workstation (Block 9528), which is made possible by integrating the Jane POS Integration Service (Block 9530) and the POS system (Block 9532). It stores and continuously updates the customer information from the Jane Customer App (Block 9514) as well as the store manager and staff member information from the Jane Customer App (Blocks 9506 and 9520). In addition, the Jane Database stores information about individual items (Blocks 9534, 9536, 9538) within the store's inventory.

The Jane Database connects only to the API in order to remain secure and controlled by system administrators and may be hosted on multiple cloud servers to accommodate increased load inputs. The Jane Database is unique because of the information it collects, stores, and updates in real-time. The information originates from various devices operating in various languages across multiple locations, and the database is able to process that information into a single source of data upon which the entire system is built. This database collects customer information, store manager and staff member information, store information, and product information, and through the API, enables a seamless virtual interaction between a customer and a retail store.

As noted earlier, although our discussion of FIG. 95 has focused on a single location where delivery of the physical units occurs and a single customer, a single store manager, and a single store staff member, the system is actually applied to a large number of each of them simultaneously and in real-time with respect to a large number of requests and reservations.

Figure 96:
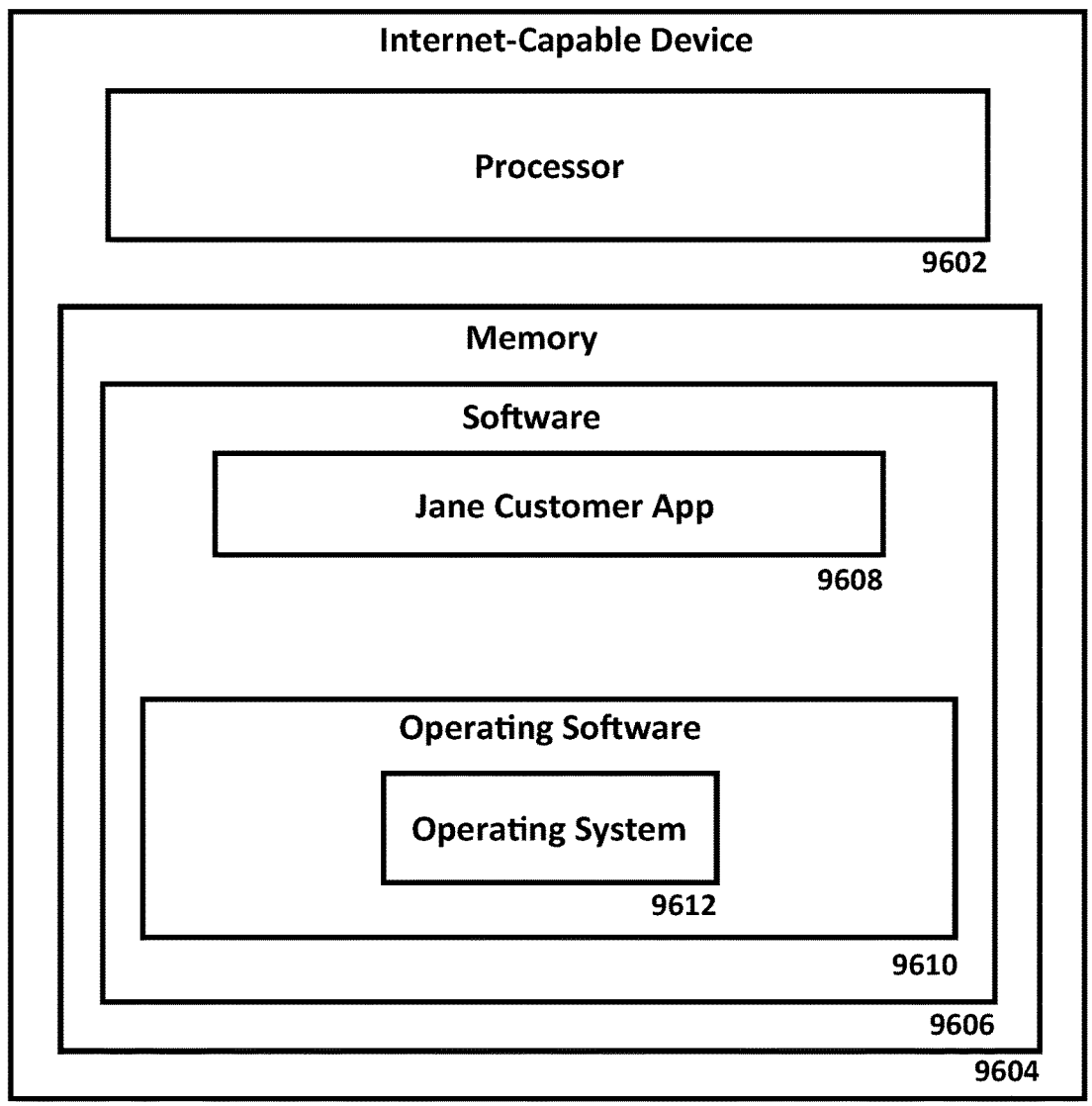

FIG. 96 depicts an Internet-capable device of the customer, which could be a personal computer, laptop, notebook, smartphone (iPhone, Android, etc.), tablet, or any other piece of hardware with the capability to connect to the Internet via Wi-Fi, cellular telephone system, or local area network (LAN), or in any other way. Within the Internet-capable device, Block 9602 depicts the processor, which executes instructions gathered from various programs, and Block 9604 represents the memory, which stores information for the processor. Within the memory, Block 9606 displays the software, which serves as the instructions from which the processor executes. Within the software, Block 9608 depicts the Jane Customer App, which is the application program specifically designed for the respective platform's end-user (the customer). Also within the software, Block 9610 represents the operating software, which manages the device's hardware and software resources and provides common services for computer programs. Lastly, within the operating software, there exists the operating system in Block 9612, which supports the device's basic functions, such as scheduling tasks, executing applications, and controlling peripherals.

Figure 97:
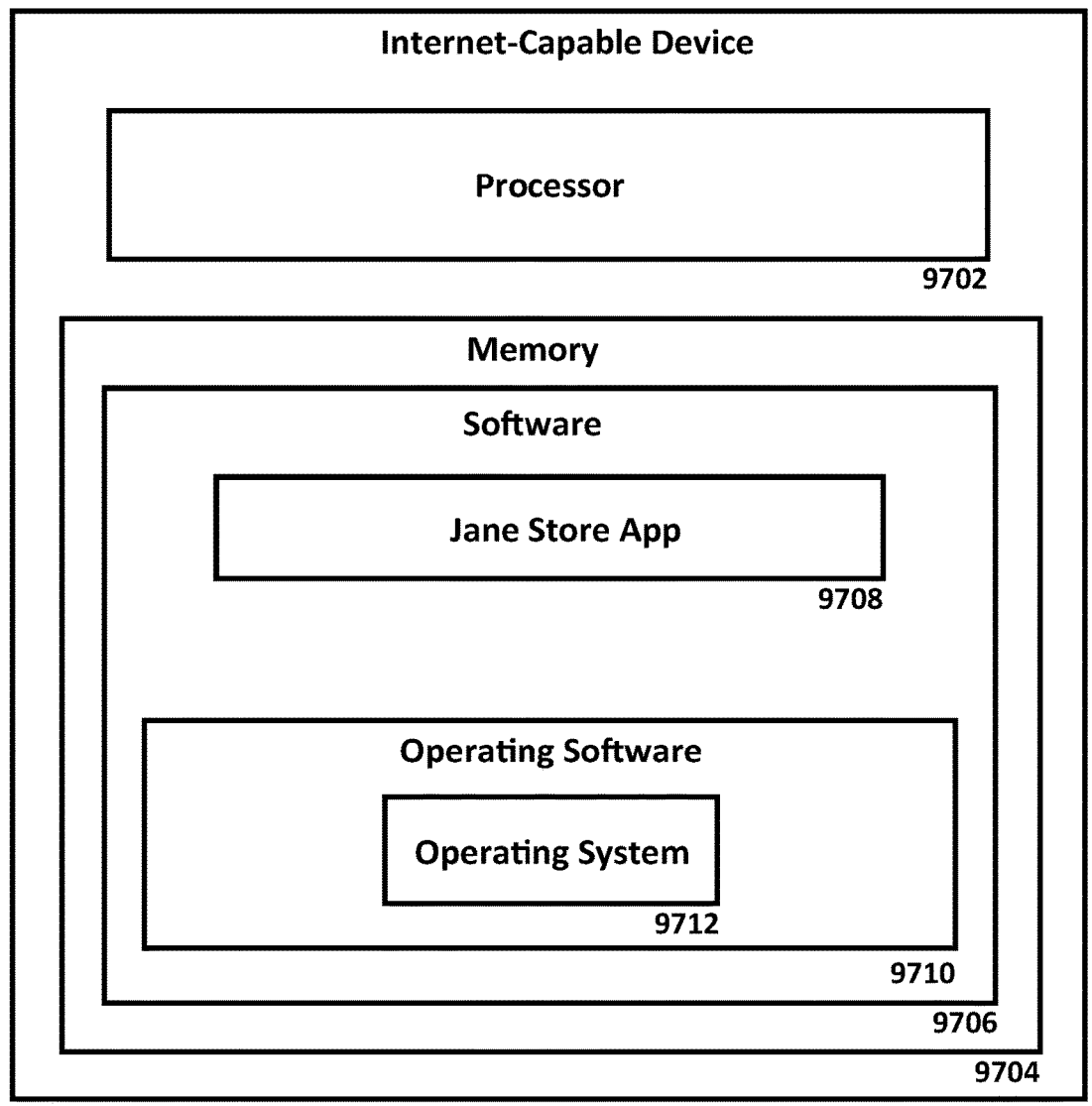

FIG. 97 depicts an Internet-capable device of the store's manager or staff member, which could be a personal computer, notebook, laptop, smartphone (iPhone, Android, etc.), tablet, or any other any other piece of hardware with the capability to connect to the Internet via Wi-Fi, cellular telephone system, or LAN, or in any other way. Within the Internet-capable device, Block 9702 depicts the processor, which executes instructions gathered from various programs, and Block 9704 represents the memory, which stores information for the processor. Within the memory, Block 9706 displays the software, which serves as the instructions from which the processor executes. Within the software, Block 9708 depicts the Jane Store App, which is the application program specifically designed for the respective platform's end-user (the store manager or staff member). Also within the software, Block 9710 represents the operating software, which manages the device's hardware and software resources and provides common services for computer programs. Lastly, within the operating software, there exists the operating system in Block 9712, which supports the device's basic functions, such as scheduling tasks, executing applications, and controlling peripherals.

Figure 98:
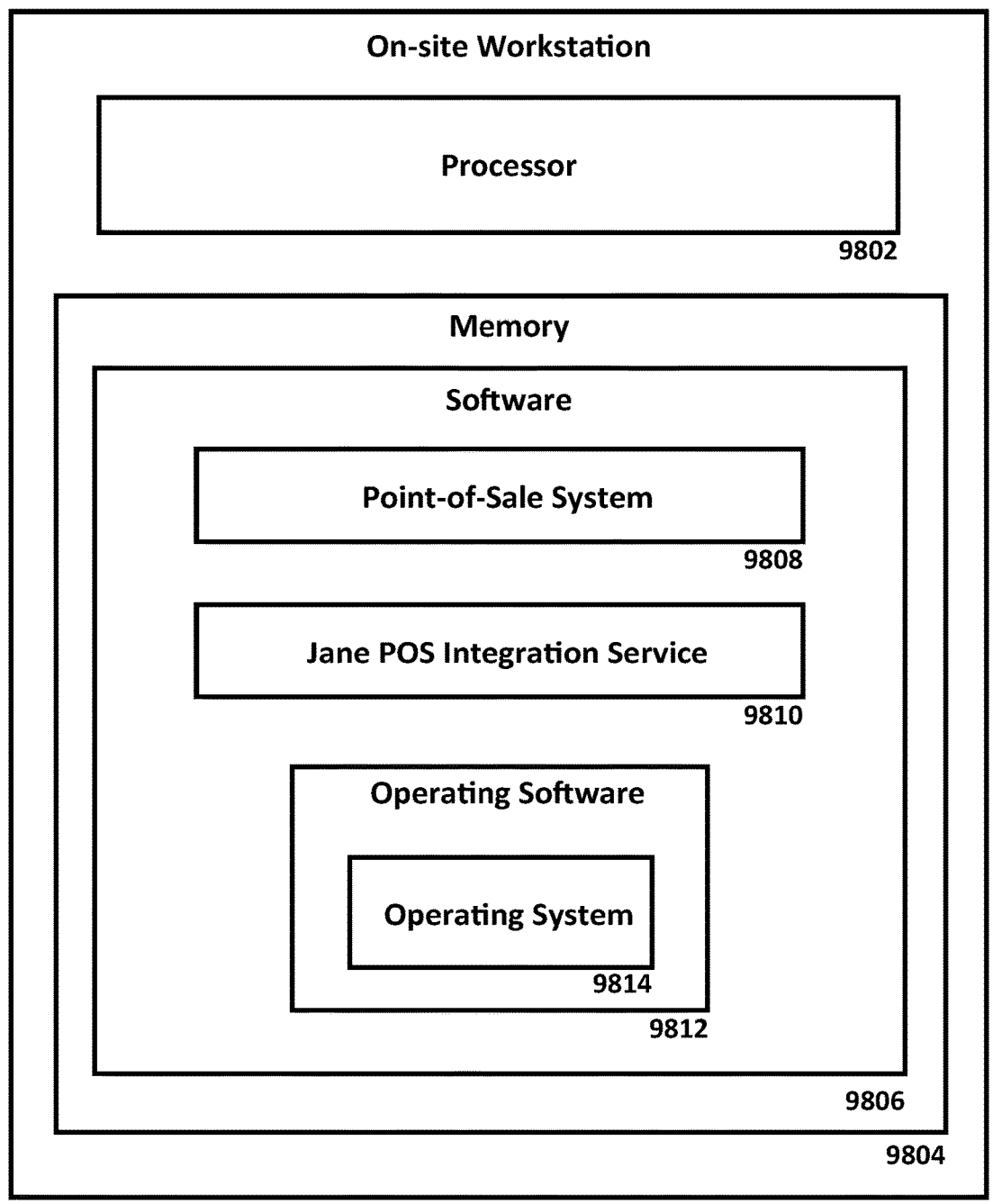

FIG. 98 depicts a store's on-site workstation, which could be a personal computer, laptop, notebook, smartphone (iPhone, Android, etc.), tablet, or any other piece of hardware with the capability to connect to the Internet via Wi-Fi, cellular telephone system, or LAN, or in any other way. Within the on-site workstation, Block 9802 depicts the processor, which executes instructions gathered from various programs, and Block 9804 represents the memory, which stores information for the processor. Within the memory, Block 9806 displays the software, which serves as the instructions from which the processor executes. Within the software, Block 9808 represents the point-of-sale (POS) system, which can include (among other things) the ability to record and track customer orders, process cash, credit and debit card transactions, connect to other systems in a network, and manage inventory. Continuing within the software, Block 9810 depicts the Jane POS Integration Service, which links together different computing systems (e.g. Internet capable device, on-site workstation, POS system portal) and software applications (e.g., Jane Customer App, Jane Store App, Jane Application Program Interface) physically or functionally, to act as a coordinated whole. Also within the software, Block 9812 represents the operating software, which manages the workstation's hardware and software resources and provides common services for computer programs. Lastly, within the operating software, there exists the operating system in Block 9814, which supports the workstation's basic functions, such as scheduling tasks, executing applications, and controlling peripherals.

FIG. 99 depicts the cloud server, which is a logical server that is built, hosted and delivered through a cloud computing platform over the Internet via LAN. Cloud servers possess and exhibit similar capabilities and functionality to a typical server, but are accessed remotely from a cloud service provider. Within the cloud server, Block 9902 depicts the processor, which executes instructions gathered from various programs, and Block 9904 represents the Jane Database, which is described in detail within FIG. 100.

All of the devices illustrated in FIGS. 96 through 99 have a variety of other capabilities, most notably the ability to communicate over the Internet to implement the functions that we have described in the system.

Figure 100B:
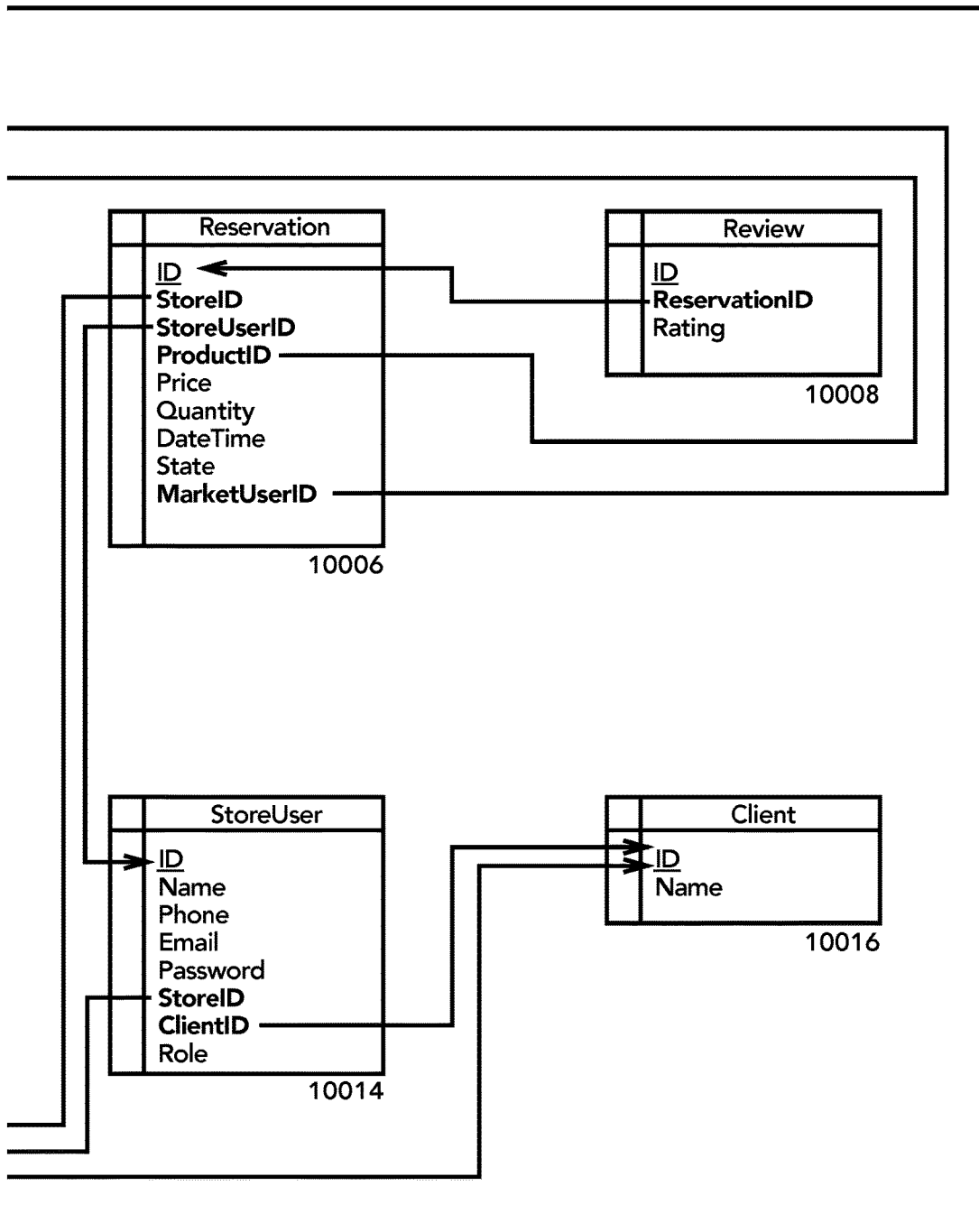

Within the database illustrated in the FIG. 100, the Product table, as depicted in Block 10002, contains the following rows—ID: the globally unique ID number in the Jane system (integer), Name: the name of the product (string), Category: the product type (i.e. Flower, Edible, etc.) (string), Description: the product description (string), Percent CBD: percent chemical CBD (optional only for category Flower) (float), Flavors: the product flavor (optional only for category Flower) (multiple strings), Effects: the product effects (optional only for category Flower) (multiple strings), Parents: the product's Parents (optional only for category Flower) (Product IDs) (multiple integers), and Photos: array of photos associated with the product (string urls). The Product table is referenced by the other tables within the Jane Database using the Product "ID." Within the MarketUser table (to be described later in Block 10004), the customer's Favorites references the specific IDs of that customer's favorited products. Within the Reservation table (to be described later in Block 10006), the reservation references a Product by ID for a Product included in the reservation. Within the Menu table (to be described later in Block 10012), references a Product by ID for a Product included in the menu. Note, the Product table makes no outside references.

Continuing within FIG. 100, the MarketUser table, as depicted in Block 10004, contains all users (i.e., the customers) registered in the Jane Customer App and the following rows of information for each user—ID: the globally unique ID number in Jane (integer), Nickname: the unique nickname of the user in Jane (string), Address: the user's address for delivery (string), Phone: the user's phone number (string), Email: the user's email address (string), Password: the user's encrypted password (encrypted string), Documents: an array of the user's documents (string urls), and Favorites: the user's favorite Product IDs (integer). The MarketUser table is referenced by other tables within the Jane Database using the MarketUser "ID." Within the Store table (to be described later in Block 10010), the store Members are reference by the specific users ID. Within the Reservation table (to be described later in Block 10006), the reservation references the user's ID for the user associated with a reservation. The MarketUser table references the Product table (ID), in which the user's Favorites references the specific IDs of the user's Favorite Products.

Further within FIG. 100, the Reservation table, as depicted in Block 10006, contains all reservations in the Jane Customer App and Jane Store App, as well as the following rows of information for each Reservation—ID: the globally unique ID number in Jane (integer), MarketUserID: the ID of the MarketUser associated with the reservation (integer), StoreID: the ID of the Store associated with the reservation (integer), StoreUserID: the ID of the StoreUser associated with the reservation (integer), ProductID: the ID of the Product associated with the reservation (integer), Price: the price of the Product associated with the reservation (float), Quantity: the quantity of the Product associated with the reservation (float), DateTime: the date and time of the reservation (datetime), and State: the current state of the reservation (preparing, completed, etc.)(string). The Reservation table is referenced by one table within the Jane Database using the Reservation "ID." Within the Review table (to be described later in Block 10008), the Review references the specific Reservation ID. The Reservation table references various tables within the Jane database. It references the MarketUser (ID), which is the user associated with the reservation, the Store (ID), which is the store associated with the reservation, the StoreUser (ID), which is the store user associated with the reservation, and the Product (ID), which is the product associated with the reservation.

Continuing within FIG. 100, the Review table, as depicted in Block 10008, contains all reviews of physical units associated with reservation made in the Jane Customer App and the following rows of information for each Review—ID: the unique ID number in Jane (integer), ReservationID: the ID of the reservation associated with the review (integer), and Rating: the rating associated with the review (float). Note, the Review table is not referenced by any other table. The Review table references the Reservation table (ID), which is the reservation associated with the review.

Further within FIG. 100, the Store table, as depicted in Block 10010, contains all stores existing in the Jane Market and Store App and the following rows of information for each Store—ID: the unique ID number in Jane (integer), Name: the name of the store (string), Type: the type of the store (medical or recreational) (string), Address: the store address (string), State: the store US state (string), Zip: the store zip code (string), Phone: the store phone number (string), Hours: an array of store hours (string), Rating: the current rating of the store (float), Picture: a picture for the store logo (string url), Options: an array of options (delivery, pickup, etc.) (string), Members: an array of MarketUser IDs for users that are members of the store (integer), and ClientID: the ID of the Client associated with the Store (integer). The Store table is referenced by three tables within the Jane Database using the Store "ID." Within the Reservation table (Block 10006), the reservation references the specific Store ID. Within the StoreUser table (Block 10014), the StoreUser is associated with a specific Store ID. Within the Menu table (Block 10012), the menu is associated with a specific Store ID. The Store table references the Client table (ID), which is the client user associated with the Store, and the MarketUser table (ID), which is the MarketUser on the members list.

Also within FIG. 100, the Menu table, as depicted in Block 10012, contains all menu items for all stores for use by the Jane Customer App and Jane Store App as well as the following rows of information for each Menu item—ID: the unique ID number in Jane (integer), StoreID: the ID of the Store associated with the menu item (integer), ProductID: the ID of the Product associated with the menu item (integer), Amount: the amount of the menu item (1 Gram, ⅛ Ounce, etc.) (string), Price: the price of the menu item (float), Availability: a boolean representing whether or not the product is available (boolean), and Popular: a boolean representing whether or not the product is popular (boolean). Note that the Menu table is not referenced by any other table, though it does reference the Store table (ID), which is the Store associated with this menu item, as well as the Product table (ID), which is the product associated with this menu item.

Within FIG. 100, the StoreUser table, as depicted in Block 10014, contains all StoreUsers for all stores in the Jane Customer App and Jane Store App and the following rows of information for each StoreUser—ID: the unique ID number in Jane (integer), Name: the name of the StoreUser (string), Phone: the phone number of the StoreUser (string), Email: the email address of the StoreUser (string), Password: the StoreUser's encrypted password (encrypted string), StoreID: the ID of the Store associated with the StoreUser (integer), the ClientID: the ID of the Client associated with the Store (integer), and Role: the role of the StoreUser (manager or staff) (string). The StoreUser table is referenced by the Reservation table (Block 10006), as the reservation references the specific StoreUser ID. Also, the StoreTable references the Client table (ID), which is the client user associated with the StoreUser, and the Store table (ID), which is the store associated with the StoreUser.

Lastly, within FIG. 100, the Client table, as depicted in Block 10016, contains all Clients for all stores in the Jane Customer App and Jane Store App and the following rows of information for each Client—ID: the unique ID number in Jane (integer) and Name: the name of the Client (string). The Client table is referenced by the Store table (Block 10010), as the Store references a specific Client ID, and also referenced by the StoreUser table (Block 10014), as the StoreUser is associated with a specific ClientID.

With reference back to the cloud server within FIG. 99, the memory as depicted in Block 9906 stores information for the processor. Within the memory, Block 9908 represents the software, which serves as the instructions from which the processor executes. Within the software, there exists many modules.

The Reservation Platform, as shown in Block 9910, serves many functions. For a particular reservation, the MarketUser (the customer) can add/remove/edit an item, request the method (delivery or pickup, request the time, request the delivery address (for delivery only), add a message, and provide a review. Also within the Reservation Platform, the StoreUser (the store's manager and staff member) can accept/reject/edit the reservation, assign the reservation to another StoreUser, and change the state of StoreUser. The inputs to the Reservation Platform are the MarketUser, product(s), amount, store, method, message, time, and StoreUser, while the only output is the review.

Additionally, the Reservation Platform has many key relationships to other software modules. It relates to the Personalization Module (described later in Block 9916), aggregating the correct information about the marketUser. The Reservation Platform relates to both the Store Platform (Block 9918) and Product Platform (Block 9920), aggregating the correct information about the Store and requested Products. Additionally, it relates to both the Staff Management (Block 9928) and Inventory Management (Block 9930) modules, assigning the reservation to the correct StoreUser and insuring the requested items are in inventory.

Lastly, the Reservation Platform relates to the Review Module (Block 9922), attaching a review to the corresponding reservation.

Another module that exists within the software is Content Management, as defined by Block 9912, which allows the addition, removal, or editing of Product variables, Store variables, or Collection variables. The inputs to Content Management are a Product, Store, or Collection, or Product, Store, or Collection variables. The outputs are the updated/added Product, Store, or Collection or the confirmation that the Product, Store, or Collection was removed. Content Management has two key relationships with other modules within the software. It relates to the Product Platform (Block 9920), allowing the addition, removal, or editing of Products and Product variables. Content Management also relates to the Store Platform (Block 9918), allowing the addition, removal, or editing of Stores and Store variables.

Also within the software is the Dashboard Module, as defined by Block 9914, which displays the home screen of the Jane Customer App. While there are no inputs to the Dashboard Module, its outputs are Popular Products (randomized), Popular Collections (randomized), and Products (randomized). The Dashboard Module has a key relationship with both the Content Management (Block 9912) and Product Platform (9920), aggregating information to display on the home screen of the Jane Customer App.

Continuing within the software, Block 9916 depicts the Personalization Module, which allows the MarketUser to add, edit, or remove user information. Its only input is a MarketUser variable, while its output is the updated/added/removed variable. Furthermore, the Personalization Module has two key relationships. First, it relates to both the Store Platform (Block 9918) and the Product Platform (9920), allowing users to Favorite a Store or Product as well as become a Member of a Store. Second, the Personalization Module relates to the Review Module (Block 9922) by associating a review with a user's personalized information.

Block 9918 represents the Store Platform, which exists within the software and allows the Store to add, edit, or remove store information. Its inputs are Store variables, products, MarketUsers, and StoreUsers, while its outputs are the updated/added/removed store variables, products, MarketUsers, and StoreUsers. Note, the Store Platform has many key relationships to other software modules. It relates to Content Management (Block 9912) by aggregating information about the Store that resides in Content Management. It relates to Review Module (Block 9922) by aggregating rating in reviews for the Store rating. The Store Platform relates to Personalization Module (Block 9916) by adding MarketUsers to Members list, and it relates to Product Platform (Block 9920) by adding Products to Store Menu. Also, it relates to Staff Management (Block 9928) by aggregating information about the StoreUsers that reside in Staff Management. Finally, the Store Platform relates to Inventory Management (Block 9930) by updating the Store Menu based on the Inventory Management updates.

Continuing within the software, Block 9920 shows the Product Platform, which enables the addition, removal, or editing of Products and Product variables. Its inputs are a Product or Product variables, while it outputs are the added, removed, or edited Products or Product variables. The Product Platform has two key relationships. First, it relates to Content Management (Block 9912) by aggregating information about the Product that resides within the Content Management module. Second, the Product Platform relates to the Store Platform (Block 9918) by aggregating the list of Stores in which the Product is available and popular.

Also within the software is the Review Module, depicted in Block 9922, which allows the addition or removal of the review. Its only input is the review, while its only output is the review. The Product Platform has two key relationships. First, it relates to both the Product Platform (Block 9920) and the Store Platform (Block 9918) by storing Product and Store information in the review. Second, it relates to the Personalization Module (Block 9916) by aggregating information of the MarketUser to display within the review.

Block 9924 shows the Suggestion Engine (Block 9924), which searches, sorts, and filters a Product list based on Product Effects. Its input is the list of desired Effects and their importance in the suggestion search, while it output is the sorted list of Products. The Suggestion Engine relates to the Product Platform (Block 9920) by aggregating all Products in order to search, sort, and filter based on desired effects.

Continuing within the software, Block 9926 represents the Search Engine, which searches for Products or Stores. Its inputs are the product or Store options and a search string, while its outputs are the matching Products or Stores. The Search Engine relates to both the Product Platform (9920) and the Store Platform (Block 9918) by aggregating all Products/Stores in order to search and filter based on desired options and search string.

Block 9928 depicts the Staff Management module, which allows StoreUser to assign the reservation to another StoreUser. Its inputs are StoreUser and reservation, while its outputs are either True or False based on StoreUser's response. The Staff Management module relates to the Store Platform (Block 9918) by aggregating available StoreUsers that can be managed.

The last module described within the software is Inventory Management, shown in Block 9930, which allows for the addition, removal, or editing of Menu Items and their variables. Its inputs are the Menu item or menu item variables, while its outputs are the updated/added/edited menu item. Inventory Management has two key relationships with other modules within the software. First, it relates to Product Platform (Block 9920) by aggregating product information and relating it to the on-site Inventory System. Second, it relates to the Store Platform (Block 9918) by updating necessary Store Menu items.

Finally continuing within the software, Block 9932 represents the operating software, which manages the device's hardware and software resources and provides common services for computer programs. Lastly, within the operating software, the operating system in Block 9934 supports the device's basic functions, such as scheduling tasks, executing applications, and controlling peripherals.

Many of the functions of the system are managed, supervised, reviewed, altered, and observed by the various kinds of users through user interfaces displayed on the devices that we have been describing. The user interfaces also provide the opportunity for the users to navigate information and to provide inputs. Here we describe the features and flow of example screenshots of mobile devices running the Jane Store App and the Jane Customer App. These are only examples, and, of course, a wide variety of other user interfaces could be provided.

FIGS. 2 through 94 and 101 through 121 show three groups of thumbnails of the platform's actual page content. FIG. 1 provides a key to some of the markings on the figures. Each of the groups relate to pages seen by a particular type of user. The four types of users and their roles in Jane's operation are as follows:

Customer: reserves items from a store. This user's role is to discover products, compare stores, and reserve products from a selected store.

Manager: an employee of a store. This user's role is to verify the reservation details, and assign the reservation to be fulfilled by a store's staff member.

Staff: an employee of a store. This user's role is to prepare the requested items and complete the reservation.

Client: an owner of a store (or multiple stores). This user's role is to invite new employees to the platform and monitor ongoing and completed reservations.

Customer Page. The flow through the customer page begins with a sequence of pages that qualify the user in the following ways. The page thumbnail 10 allows the user to verify that age requirements are met, and then proceeds to the page thumbnail 12, which provides a notice to the user about access confirmation based on location. Once the user agrees to allow geo-location services in page thumbnail 14, the user's current position is displayed in page thumbnail 16. After the user acknowledges possession of any required certifications, the flow then proceeds to page thumbnail 18, which permits the user to enter the Jane platform by selecting a specific user role.

Upon entering the platform, the user begins on page thumbnail 22, which showcases a selection of available physical items and provides the ability for various methods of product discovery (that is, of discovering other available physical units). Once a user selects a specific item, the flow then proceeds to page thumbnail 36, which provides a description of that specific item and the number of stores (locations or places) in which the item is currently available. After selecting to search for those stores, the user proceeds to page thumbnail 42, where a map and corresponding list of the respective stores is provided and can be organized by individual needs and criteria. After deciding to reserve the item from a specific store and confirming the quantity desired, the user then proceeds to page thumbnail 68. There, the user can edit the items requested, continue shopping, or proceed with a checkout process.

Upon proceeding with the checkout process, the flow continues to page thumbnail 74, where the user provides the required (as well as optional) information necessary for the reservation (that is, to reserve the selected units to be picked up at or delivered by the selected store). Note, the user can also provide and set as default some of this information on their profile page. Once the information is provided, the user requests the reservation from the store, and then proceeds to page thumbnail 80, which allows the user to track the ongoing status of the reservation. Note that the user will have the ability to cancel the reservation only before the receiving store has accepted and assigned the reservation to a staff member. Once the reservation has been assigned to a staff member, the user will no longer have the ability to cancel the reservation request on the Jane platform.

Manager Page. After a customer requests a reservation from a specific store, the flow through the store manager page begins on page thumbnail 122, which displays all incoming reservations that have not yet been assigned to a staff member. Once a specific reservation is selected, the flow proceeds to page thumbnail 124, which allows the manager user to review the reservation information in detail, contact the customer directly, or request to reschedule the reservation time window. If the manager user decides to cancel the reservation as depicted on page thumbnail 126, the customer will be notified accordingly and the flow will end. If the user chooses to assign the reservation to an available staff member, the flow proceeds to page thumbnail 146, where the store's available staff members and the number of their assigned reservations are displayed. After a staff member has been selected and assigned the reservation, the user proceeds to page thumbnail 148, where the option to un-assign the reservation is now made available and continues to be available throughout the duration of the reservation process. At the same time, the respective staff member is notified of the assignment, and the corresponding customer page is updated as depicted on page thumbnail 96.

Staff Member Page. After the store's manager assigns a reservation, the flow continues through the store's staff member page and begins on page thumbnail 176. There, the staff member user can view only the reservations that have been assigned to him or her. When a user selects an ongoing reservation in the queue, the flow proceeds to page thumbnail 188, where the user can review the reservation information in detail. After the items have been prepared by the staff member, the user can update the status of the notification as depicted on page thumbnail 180/182, which then will automatically update the reservation status on the corresponding customer page as depicted on page thumbnail 98. Also note that the status of the reservation automatically synchs with the corresponding staff member inputs, as depicted on page thumbnail 130. Once the reservation is completed, the user updates the status as depicted on page thumbnail 184/186, causing the corresponding customer page to update as depicted on page thumbnail 100. The flow then continues to the customer page, where the customer user must rate the overall reservation experience. Once inputted by the user, the customer's rating is recorded as depicted on page thumbnail 102, as well as on all corresponding manager and staff member pages.

Customer user. The customer user begins on page thumbnail 10, which is shown in FIG. 2. As shown in detail in FIG. 2, the user confirms that she meets the requirements to enter the app by activating the button 202. The user then moves to page thumbnail 12, and as shown in corresponding FIG. 3, the user is prompted to verify her location via button 302. Before her location is verified, the user is prompted to allow geo-location services within the platform, as shown in page thumbnail 14, and further described in detail in FIG. 4. As referenced in FIG. 4, the user can either deny or allow the geo-location services, as shown on buttons 402 and 404, respectively. If the user chooses to deny geo-location services, the platform will be unable to locate the user's location and limit her access. If the user chooses to allow geo-location services, her location will be identified, and the state in which she is physically present will be depicted, as shown on page thumbnail 16, and described in further detail in FIG. 5.

As shown in detail in FIG. 5, the user is presented with two options. Button 502 allows the user to confirm that she has the required medical documentation (that is, required proof that she is authorized to buy and use the physical units that are the subject of her order, in accordance with governmental regulations). Button 504 allows the user to confirm that she is not in possession of such documentation. If the user invokes button 504, the platform will not provide her access to content that would otherwise require the necessary documentation. If the user, however, selects button 502 and confirms accordingly, the corresponding content would then be made available to her on the platform. Either selection of button 502 or 504 will take the user to page thumbnail 18, which is shown in FIG. 6. As shown in detail in FIG. 6, the user can select one of the three options. Link 606 would allow the user to continue without providing any information, but with limited access to content that would otherwise be made available to a registered user. If the user selects button 602, she will be prompted to provide the following information and become a registered user on the platform: username, email, phone number, and password. If the user selects button 604, the flow progresses to page thumbnail 20, and depicted in FIG. 7.

Within FIG. 7, the user has the ability to revert back to page thumbnail 18 by invoking link 702. If she has forgotten her password, she can access panel 708 and be provided the opportunity to retrieve it. Otherwise, when the user provides her username and password as depicted in text fields 704 and 706, and after she chooses to log into the platform via button 710, the user enters the platform and begins on page thumbnail 22, which is shown in FIG. 8.

Figure 9:
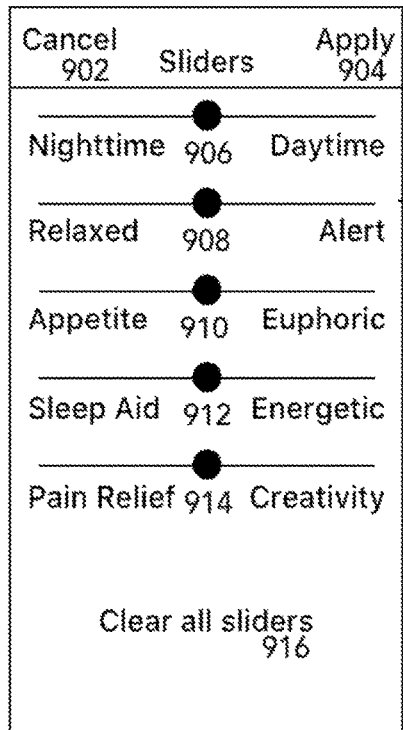
Figure 10:
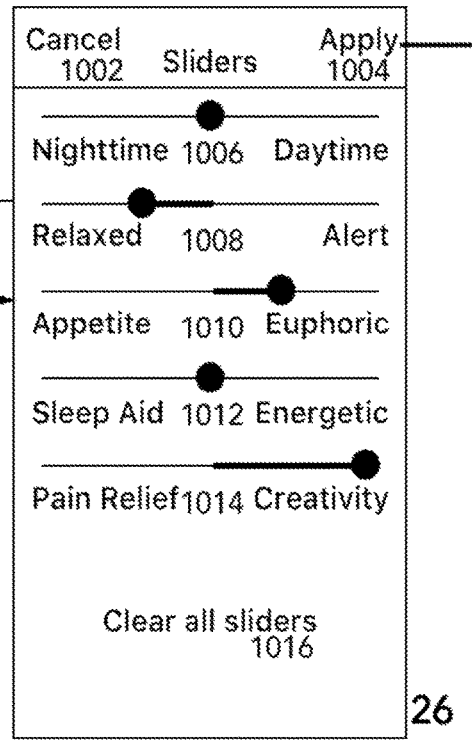
Figure 13:
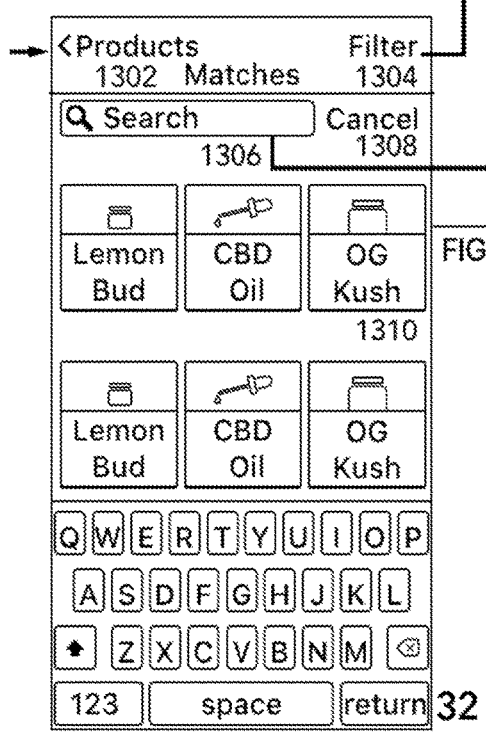
Figure 14:
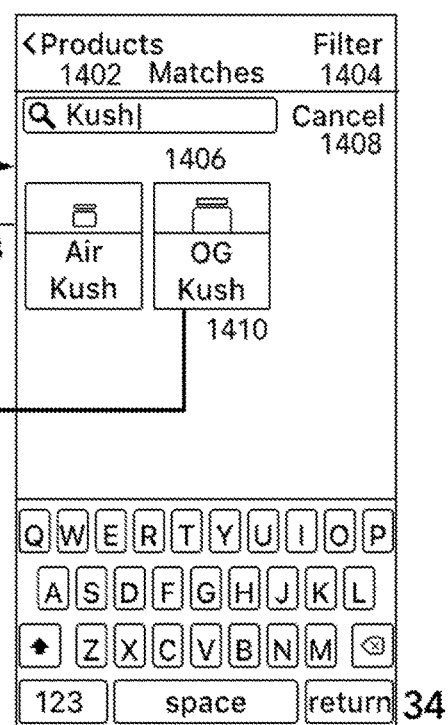

As shown in detail in FIG. 8, the user is presented with several panels. The top text field 802 allows the user to search for a specific product by name, while button 804 can be invoked to navigate to page thumbnails 24 and 26, as shown in FIGS. 9 and 10 respectively. With reference to FIG. 10, the user can manipulate the sliders as shown on buttons 1006, 1008, 1010, 1012, and 1014, and apply those settings to her product search by accessing link 1004. Upon doing so, the user is directed to page thumbnail 32, which serves as a landing page upon which a more refined search may be conducted, as depicted in detail in FIG. 13. There, the user may select a specific item 1310, filter the product search to meet specified parameters 1304, or search by product name 1306. Searching the product by name will dynamically update the displayed items to match the user inputs, as displayed on page thumbnail 34 and in detail in FIG. 14, where user options are consistent with those described in FIG. 13. If the user selects to filter the product search 1304, the user is directed to page thumbnail 196, as described in detail in FIG. 101.

Figure 101:
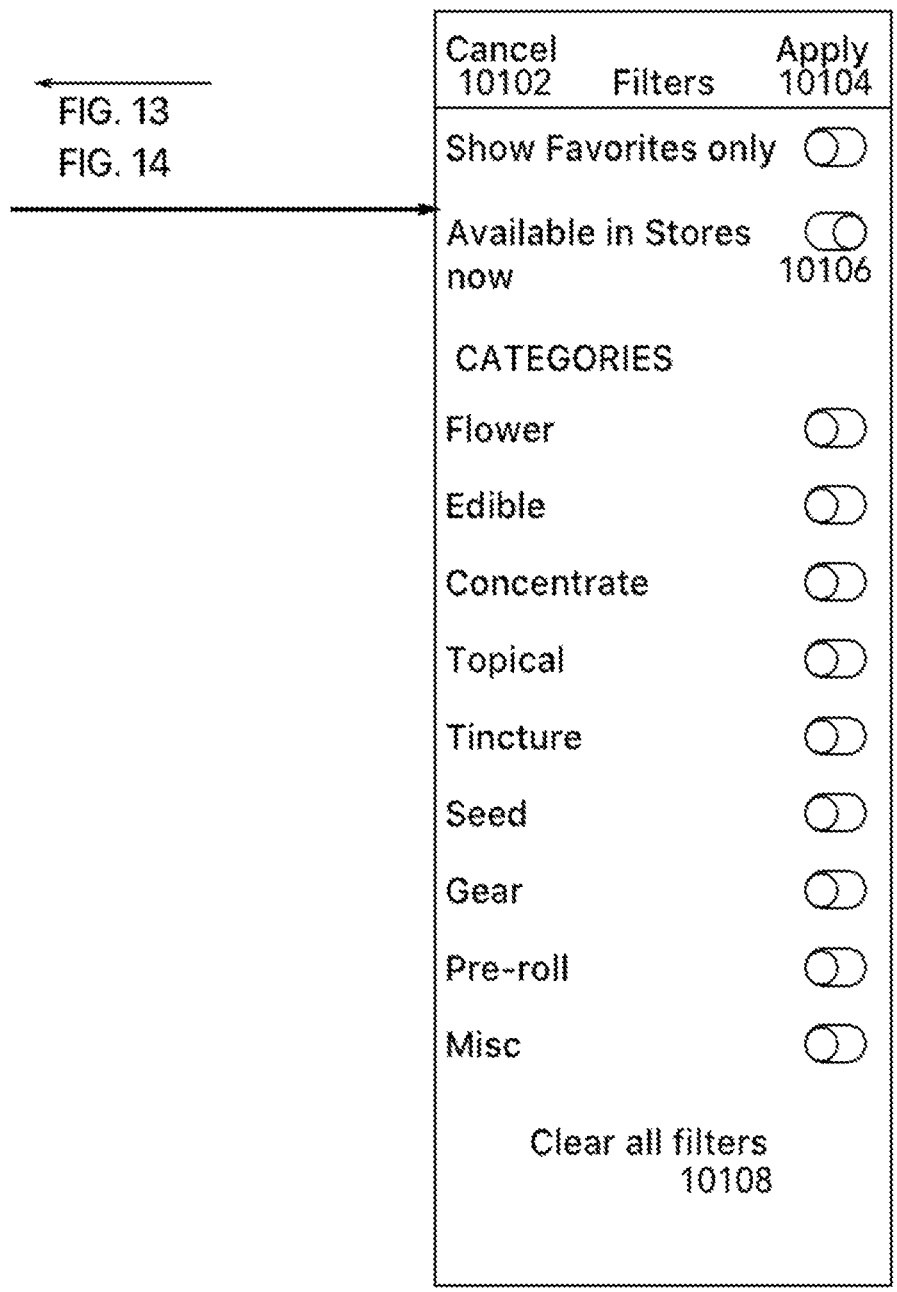

Within FIG. 101, the default setting is set to "ON" via toggle 10106, enabling the user to see only items that are currently in store inventory. The user can select any or all product filters (e.g. Edible, Tincture, etc.), and either apply such filters via button 10104 or clear all filters via button 10108. Note that the user can also cancel the action via button 10102

Figure 11:
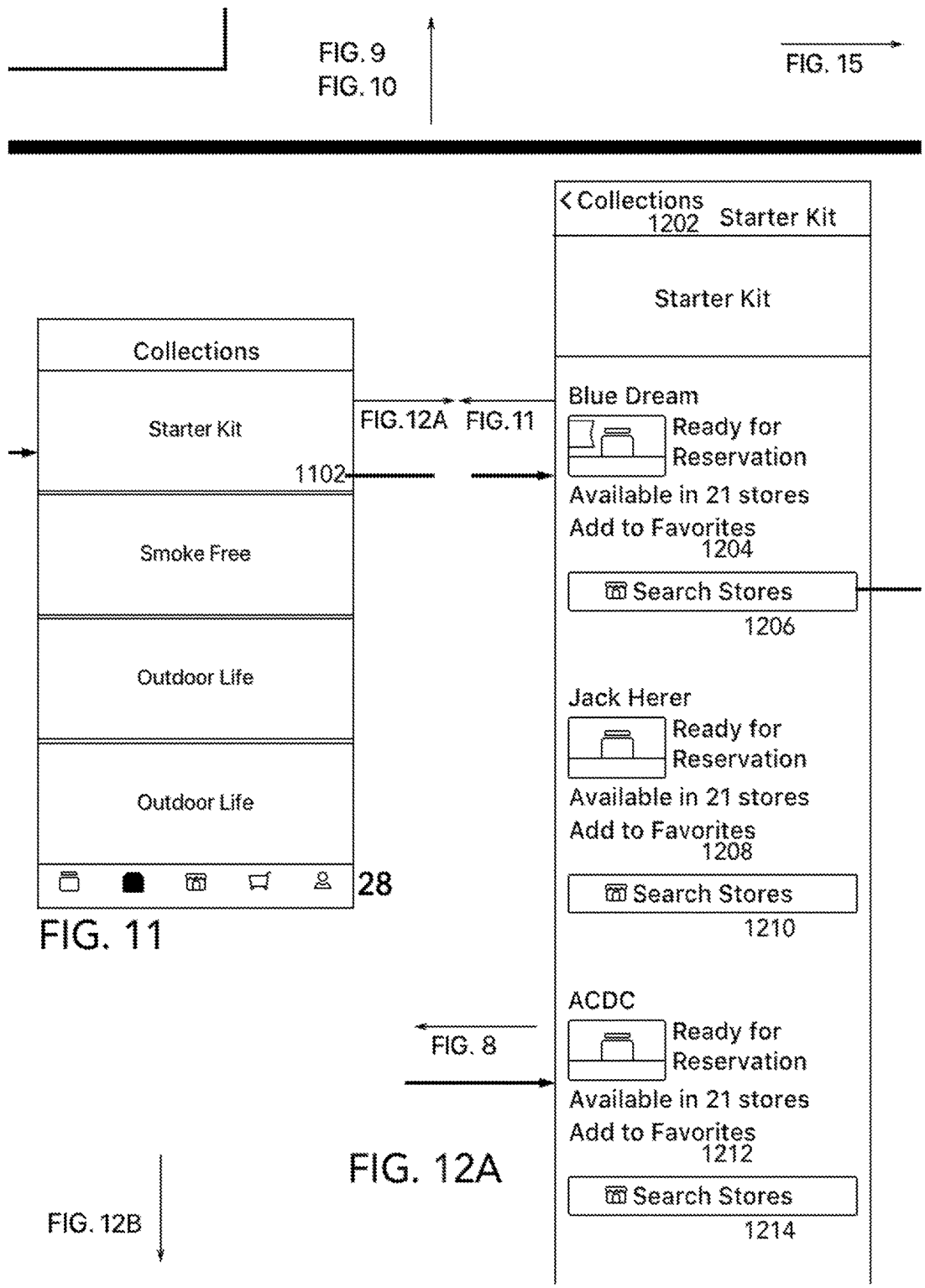

Continuing within FIG. 8, the user can select to view curated collections of products by accessing either link 808 or button 810. If the user chooses to select link 808, she is presented with a listing of all curated product collections on the platform, as shown on page thumbnail 28 and FIG. 11. The user can also choose to directly view products within a specific collection by accessing button 810 on FIG. 8 or panel 1102 in FIG. 11, which would then progress the user to page thumbnail 30, and described in detail in FIG. 12.

Figure 12:
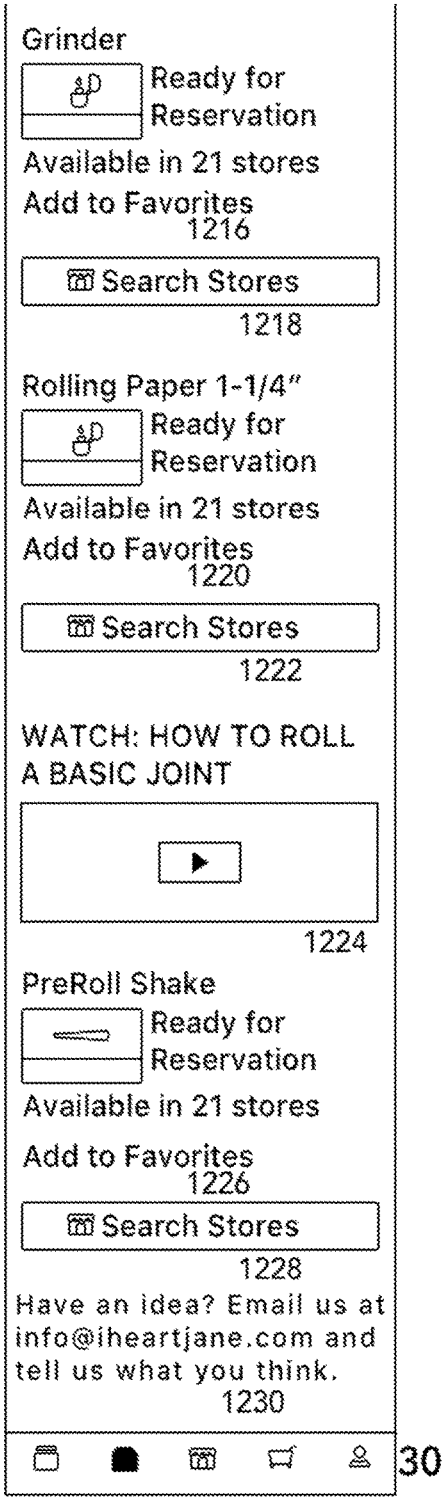

As shown in FIG. 12, the user has many options available to her. She can revert back to the listings of collections via link 1202. She can add and record certain items as a "favorite" by activating links 1204, 1208, 1212, 1216, 1220, and 1226 which provides the registered user with easy access to certain flagged items. The user also has the option in FIG. 12 to search for the stores where a selected item is currently available by pressing buttons 1206, 1210, 1214, 1218, 1222, and 1228. Where there is video content available, as depicted on video link 1224 in FIG. 12, the user may select the video and watch its content within the platform. Finally, the user may email the platform's administrators by accessing link 1230 in FIG. 12.

With reference to FIG. 8, the user may elect to view the entire inventory of all products hosted on the platform by selecting links 812 or 816, where she can refine her search by product name or other specified parameters. Panel 806 represents a navigable list of popular products, for example "OG Kush," while panel 814 also provides the same ability to select a specific product from within FIG. 8. When the user invokes one of those items, the flow continues directly to page thumbnail 36, and described in detail in FIG. 15. Also note, the user may navigate directly to various elements of the platform at any time by accessing controls 818 (Products), 820 (Collections), 822 (Stores), 824 (Reservation), and 826 (Profile). This feature is not limited to FIG. 8, but is available on any page once the user enters the platform.

Figure 15:
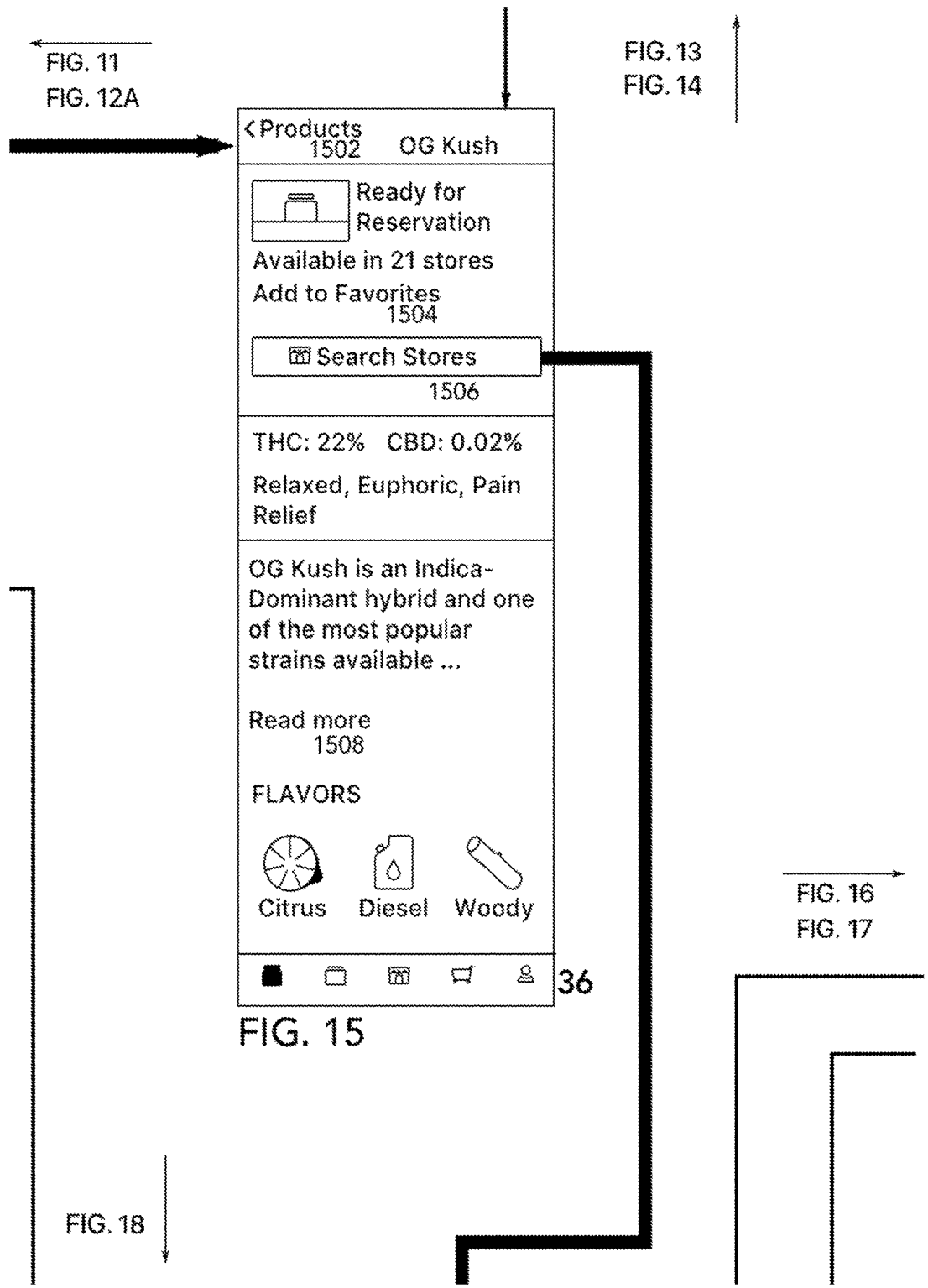

Once the user selects a specific product and is directed to thumbnail 36, FIG. 15 displays all user options in detail. The user may revert back to the previous page by selecting link 1502. She may also flag a certain item as a "favorite" as shown in link 1504, or continue reading the item's description by invoking link 1508. The user can also search for stores where the selected item is currently available, and by activating button 1506, continues the flow to page thumbnail 42.

Figure 18:
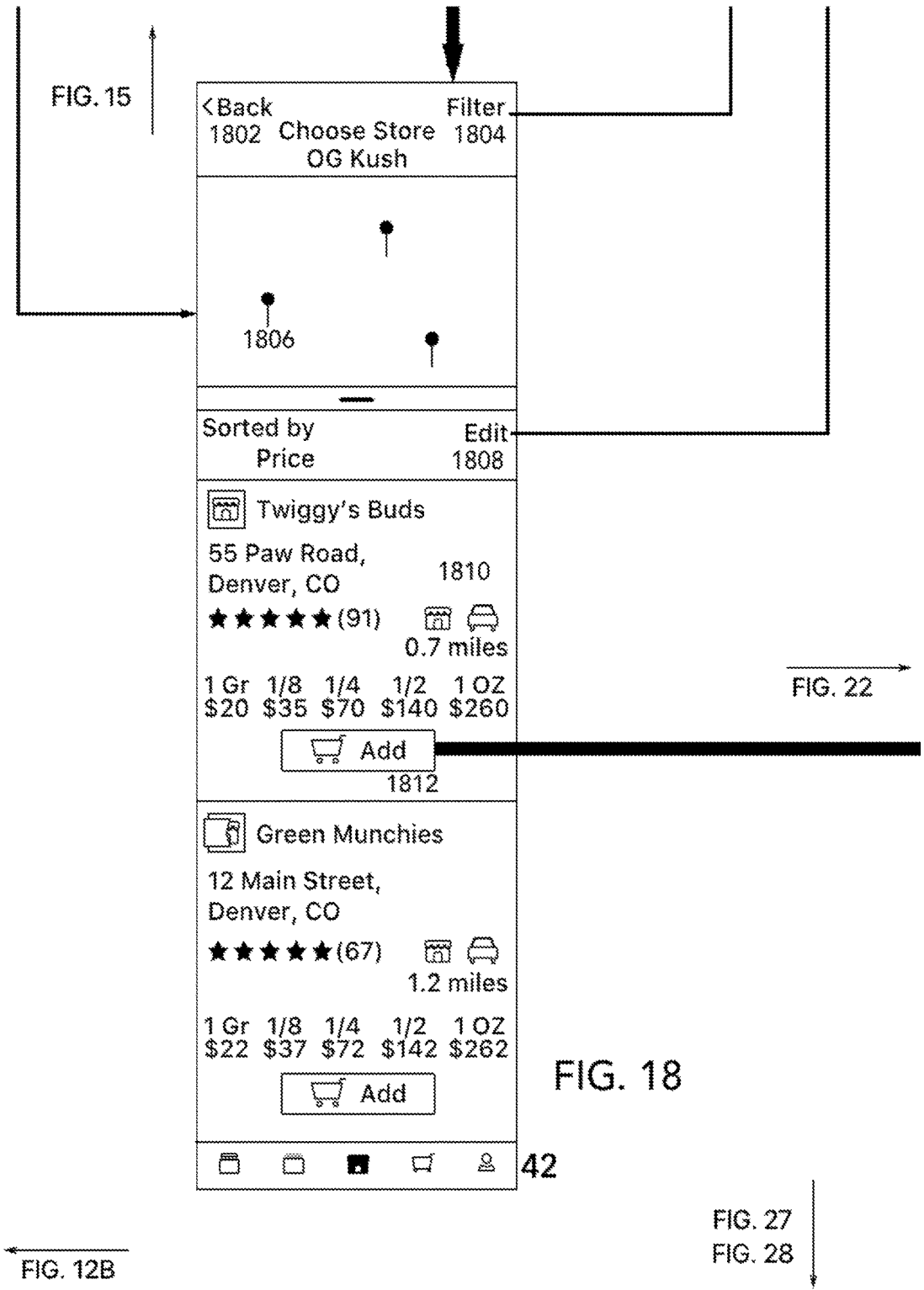

FIG. 18 depicts page thumbnail 42 in detail, and provides the user with an interactive map and corresponding scrollable list of stores in possession of the previously selected item. The user may select link 1802 and revert to back to the previous page. She may also choose to apply certain filters to her store search by selecting link 1804 and progressing to page thumbnail 38, and shown further in FIG. 16. As displayed in FIG. 16, the user may select to switch on toggles 1606, 1608, 1610, 1612, 1614, and 1618. She can remove a filter setting by deselecting each toggle switch individually, or she may clear all filters at once by selecting link 1620. Once the user applies any or all filters by selecting link 1604, she returns to page thumbnail 42 with an updated map view and corresponding list of stores that meet the parameters set by the selected filters.

Figure 30:
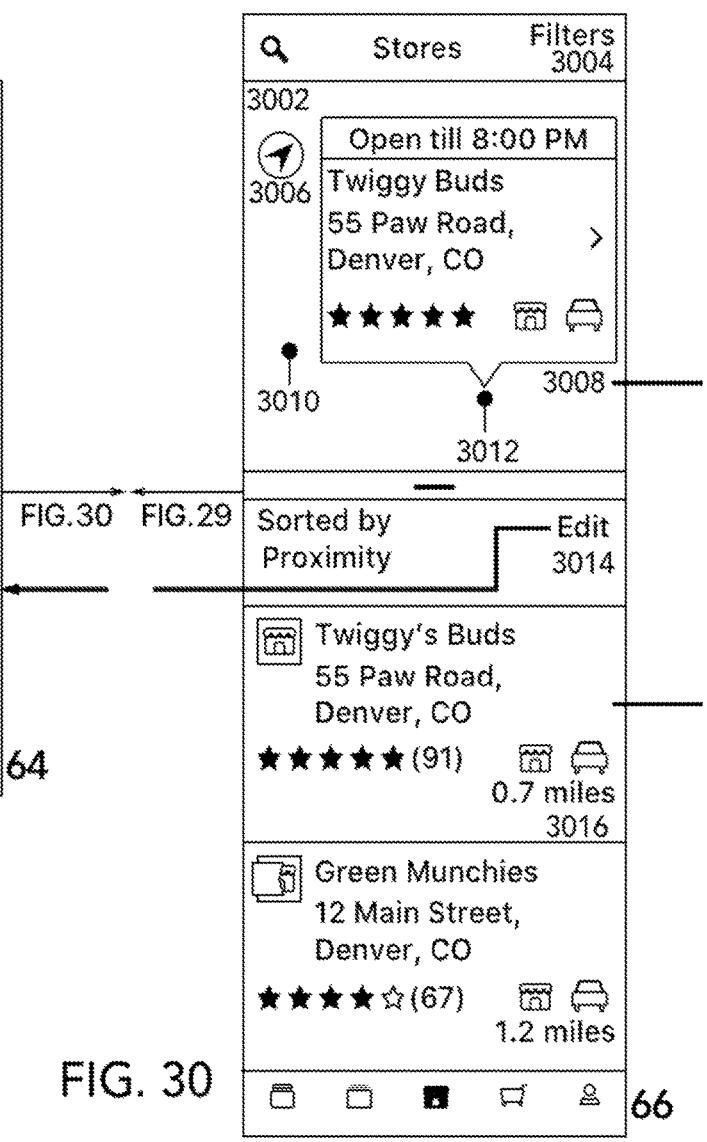

Continuing within FIG. 18, the user may tap a pin on the map, as shown on pin 1806, and in doing so, only that store's information would be displayed above that selected pin in an actionable banner. Reference button 3008 in FIG. 30 for a graphical depiction of the actionable banner. Additionally, the user can sort the list of stores by accessing link 1808, which would direct the flow to page thumbnail 40, and as shown in FIG. 17, the list may be sorted by price 1702, popularity 1704, or proximity 1706. Once buttons 1702, 1704, or 1706 is activated, the user is returned to page thumbnail 42, where the list would automatically be sorted according to previously desired setting. Note, price is the default setting by which the list of stores is organized.

Further within FIG. 18, by tapping any specific store information as outlined anywhere within panel 1810, the user will move directly to that store's specific page, which is represented on page thumbnail 58 and later described in FIG. 26. If the user selects button 1812 within FIG. 18, she progresses the flow to page thumbnail 50, as depicted in full on FIG. 22.

Within FIG. 22, the user is able to choose a quantity for the desired product by selecting buttons 2202, 2204, 206, 2208, or 2210. She may also cancel the action by selecting button 2212, which would revert her back to page thumbnail 42. If the user does select a quantity, she proceeds to page thumbnail 68, which is described in detail in FIG. 31.

Figure 31:
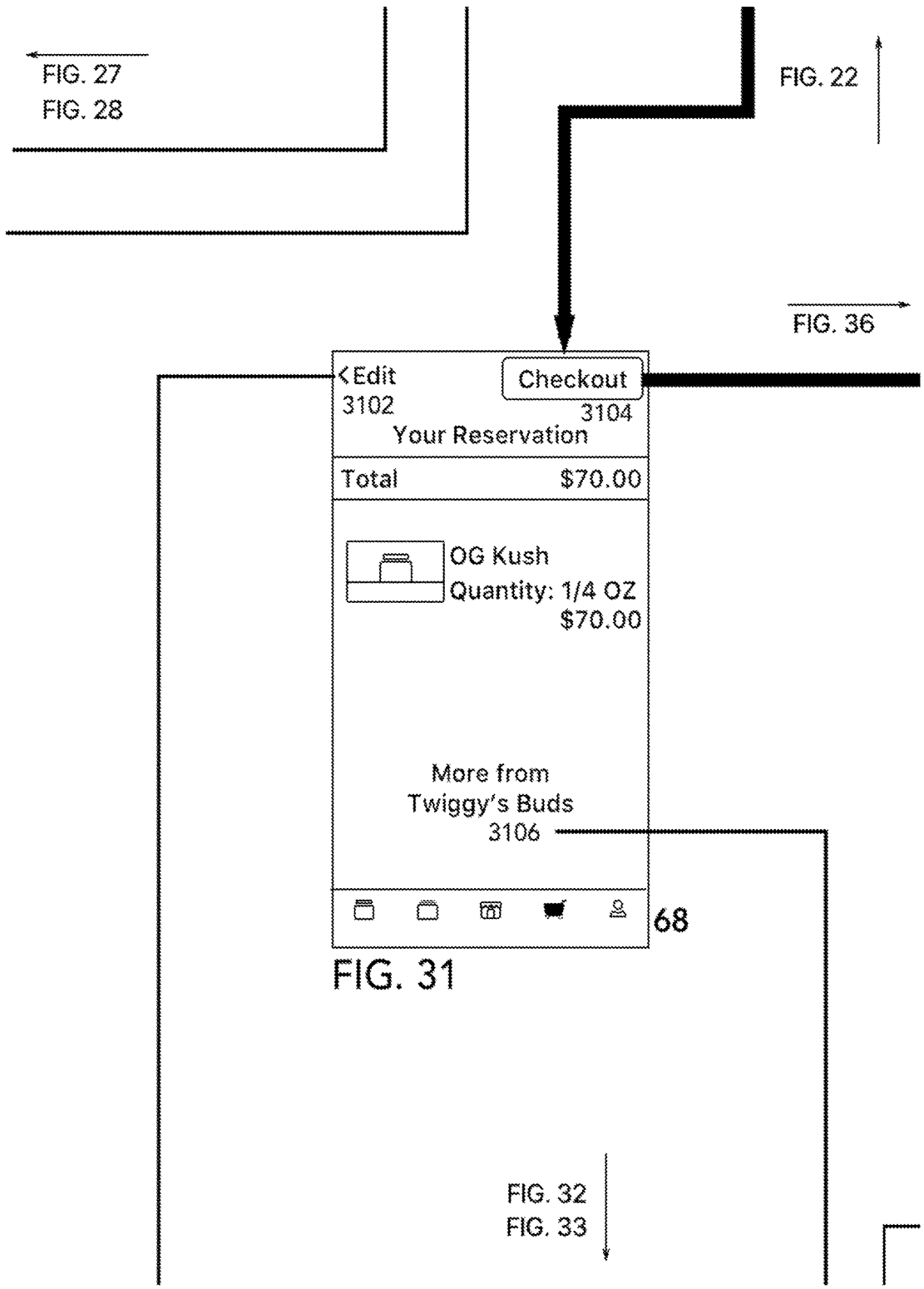
Figure 32:
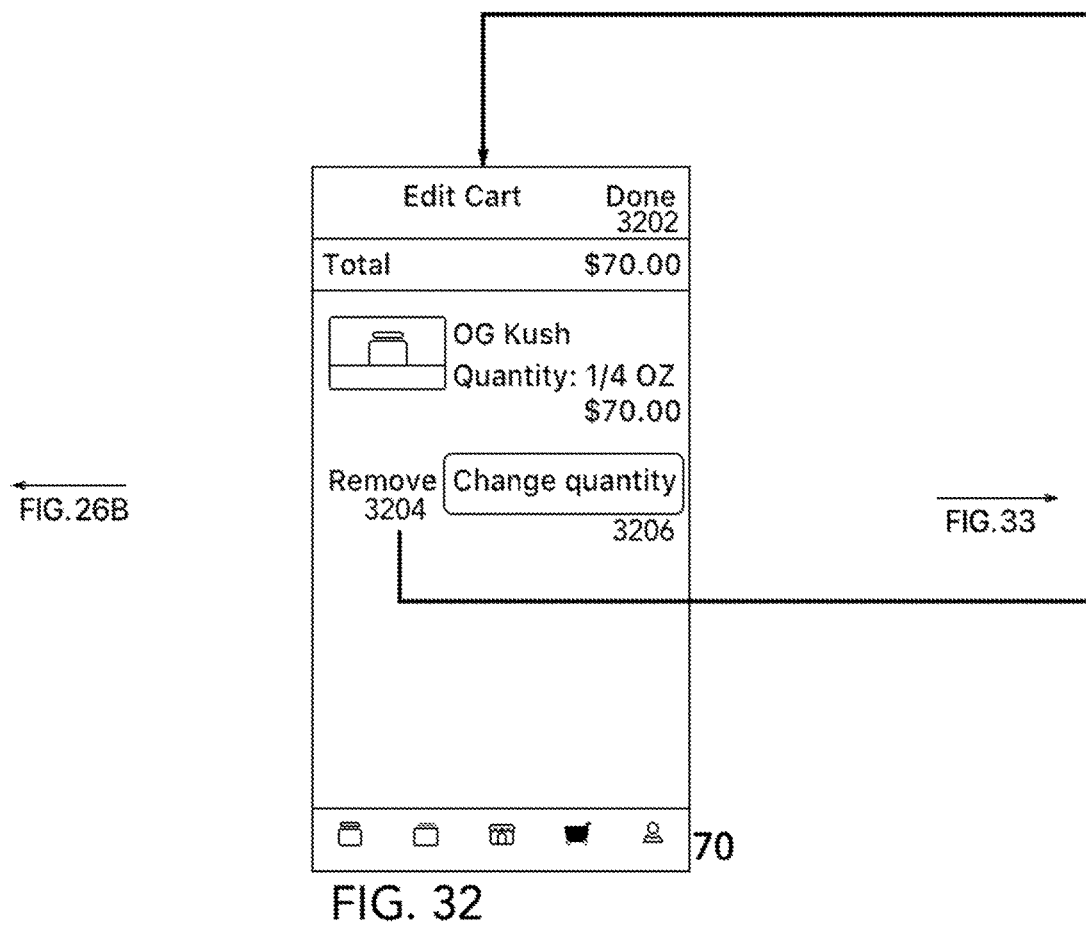
Figures 31, 32, 33:
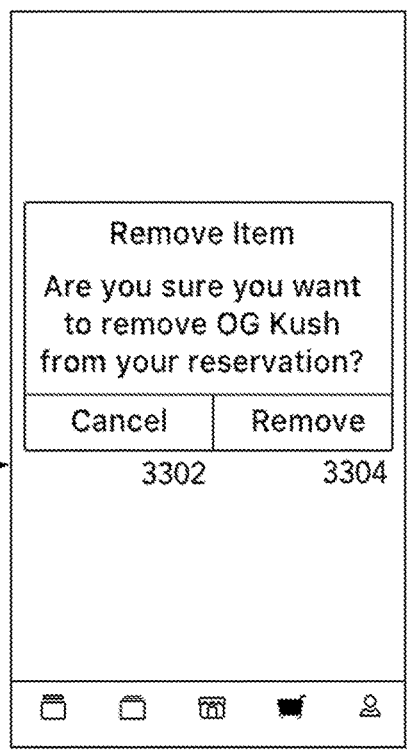

FIG. 31 shows many available actions for the user. By selecting link 3102, the user is able to edit her cart and is directed to page thumbnail 70, and displayed further in FIG. 32. Within FIG. 32, the user can adjust the quantity of the selected item by activating button 3206, or she may remove the item altogether by activating link 3204. The user may also save her updated edits by selecting link 3202 at any time. If the user chooses to remove the item altogether, she will proceed to page thumbnail 72, which is depicted in detail in FIG. 33. Within FIG. 33, the user has two options. Either she can cancel the action to remove the item altogether by selecting button 3302, or she may confirm the removal by selecting button 3304.

Continuing within FIG. 31, by tapping link 3106, the user may elect to continue her product search at the store in which she selected the previous item, and she will be moved to page thumbnail 58, described in detail in FIG. 26. Within FIG. 26, the user finds herself at the specific store's page, which allows her many actions. She can continue to search all stores by selecting link 2602, or she may search for a specific product within that store's inventory by selecting link 2604 and inputting the product name in an automatically revealed text field. Also, the user may elect to read further or close altogether a notice presented by the platform's admin by selecting links 2606 and 2608, respectively. She may also elect to flag this store as a "favorite" by invoking link 2610, which provides the registered user with easy access to certain flagged items.

Figure 24:
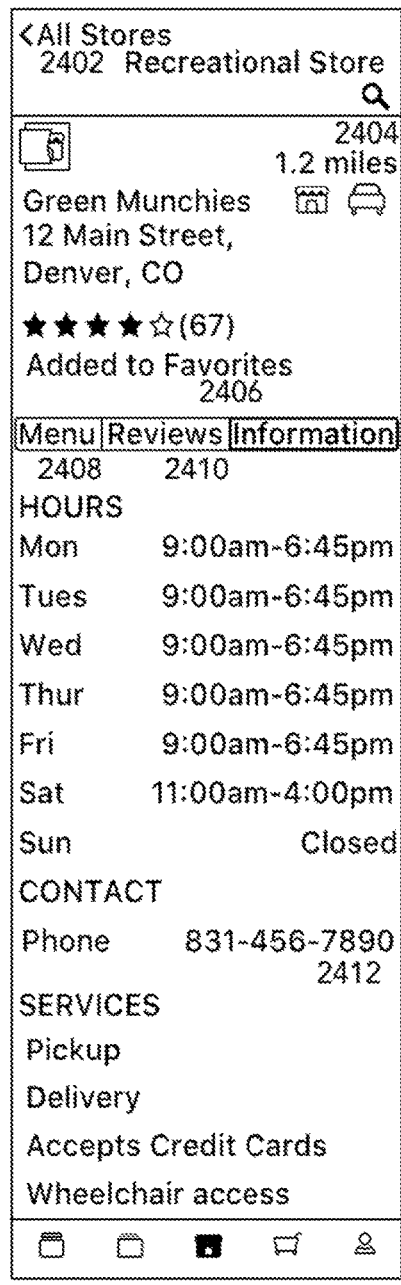
Figure 25:
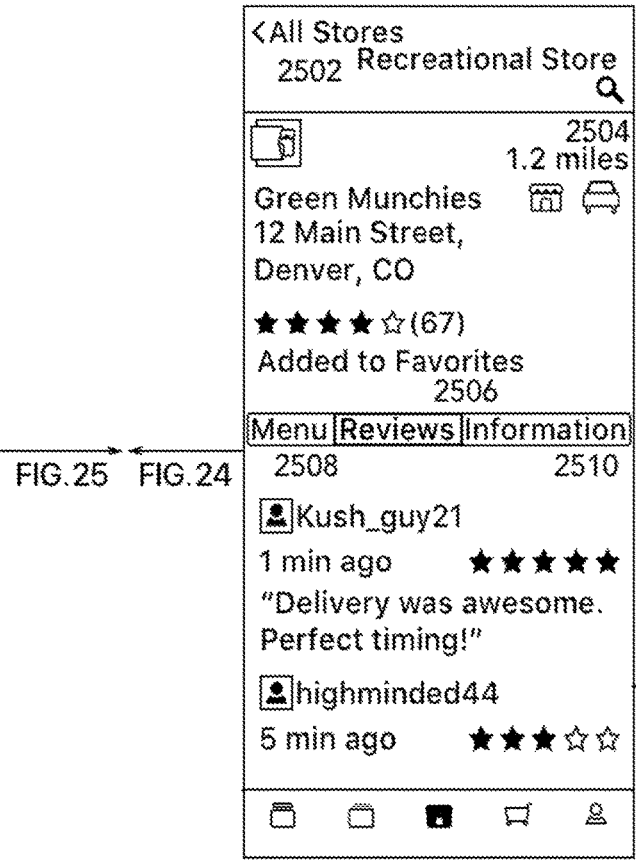

Also within FIG. 26, the user can reference the store's reviews by selecting tab 2612 and proceeding to page thumbnail 56, which is depicted fully in FIG. 25. As shown in FIG. 25, the user still has the same actions available to her as described previously in FIG. 26, except that the store's reviews are now displayed in a scrollable list. Similarly, and with reference back to FIG. 26, she may select to view the store's detailed information by selecting tab 2614 and proceeding to page thumbnail 54, which is displayed in detail on FIG. 24. Within FIG. 24, the user still has the same actions available to her as described previously in FIG. 26, except that the store's hours, contact information, and services are now displayed. Note, the user can connect via phone call to the store directly by selecting link 2412.

Continuing within FIG. 26, the user is presented with a navigable list of popular products, as shown in panel 2616. By tapping on a particular item, she is directed to page thumbnail 60, which is displayed in detail in FIG. 27. There, the user has all the same available actions as previously described in FIG. 15, and she can add an additional item to her already existing cart by invoking button 2706. With reference back to FIG. 26, the user can view all available categories (and the number of items listed within each category) of a particular store's menu, as shown in panels 2618, 2620, 2622, 2624, 2626, 2628, 2630, 2632, and 2634. By selecting a particular panel, the user proceeds to the corresponding category's full scrollable list on page thumbnail 62, and described in detail in FIG. 28.

Within FIG. 28, the user can revert back to the specific store's page by invoking link 2802, and she can search for all available item's within this respective menu category by inputting the product by name in text field 2804. Also, the user can proceed to a specific items page by tapping anywhere as depicted in panel 2806, or she may add a product directly to her cart by pressing button 2808. Finally, if the user has already added an item to her cart, she can return directly to the cart by selecting button 2810.

Figure 29:
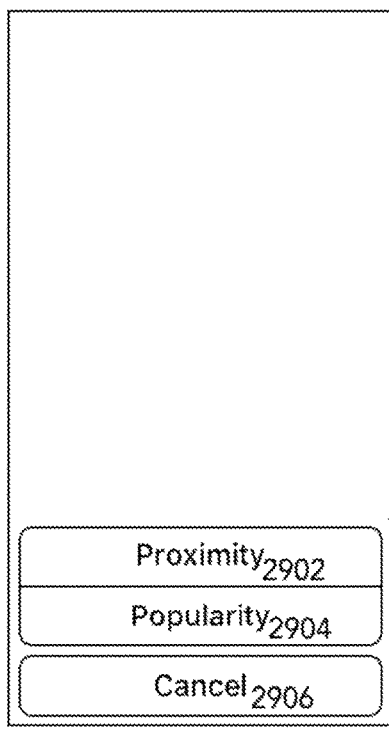

With reference back to FIG. 31, when the user is satisfied with her cart items, she can invoke the button 3104, which would direct her to page thumbnail 74, depicted in full in FIG. 34. Before proceeding to the description of page thumbnail 74, note that this store page may be available to the user without first selecting a product, as described in page thumbnail 66 and in further detail on FIG. 30. Within FIG. 30, the user can search by store name by selecting action 3002, implement filters as previously described by selecting link 3004, and orient the actionable map in various ways by selecting action 3006. As described previously, if the user taps on a pin in the map, as shown on pin 3012, a banner will appear as depicted in panel 3008. If the user taps panels 3008 or 3016, she will proceed directly to the specific page of that selected store. Note, if the user has arrived to this store page via the navigation panel (see FIG. 8 button 822), and she selects the link 3014 within FIG. 30, she will proceed to page thumbnail 64, which is shown in full in FIG. 29. There, the user will have the ability to sort the store list only by proximity (2902) or popularity (2904).

Proceeding with the flow to page thumbnail 74, which is depicted in detail on FIG. 34, the user must input information before requesting the reservation from the corresponding store. The user may cancel the checkout process at any time by invoking link 3402. With respect to the required documents, the user may upload these documents beforehand via the profile page. The user can upload a photo ID by pressing anywhere within panel 3404, which will direct her to page thumbnail 44, which is displayed in full on FIG. 19. Within FIG. 19, the user can select button 1904, which will enable the user to upload a photo ID from her device's document library or camera directly. In addition, the same concept applies when the user chooses to upload other documents (as necessary), as shown on panel 3406 in FIG. 34. By selecting panel 3406, the user proceeds to page thumbnail 46, which is shown in detail in FIG. 20. Within FIG. 20, she can upload the front and back of any additionally required documents via her device as previously described in FIG. 19.

Figure 36:
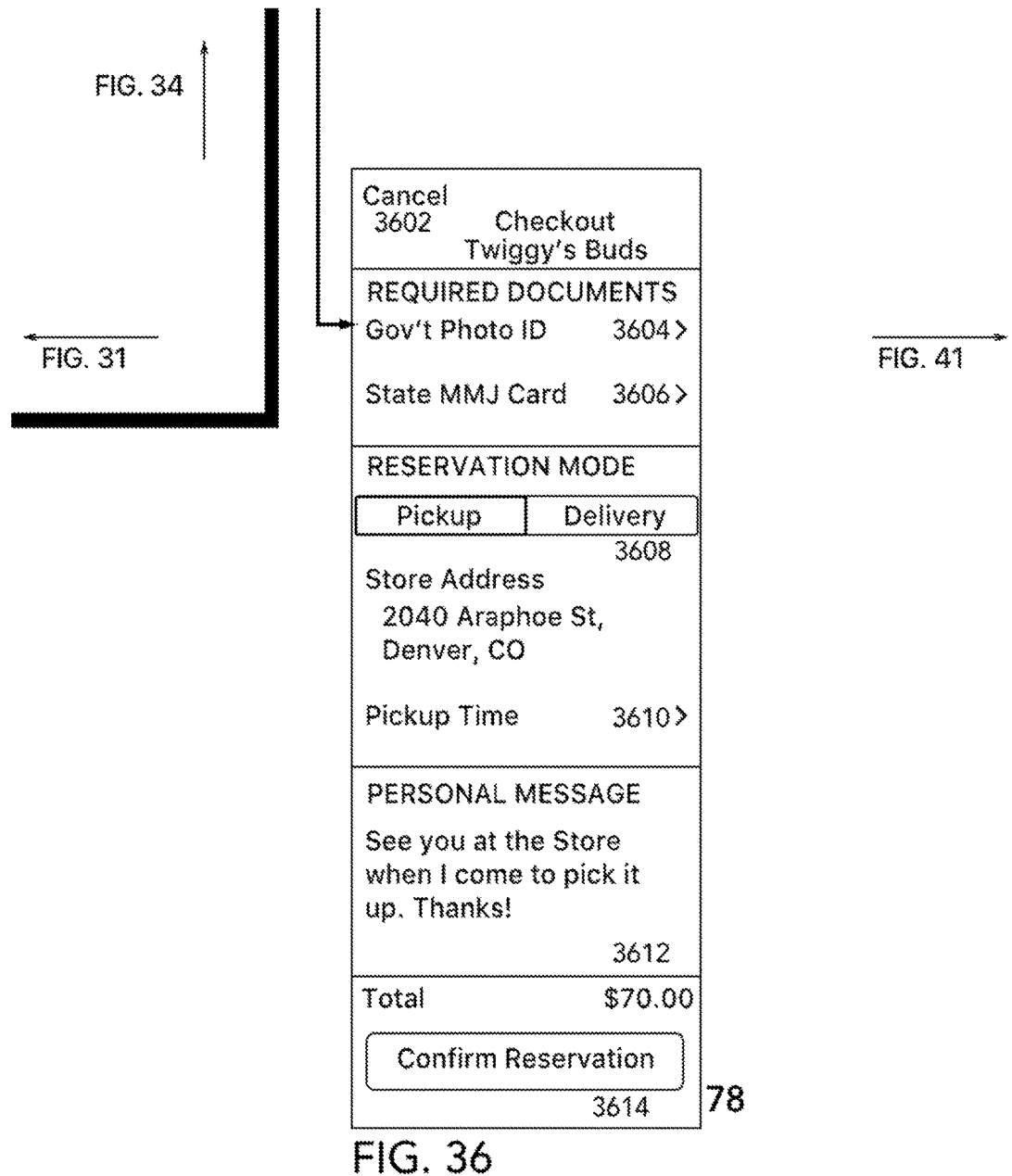

With reference back to FIG. 34, the user can select her items to arrive by delivery or to be made available in-store for pickup (depending on the store's available capabilities and any regulatory constraints) by selecting the corresponding button in panel 3408. Note, if the user chooses to reserve her items for in-store pickup, her page will adjust to page thumbnail 78, which is shown in full in FIG. 36. The only difference between FIGS. 34 and 36 is that the store's address will automatically populate (and cannot be edited) for in-store pickup reservations, while the delivery address must be input by the user for delivery reservations, as depicted in panel 3410 in FIG. 34.

Figures 23, 35, 68:
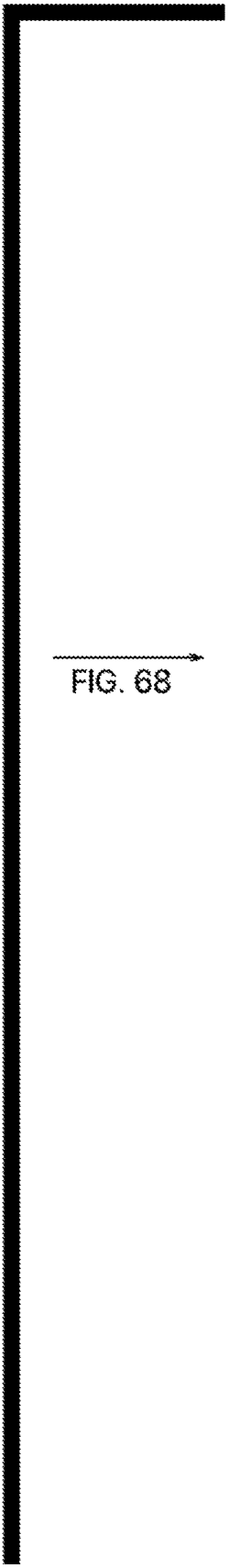

By selecting panel 3410, the user will be directed to page thumbnail 52, which is displayed in FIG. 23. Within FIG. 23, she can revert back to the checkout page by invoking link 2302, and she can input the address information via her device's keyboard, as depicted in text fields 2306, 2308, and 2310. When she taps on panel 2310, a list of locations appear, where the user can scroll to a desired location as shown in action 2316, and then tap on link 2314 to select accordingly. Upon saving the inputted information by selecting link 2304, she returns to FIG. 34. In order to select a desired time for the reservation, the user taps into panel 3412, which will make a scrollable list appear as shown in page thumbnail 76, which is described in detail on FIG. 35. Within FIG. 35, the user can scroll to the desired time she requests the reservation, as shown depicted in action 3504, and then tap on link 3502 to select accordingly. In doing so, the user returns back to FIG. 34. As an additional option, the user may add a personalized message to the store with reference to this reservation by tapping anywhere in the text box 3414, causing a text box to appear. Only after the required information is inputted may the user tap the button 3416 to finalize the reservation and send the request to the corresponding store. Note, if the required information is not properly inputted by the user, she will be unable to confirm the reservation and continue the flow.

Figure 38:
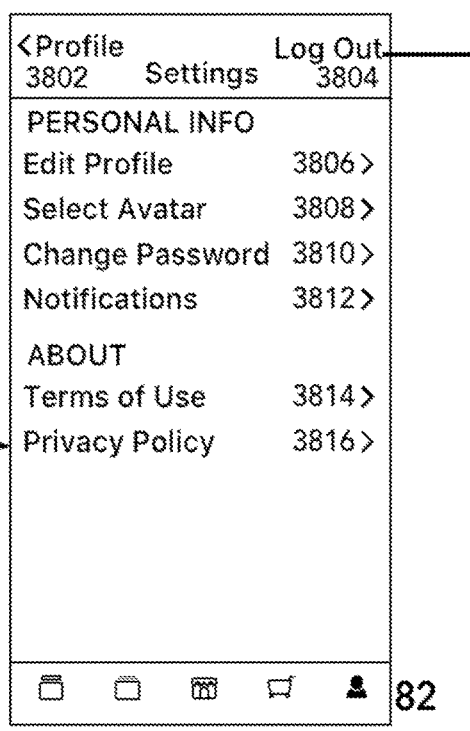
Figure 39:
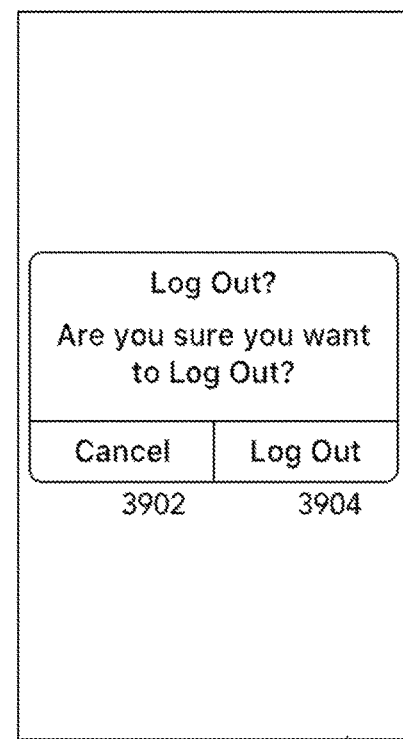

After pressing button 3416 in FIG. 34, the reservation request is sent from the user's platform to the corresponding store manager's platform, as shown on page thumbnail 122, and later described in detail in FIG. 58. Pressing button 3416 in FIG. 34 also directs the user to the profile page, depicted on page thumbnail 80 and in detail in FIG. 37. Within FIG. 37, the user can access personal information by selecting panels 3704, 3706 and 3708 to view identification documents, contact information, and store membership & favorites (for both stores and products), respectively. The user may also view profile settings by selecting link 3702, which is depicted on FIG. 38. Within FIG. 38, the user can edit profile username, email, phone number, and avatar by selecting button 3806. She can select her avatar by invoking button 3808, change her password via button 3810, or manage notifications by pressing button 3812. Additionally within FIG. 38, the user may view the platform's Terms of Use and Privacy Policy in full by selecting buttons 3814 and 3816, respectively. Lastly, the user may elect to Log Out of the platform by selecting link 3804, which would prompt her via page thumbnail 84 and depicted on FIG. 39 to confirm or deny the Log Out request via buttons 3904 and 3902, respectively.

Figure 44:
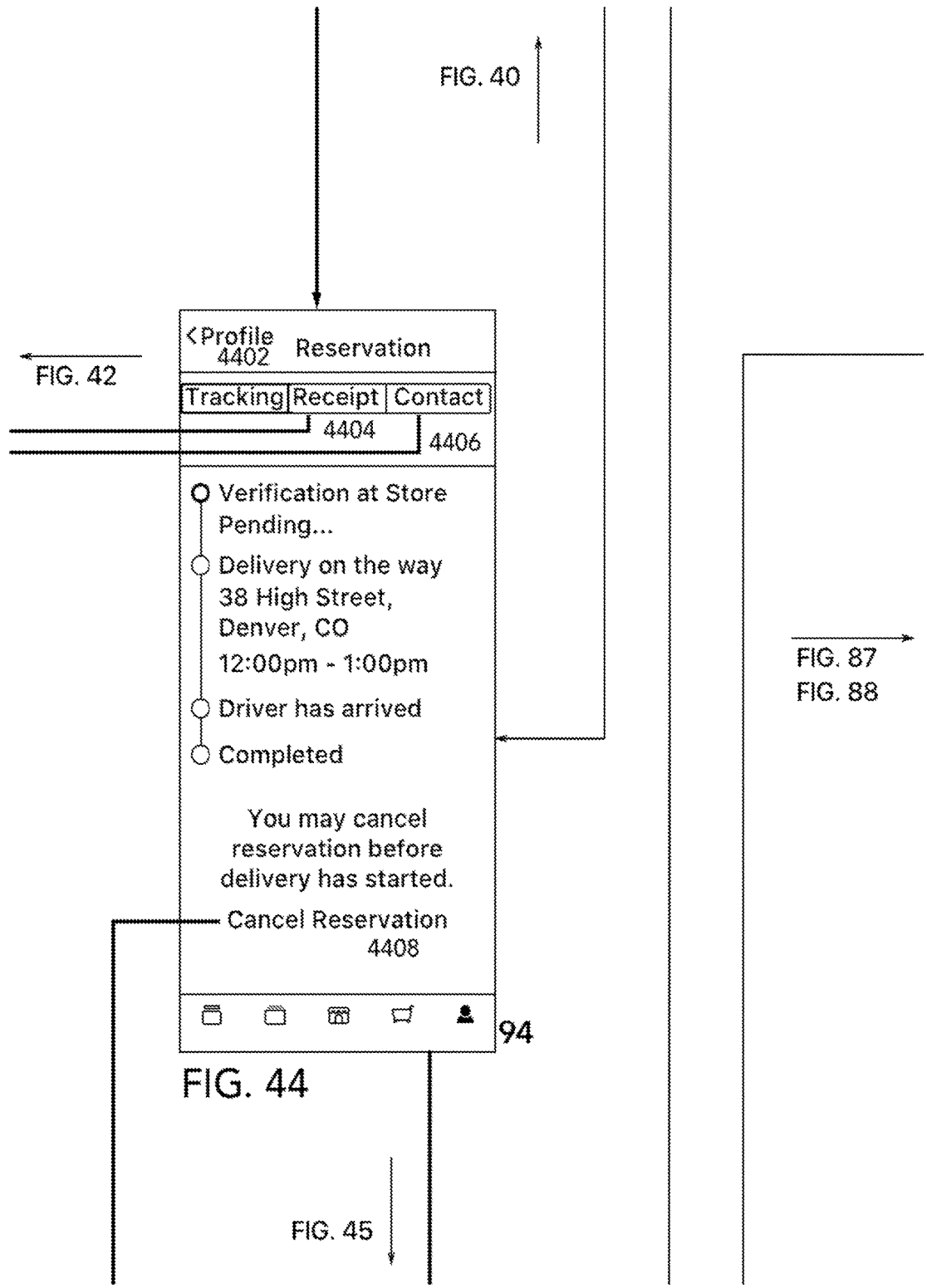

Continuing within FIG. 37, the user may also select a reservation to review in more detail by selecting an ongoing reservation (panel 3710) or a completed reservation (panel 3712). If a user selects an ongoing reservation, then she is directed to page thumbnail 94, which is described in detail in FIG. 44. Within FIG. 44, the user can view in real-time the status of her reservation, which is directly synched with the corresponding store's manager and staff member inputs from their respective platforms. The user can return to the profile page by selecting link 4402, or she can view the receipt of her reservation by selecting tab 4404, which allows her to view her cart items, as shown on leads her to page thumbnail 90 and in further detail on FIG. 42. Within FIG. 44, if the user selects tab 4406, the platform then displays the store information in detail. She can also revert back to the specific store page by invoking link 4108, or the user may also contact the store directly via phone by accessing link 4110, which will automatically dial the number and call the store's phone.

Note, we will return to the customer user and corresponding pages when we describe the flow from the perspectives of the corresponding store's manager and assigned staff member. Until then, the flow progresses to page thumbnail 122, which is displayed in detail on FIG. 58.

Manager User. When the customer presses button 3416 in FIG. 34, the reservation request is sent from the customer's platform to the store manager user's platform, which is shown on page thumbnail 122 and in full detail on FIG. 58. Note, the user must first sign in before having access to the platform. As shown in page thumbnail 106, which is displayed in full in FIG. 50. Within FIG. 50, the manager user must Log In by inputting his name or email in text field 5004, inputting his password in text field 5006, and pressing the button 5010 to gain access. Also, the user may select link 5008 to initiate lost password procedures, and he may select link 5002 to view an instructional manual, presenting page thumbnail 104, which is depicted in detail in FIG. 49.

Continuing within FIG. 58, the store manager user is able to view all incoming reservations as shown by default panel selection 5806. Here, the user can view the reservation's time, address, type (delivery or in-store), customer's username, tracking number, and time elapsed since the reservation had been requested. By selecting a specific reservation button, as identified in panel 5802, the user progresses to page thumbnail 124, which is to be described in further detail in FIG. 59. In addition, the user may navigate to various pages directly by selecting the panels 5808, 5810, or 5812. Note, this navigation panel is available to the user at any time throughout the flow.

Figures 55, 56, 57, 59:
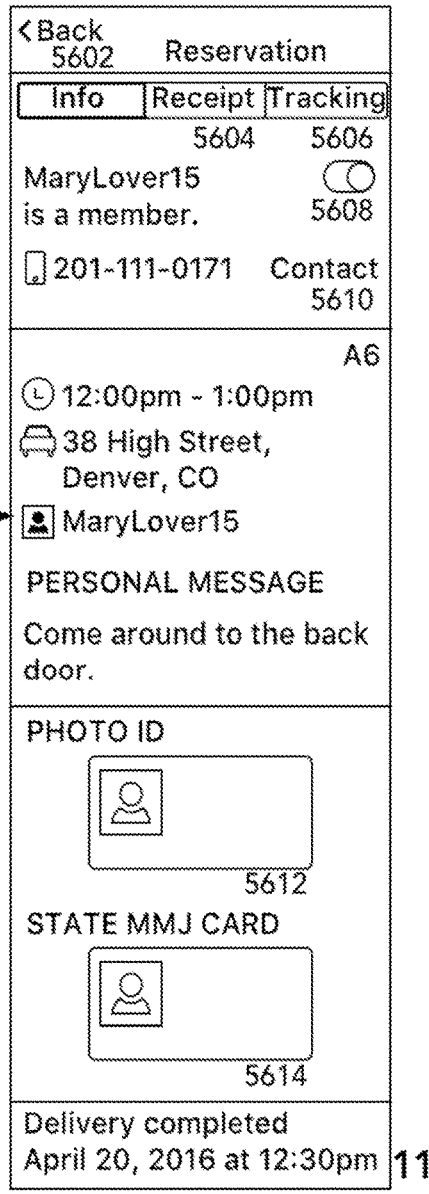

By selecting panel 5808 in FIG. 58, the user is able to review all ongoing reservations that have been assigned to his store's staff members, and is directed to page thumbnail 120, which is displayed in full on FIG. 57. With the ability to view each ongoing reservation by designated staff member, the user can select a reservation button, as outlined in panels 5702, 5704, and 5706, and will progress to page thumbnail 148 and later described in full in FIG. 71.

By selecting panel 5810 in FIG. 58, the user is able to review all reservations that have been completed by his store's staff members, and is directed to page thumbnail 116, which is displayed in detail in FIG. 55. Within FIG. 55, he is able to review the respective reservation details in addition to the review received from the reserving customer. By selecting a reservation button, depicted in panels 5502 and 5504, the user proceeds to page thumbnail 118, which is shown in FIG. 56. Within FIG. 56, the information displayed is exactly the same as in FIG. 59 (to be described later), except for the fact that the ability to assign reservations has been disabled. Instead, and in its place, the user can view the type, time, and date at which the reservation was completed.

By selecting panel 5812 in FIG. 58, the user is able to review his profile, and is directed to page thumbnail 110, which is displayed in detail in FIG. 52. Within FIG. 52, the user is able to Log Out by selecting link 5202. In doing so, he is prompted by page thumbnail 108, which is described further in FIG. 51. There, he has the option to cancel or confirm the Log Out request by selecting buttons 5102 and 5104, respectively. With reference back to FIG. 52, the user has the ability to edit his name and phone number by selecting actions 5204 and 5206, respectively. The user also has the ability to view all staff member availability by selecting action 5208, directing him to page thumbnail 112, which is detailed in FIG. 53. Within FIG. 53, the user can return to his profile by selecting link 5302, or he can select a staff member to contact. He selects a staff member by tapping anywhere in the user panel 5304, and by doing so, the user is shown page thumbnail 114, which is portrayed in FIG. 54. Within FIG. 54, the user has three options. He can revert back to the previous page by selecting link 5402, he can text the staff member by pressing icon 5404, or he can call the staff member directly by pressing icon 5406.

Figure 60:
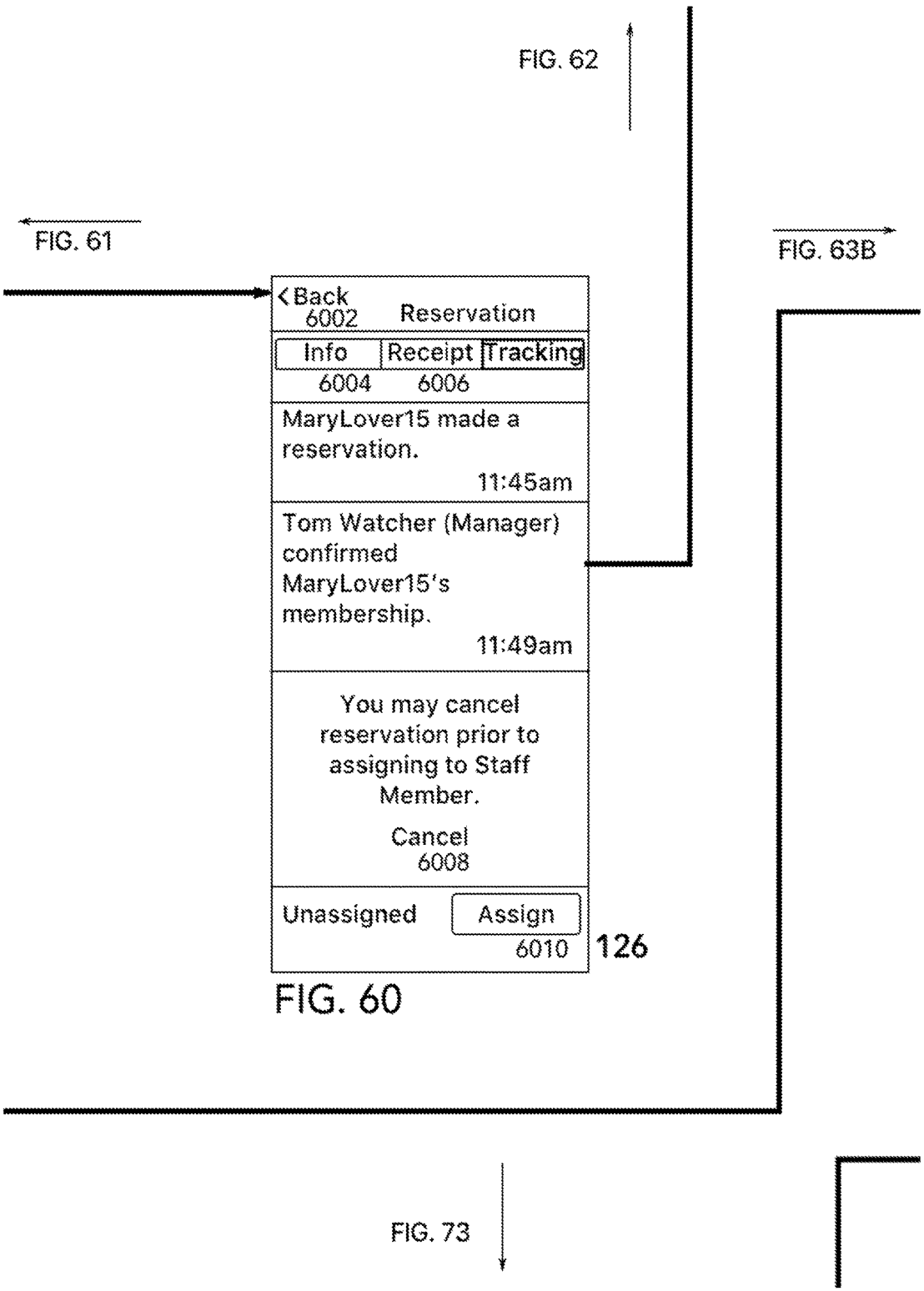
Figures 57, 61, 72:
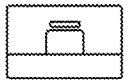
Figure 72:
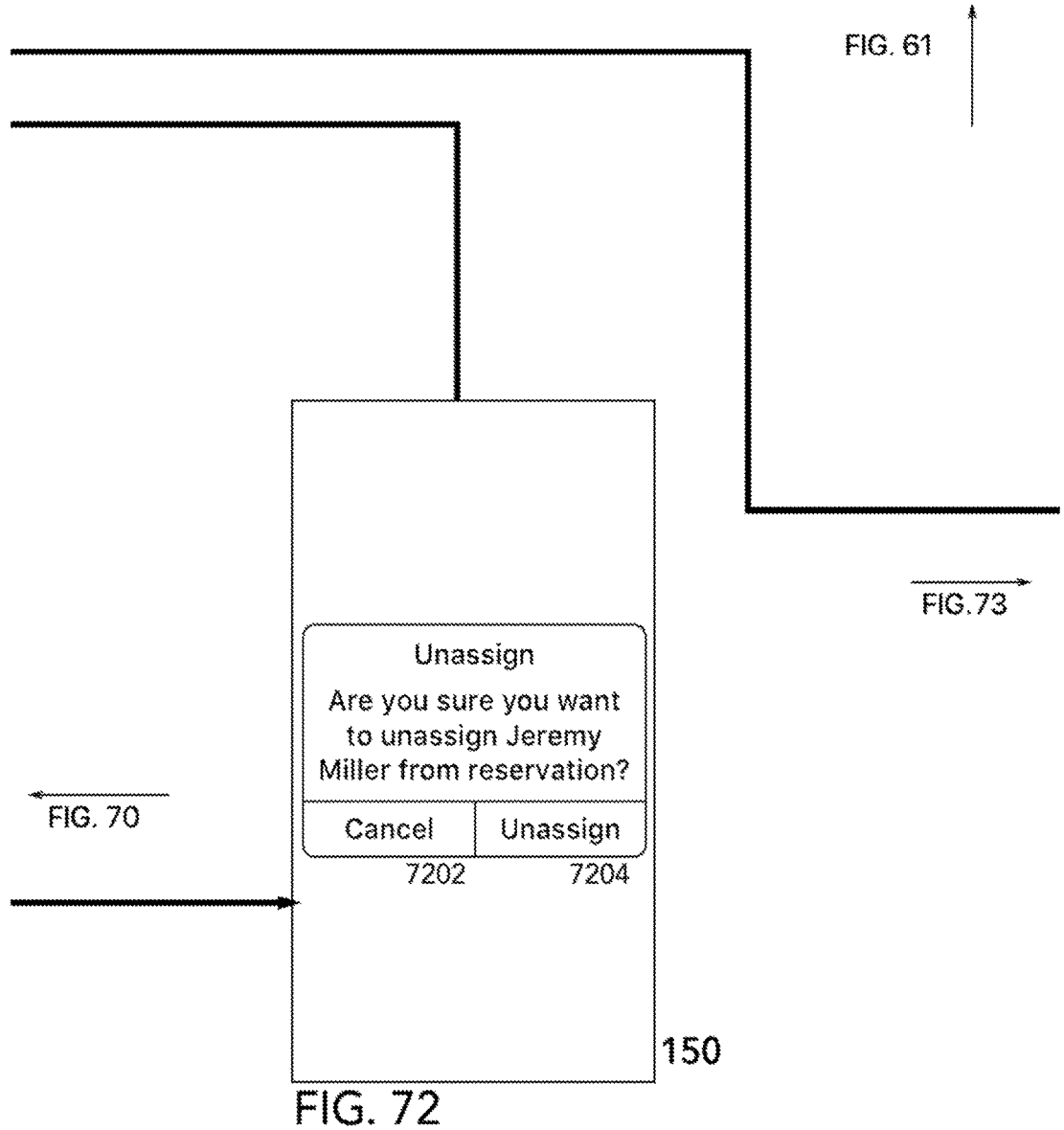

Continuing within FIG. 58, if the user selects a particular reservation button, as outlined in panel 5802, he will proceed with the flow to page thumbnail 124. FIG. 59 depicts page thumbnail 124 in detail, and allows the user many available actions. The user may return to the previous page by selecting link 5902. He may also review the requested items to be reserved by the customer in selecting tab 5904, which is shown on page thumbnail 128 and depicted in detail in FIG. 61. Within FIG. 61, the user is able to review the customer's cart items, in addition to the respective quantities and prices. Tapping tab 6104 will revert the user back to page thumbnail 124, as referenced in FIG. 59. Also within FIG. 59, he may select tab 5906, directing him to page thumbnail 126, which is depicted in detail in FIG. 60. Within FIG. 60, the user may view the status of the reservation in real-time, which is synched to the corresponding platforms of the customer and staff member to which the reservation belongs. Also, the user has the ability to cancel the reservation at any time prior to assigning it to a staff member by invoking link 6008. Tapping tab 6004 will return the user back to thumbnail 124, as referenced in FIG. 59.

Continuing within FIG. 59, the user may identify the reservation's requesting customer as a member to his store. Under certain circumstances, members may be the only ones who can make reservations at a particular store, or members may also be identified for the sake of extending them price discounts or other "members-only" promotions. By selecting the toggle switch 5908, the user can identify the customer as a member or non-member. Reference page thumbnail 132 and corresponding FIG. 63 for further detail. Within FIG. 63, if the customer is not yet a member of the store at which she is requesting the reservation, the user will see a message as it appears on page thumbnail 134, which is shown in detail in FIG. 64. If the customer is already a member of the store at which she is requesting the reservation, the user will see a message as it appears on page thumbnail 136, which is shown in detail in FIG. 65. Likewise, the assigned staff member will view a corresponding message as shown on page thumbnail 138, which is described in detail within FIG. 66, for reservations for non-member customers, while the message as shown on page thumbnail 140, and in greater detail in FIG. 67, will appear for the staff member when assigned customers who are members of the store.

Figure 73:
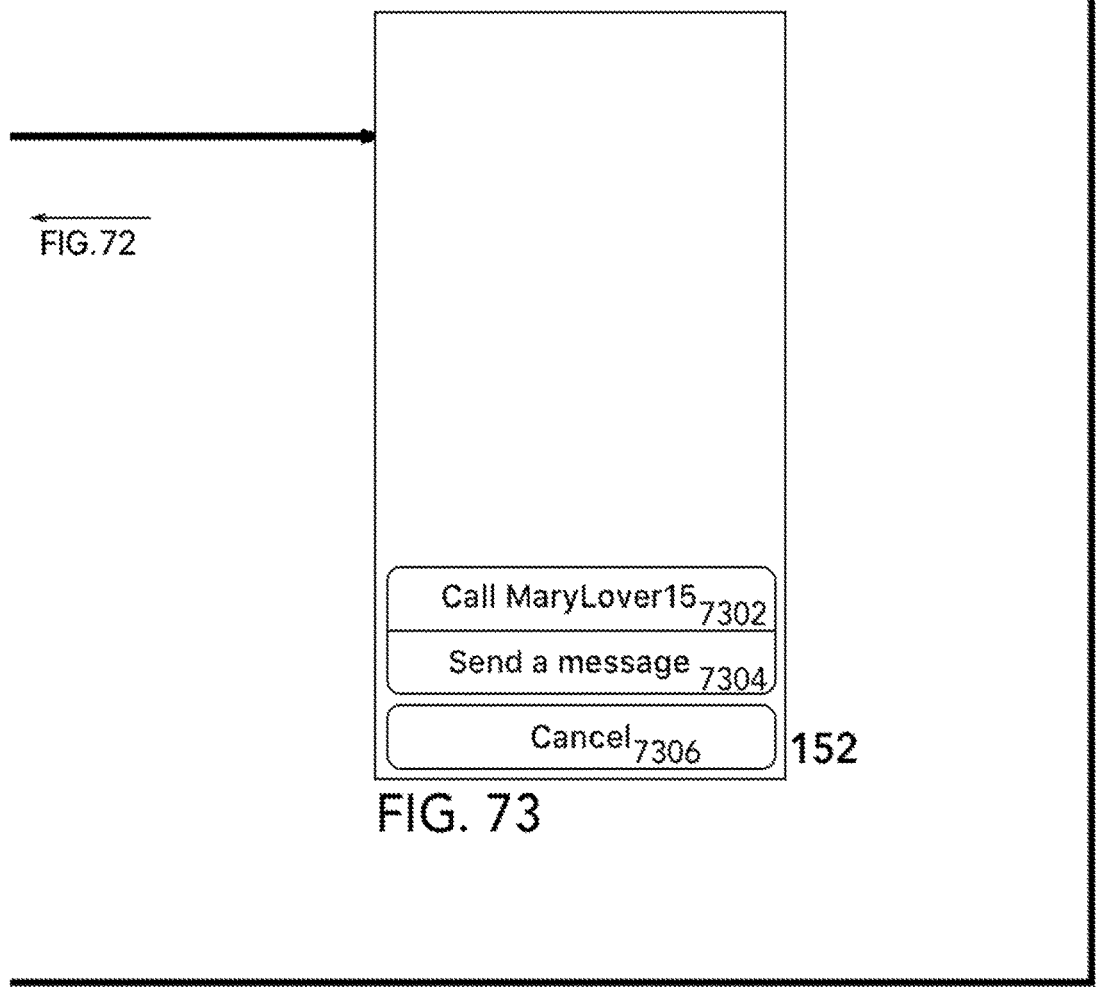
Figure 83:
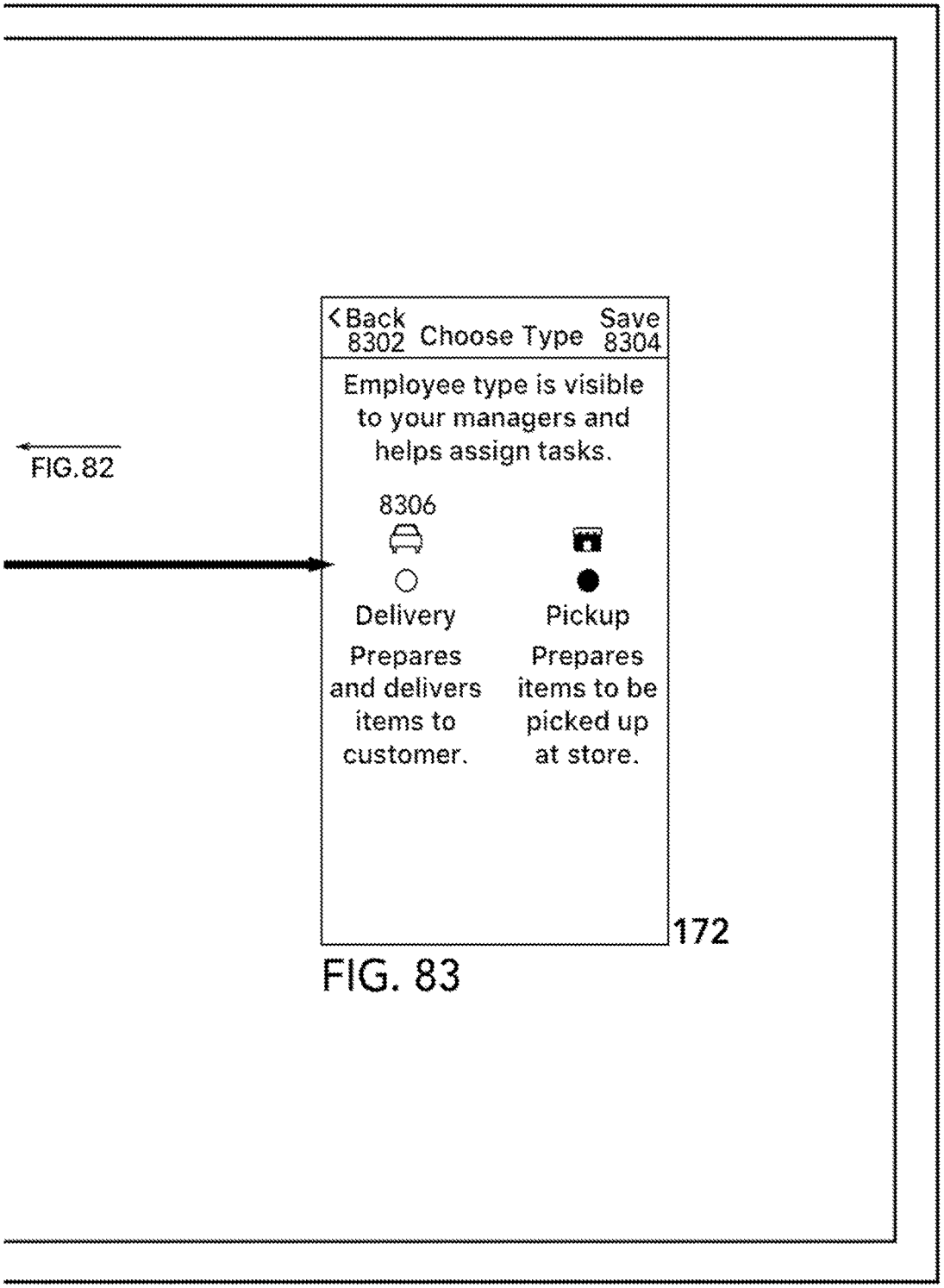

With reference back to FIG. 59, the user has the ability to contact the customer directly by activating link 5910, progressing him to page thumbnail 152, which is described in full on FIG. 73. Within FIG. 73, the user can call the customer directly via button 7302, text the customer directly via 7304, or cancel the action altogether via button 7306. Cancelling the action would return the user back to the specific reservation page, which is further described in FIG. 59.

Continuing within FIG. 59, the user can request to reschedule the reservation for a different time than originally requested by the customer. By selecting drop-down menu 5912, a scrollable list of times is presented as shown on page thumbnail 144, which is described in detail in FIG. 69. Within FIG. 69, the user is able to cancel the action of requesting to reschedule by selecting action 6914, or he can scroll to select a new time via action 6918. Once he taps link 6916, the scrollable list of times disappears, and the user moves to page thumbnail 142, which is displayed in full on FIG. 68. Within FIG. 68, note that the ability to assign the respective reservation is no longer available, and instead the user sees a message within panel 6818 that describes how the reschedule is pending confirmation from the customer.

Figure 40:
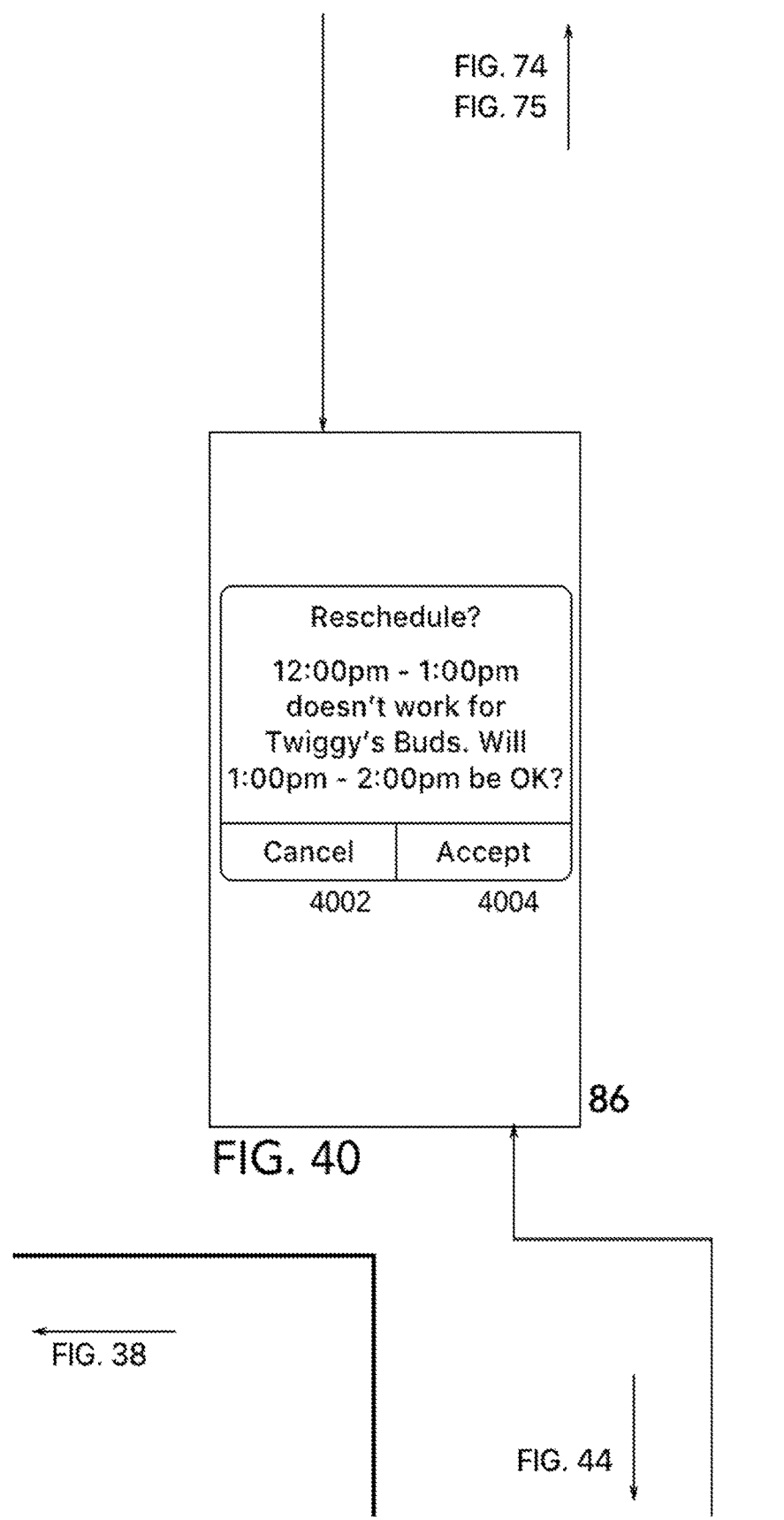
Figure 41:
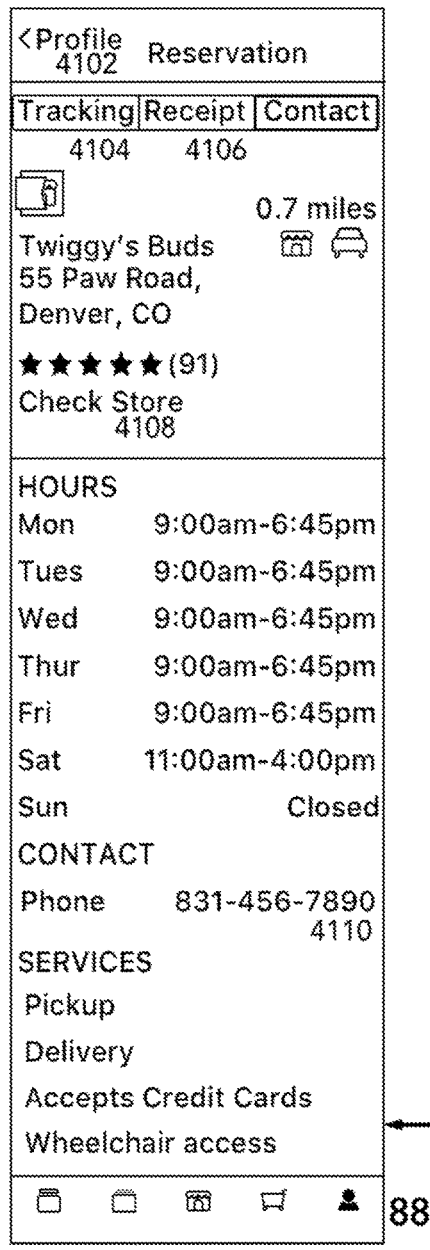
Figure 43:
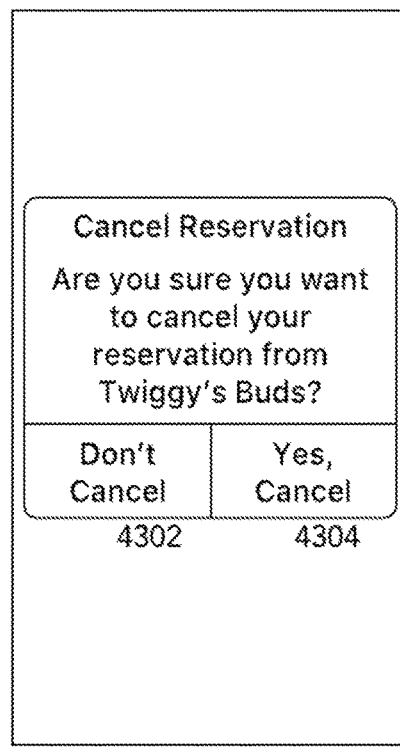

When the user confirms a reschedule request by selecting link 6916 in FIG. 69, a notification will be automatically be sent to the customer via page thumbnail 86, which is shown in detail in FIG. 40. Within FIG. 40, the customer can cancel the reservation altogether via button 4002 or accept the proposed reschedule via button 4004. If the customer accepts the reschedule by invoking button 4004 in FIG. 40, the user will receive an alert as shown on page thumbnail 154, which is shown in full in FIG. 74. Within FIG. 74, the user will have the ability to assign the reservation to an available staff member immediately via button 7404 or at a later time via button 7402. If the customer instead cancels the reservation altogether by invoking button 4002 in FIG. 40, the user will receive an alert as shown on page thumbnail 156, which is shown in full in FIG. 75. Within FIG. 74, the user will have the ability to dismiss this alert and close the box via button 7502 or contact the customer directly via phone or text message by pressing button 7504.

With reference back to all available user actions within FIG. 59, he can view in full and manipulate (e.g., zoom, scroll, etc.) the customer's uploaded identification card by pressing anywhere directly on the photo 5914. Similarly, the user can perform the same function with any additional documents uploaded by the customer, as in example document 5916. Additionally, the user may assign the reservation to an on-duty staff member by pressing button 5918. In doing so, the user proceeds to page thumbnail 146.

Continuing with page thumbnail 146, which is depicted in detail in FIG. 70, the user can revert back to the previous page by selecting link 7002. Also, the user may view all available staff members at the store and the respective number of reservations currently assigned to each of them. The user can select a staff member via action 7006 and confirm the assignment by activating link 7004. Also, note the available option for the user to self-assign the reservation via button 7008.

Figure 45:
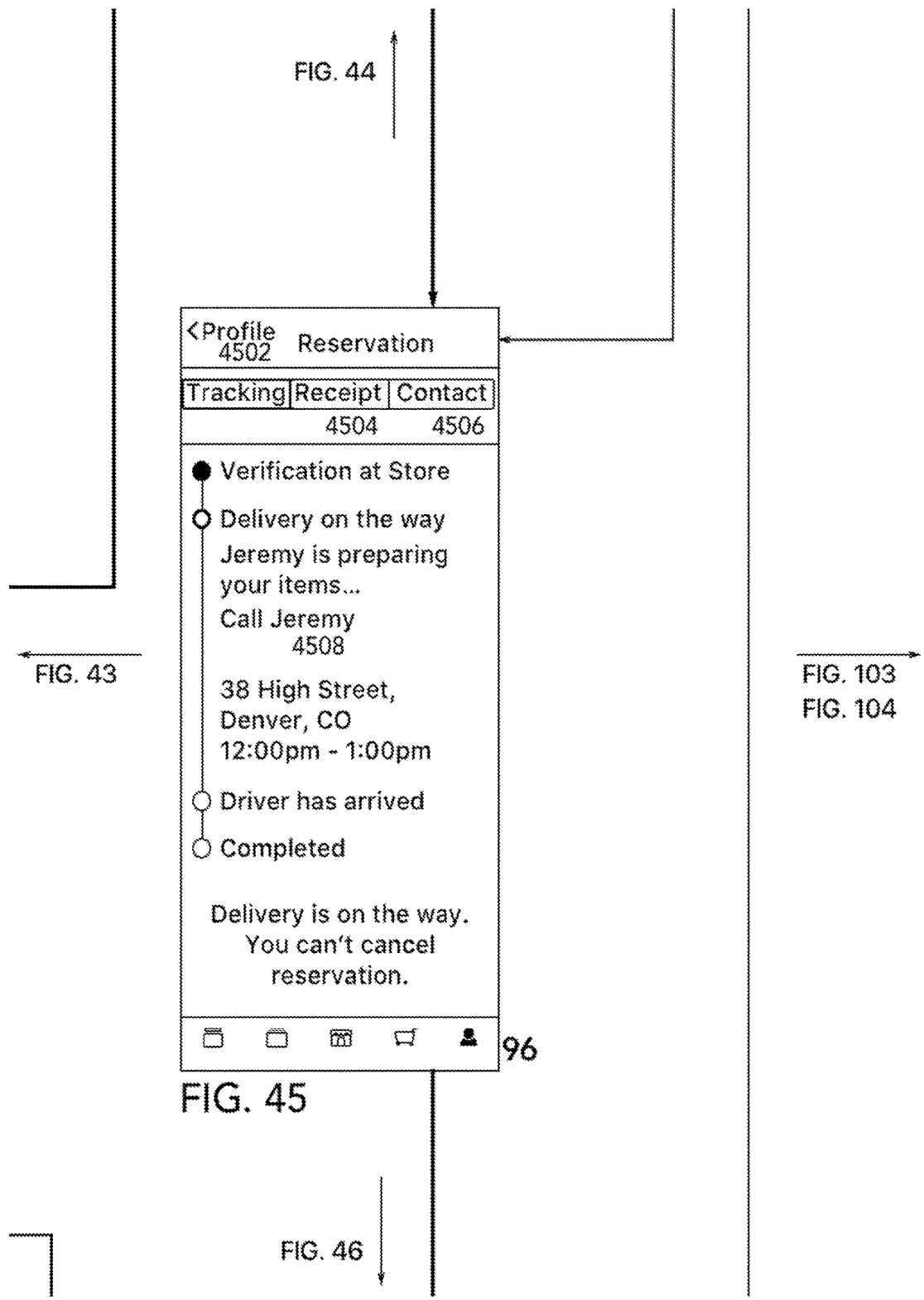

Pressing link 7004 in FIG. 70 accomplishes three things simultaneously. First, a notification is sent to the assigned staff member's page thumbnail 176, which is later described in detail in FIG. 85. Second, the status is automatically updated on the corresponding customer's page thumbnail 96, which is depicted fully in FIG. 45. Within FIG. 45, not only is the customer able to see the name of the staff member assigned to the reservation, but also by invoking the newly appeared link 4508, the user is able to contact that particular specific member via phone or text message. The third action that automatically takes place when the user presses link 7004 in FIG. 70 is that the flow proceeds to page thumbnail 148, which is shown in FIG. 71.

Continuing within FIG. 71, all actions available to the user replicate those described in FIG. 59, except for two. The first is that the he is now unable to request a reschedule. The second is that now the user can un-assign the reservation from the previously assigned staff member by pressing button 7116, which directs him to page thumbnail 150. Page thumbnail 150 is depicted in detail in FIG. 72, where it is shown that the user can cancel the action by pressing button 7202, or confirm the un-assignment by pressing button 7204. By invoking button 7204, the user will return to page thumbnail 124. Otherwise, the manager user's flow will remain at page thumbnail 148, where he will have the ability to track the status of the reservation via tab 7106 in FIG. 71. Once assigned to the staff member, the overall process flow continues to the staff member's page, which begins on the page thumbnail 176 that is detailed in FIG. 85.

Staff Member User. When the manager selects link 7004 in FIG. 70, the flow proceeds to page thumbnail 176, where the staff member user can review all ongoing reservations that are assigned to him. Note, the Log In procedures for the staff member user as shown in page thumbnails 158 (FIG. 76) and 160 (FIG. 77) replicate those described in manager page thumbnails 106 (FIG. 50) and 104 (FIG. 49). The roles of manager and staff member will be linked and applied accordingly to specific individuals by name, email, and password.

Figure 85:
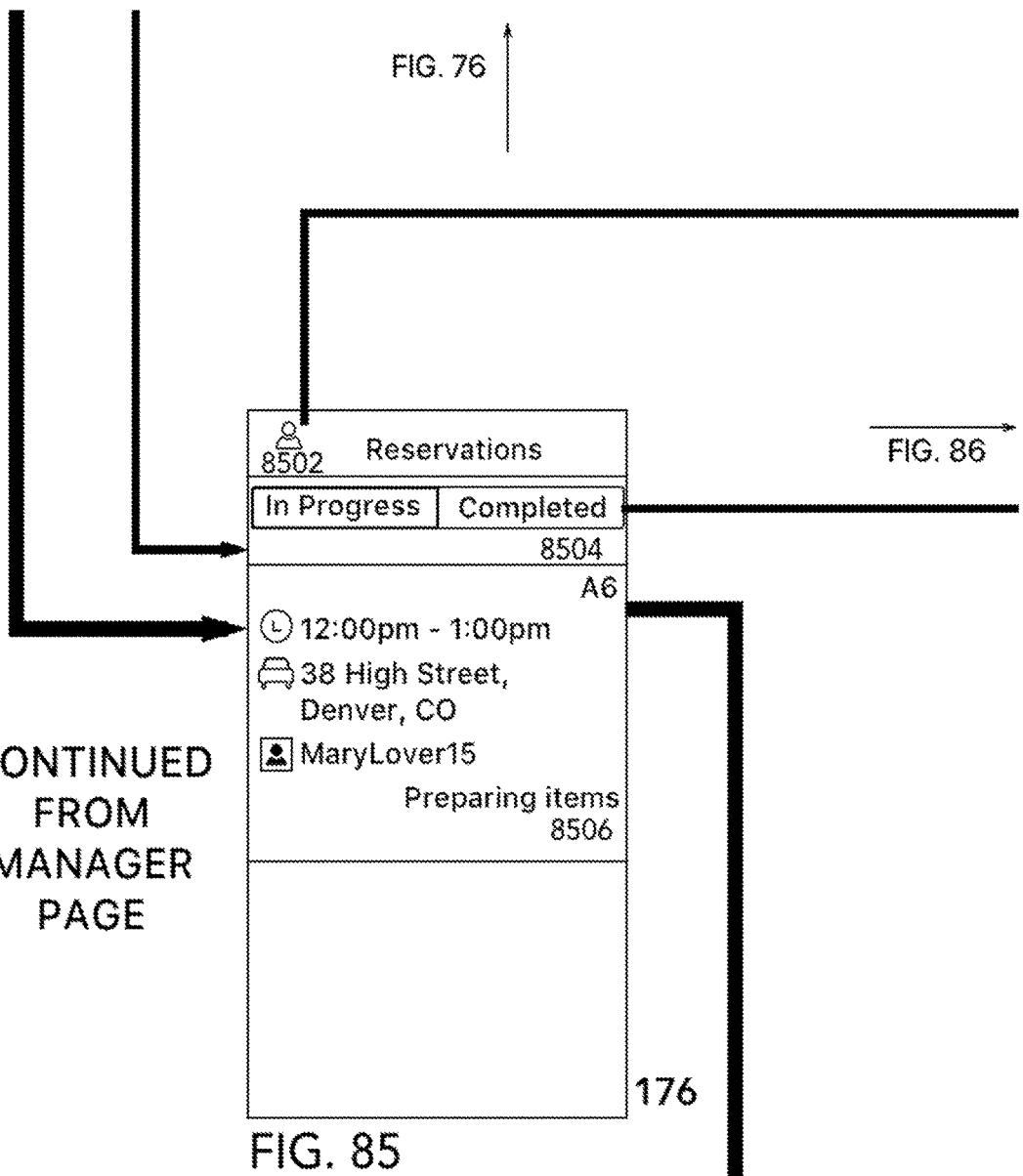
Figures 77, 78, 85, 86, 92:
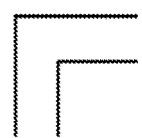

Continuing with page thumbnail 176, which is depicted in FIG. 85, the staff member user can also review the reservations that he has completed by selecting tab 8504, and proceed to page thumbnail 178. As shown in FIG. 86, which displays page thumbnail 178 in detail, the user can review a scrollable list of all his completed reservations. He may select a particular reservation to view in greater detail by pressing anywhere within the reservation button, as shown in button 8606, which directs him to a similar page as described in FIG. 55. By tapping the tab 8604 in FIG. 86, the user returns to page thumbnail 176, which is depicted in FIG. 85.

Continuing within FIG. 85, the user may also proceed to his profile page by tapping icon 8502. In doing so, the user is directed to page thumbnail 162, which is detailed in FIG. 78. Within FIG. 78, the user has many available actions. He can close the profile page and return to the previous page by selecting link 7802. The user also has the ability Log Out by invoking link 7804 and proceeding to page thumbnail 164, which is depicted fully in FIG. 79. Within FIG. 79, the user can cancel the action by pressing button 7902, or he can confirm the Log Out process by pressing button 7904. Note, if a user logs out of the platform, he is no longer made available for reservation assignment on his corresponding store manager's platform.

Continuing within FIG. 78, the user can tap field 7806, directing him to page thumbnail 166, which is displayed in FIG. 80. Within FIG. 80, the user can revert to previous page by selecting link 8002, or he can edit directly into the text field 8006. By pressing link 8004, his edits will be saved and the user returned to page thumbnail 162. Continuing within FIG. 78, the user can tap field 7808, directing him to page thumbnail 168, which is detailed in FIG. 81. Within FIG. 81, the user can revert to previous page by selecting link 8102, or he can edit directly into the text field 8106. By pressing link 8104, his edits will be saved and the user returned to page thumbnail 162.

Continuing within FIG. 78, the user may also select the type of reservation for which he is available (delivery or in-store) by tapping field 7810, directing him to page thumbnail 170, which is displayed in FIG. 82. Within FIG. 82, the user can return to the previous page by selecting link 8202, or change the type of reservation by selecting action 8206. If the user wants to save his changes, he must invoke link 8204, which will confirm the type of reservation for which he is available (delivery or in-store), and return him to page thumbnail 162.

Continuing within FIG. 78, the user may view his store's managers, and can select one to contact directly by pressing field 7812. In doing so, the user is directed to page thumbnail 174, which is depicted in full on FIG. 84. Within FIG. 84, the user may elect to return to the previous page by selecting link 8402, or he may contact his store's manager directly via text message (8404) or phone call (8406).

Figure 91:

With reference back to FIG. 85, if the user selects a specific reservation by tapping anywhere within outlined field 8506, he proceeds to page thumbnail 188, which is detailed in FIG. 91.

The actions available to the user in FIG. 91 are similar to those available to the manager in thumbnail 124. Within FIG. 91, the user is able to revert back to the previous page by invoking link 9102. He is also able to view the reservation's cart items requested by the customer by tapping on the receipt tab 9104. He may also track in real-time the ongoing status of the reservation by tapping on the tracking tab 9106. If the user taps on link 9108, he is presented with page thumbnail 190, which is fully displayed in FIG. 92. Within FIG. 92, the user may contact the customer directly via phone call via button 9202 or text message via button 9204. By selecting button 9206 in FIG. 92, the user cancels the previous action and returns to page thumbnail 188.

Continuing within FIG. 91, the user may view in full and manipulate (e.g., zoom, scroll, etc.) the customer's uploaded identification card by pressing anywhere directly on the photo 9110. Similarly, the user can perform the same function with any additional documents uploaded by the customer, as in example document 9112. Additionally, the user may update the status of the reservation by tapping into the drop-down menu 9114, and bringing about page thumbnail 180 for delivery reservations, which is detailed in FIG. 87, or page thumbnail 182 for in-store reservations, which is detailed in FIG. 88. Within FIG. 87, the user can cancel the action and close the list by selecting button 8708. Within FIG. 88, the user can cancel the action and close the list by selecting button 8808. Furthermore, the user may update the status of reservation by selecting such options as button 8704 in FIG. 87 for delivery reservations, or by selecting the corresponding button 8804 in FIG. 88 for in-store reservations.

Figure 93:
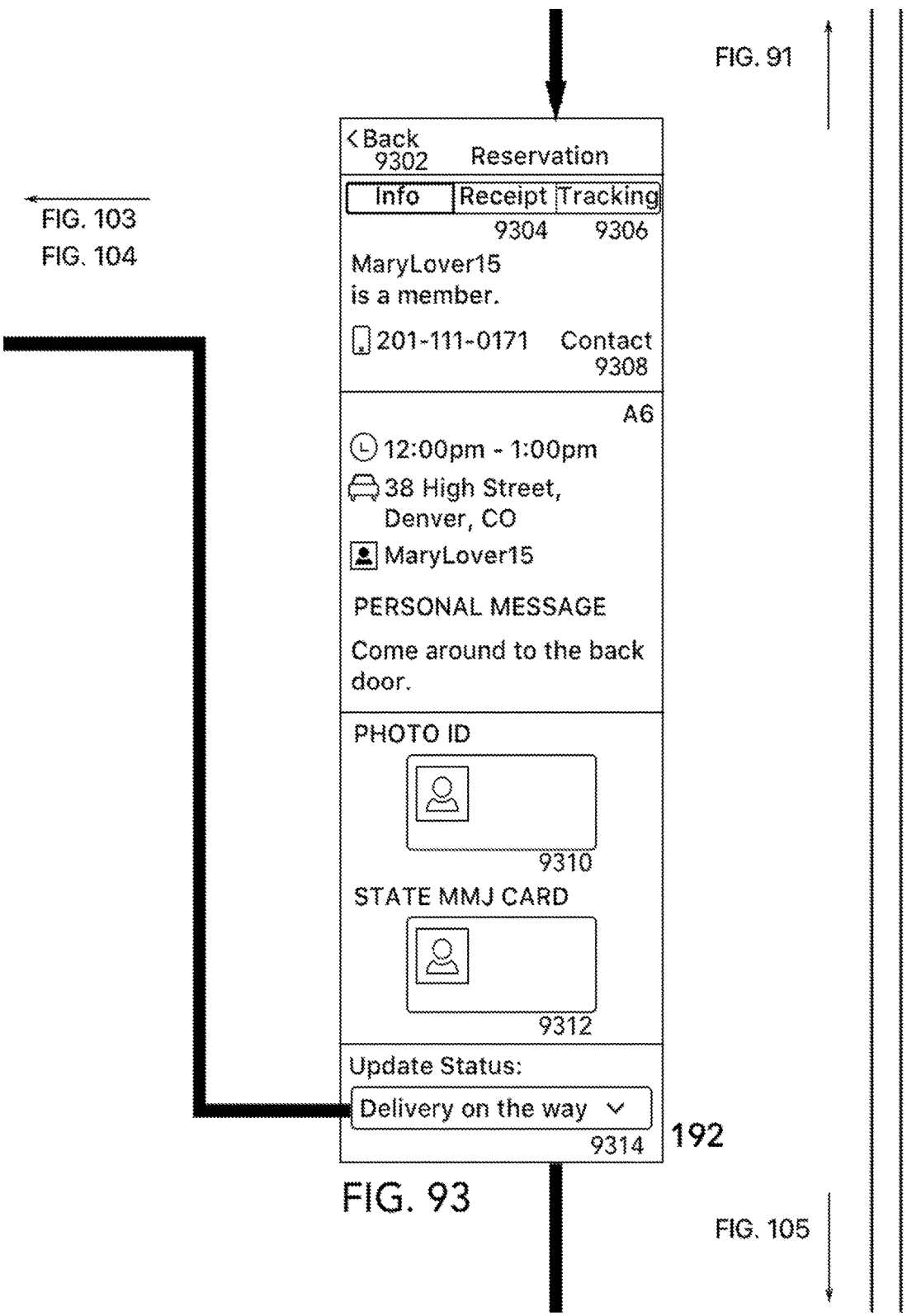
Figure 94:
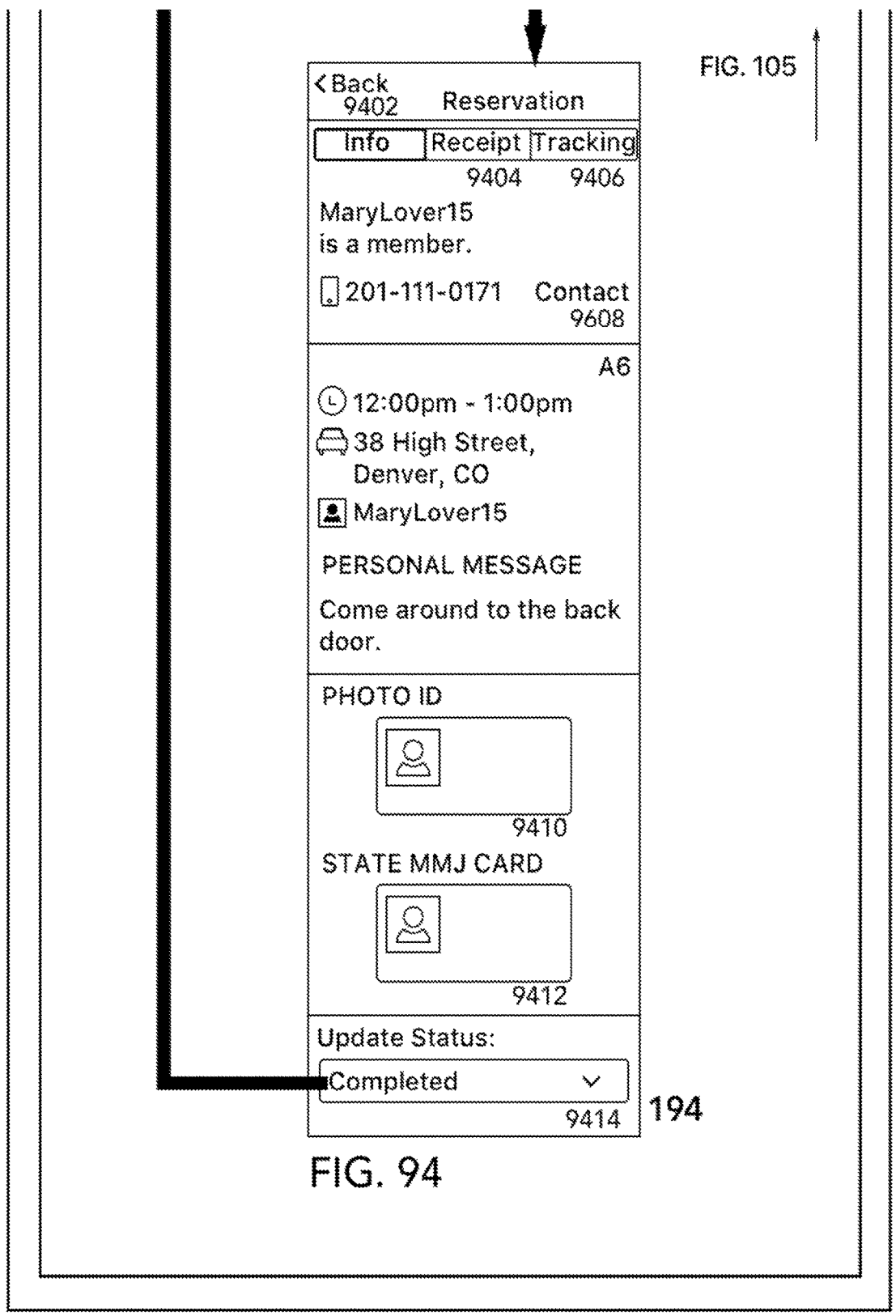
Figure 102:
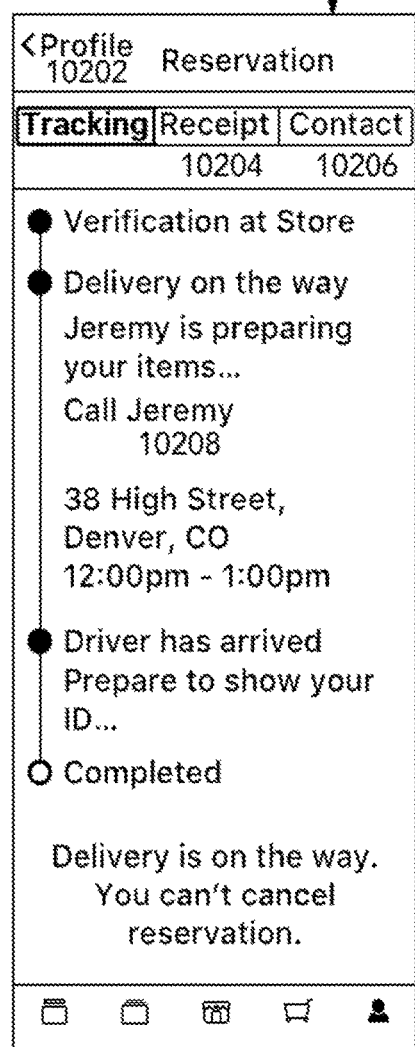
Figure 105:
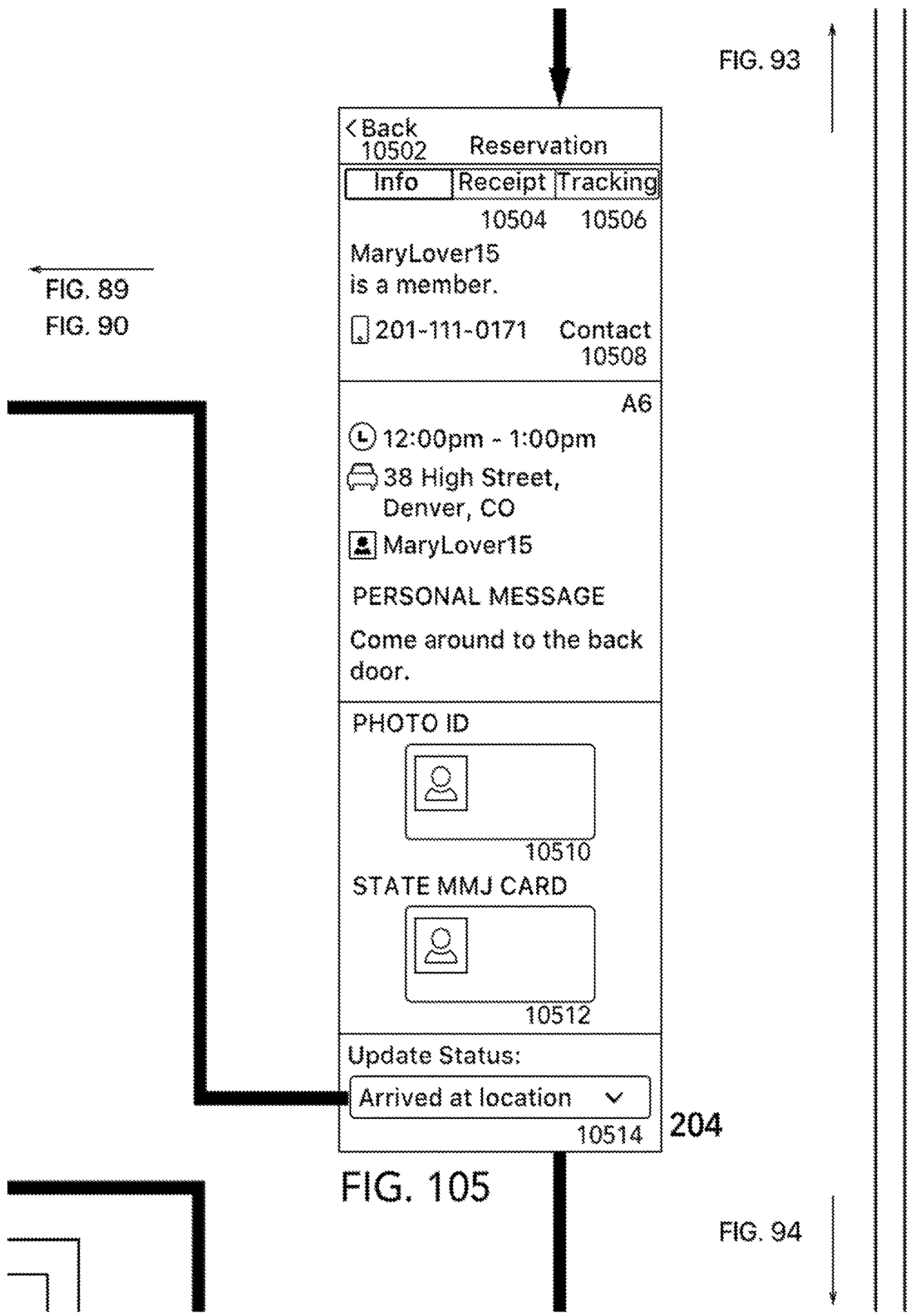

In doing either of these actions, the following events occur simultaneously. Not only does the customer's status change accordingly on page thumbnail 98, which is shown in detail in FIG. 46, but also the flow proceeds to page thumbnail 192, which is fully displayed in FIG. 93. Note that the status of the reservation has changed to reflect the latest user input, as depicted in the window of drop-down menu 9314. If the user taps into drop-down menu 9314, he is again presented with similar options as shown in page thumbnail 200 for delivery reservations, which is detailed in FIG. 103, or page thumbnail 202 for in-store reservations, which is detailed in FIG. 104. Note, for users conducting delivery operations there exists an extra step in the process of updating the reservation status. The user may update the delivery reservation status by engaging button 10306 in FIG. 103, which triggers two simultaneous actions. First, the corresponding customer will receive a notification and update, as depicted in FIG. 102. Second, the user is directed to page thumbnail 204, displayed fully in FIG. 105. Also note that this intermediate step ("Arrived at location") is not necessary for in-store pickup operations, so no user input would be required at this stage in the flow, referenced by FIG. 90 (page thumbnail 186). Proceeding to page thumbnail 204, which is detailed in FIG. 105, the user has all available options as depicted in FIG. 93. Once the user activates button 8906 within FIG. 89 for delivery operations or button 9006 within FIG. 90, the user causes the following events to occur simultaneously. First, this causes the customer's page to reflect that of page thumbnail 100, which will be described later in FIG. 47. The second simultaneous action that occurs is depicted on page thumbnail 194, which is detailed in FIG. 94. Within FIG. 94, note that the status of the reservation has changed to reflect the latest user input, as depicted in the window of drop-down menu 9414. By marking the reservation as complete, the reservation is recorded as complete in the user's platform as well as the corresponding manager's platform, and the flow proceeds to the customer's page thumbnail 100, which is detailed in FIG. 47.

Customer User. Within FIG. 47, the customer user will be prompted to complete a mandatory rating of the overall reservation experience, and must select (from 1 to 5 stars) the appropriate rating by tapping the respective star in scale 4702. She may finalize and record the rating by tapping button 4706, but before doing so, she may also choose to leave an optional message to further describe the reservation experience by tapping directly in text field 4704. Once the user confirms her review via button 4706, the flow proceeds to page thumbnail 102, which is detailed in FIG. 48. It is within FIG. 48 that the review prompt disappears, and the user is able to view the full status of the reservation (including her star rating). Note, the user still has the option to return to her profile via link 4802, view the reservation's receipt via tab 4804, or view the corresponding store's contact details via tab 4806.

This concludes the flow.

Note, though the store owner (or client user) is not directly involved in the store-to-customer flow, from the platform she is able to monitor all ongoing and completed reservations, evaluate store performance and inventory, and remotely onboard new employees onto the platform.

Client User. The Log In procedures for the user as shown in page thumbnails 206 (FIG. 106) and 208 (FIG. 107) replicate those described in manager page thumbnails 106 (FIG. 50) and 104 (FIG. 49) and staff member page thumbnails 158 (FIG. 76) and 160 (FIG. 77). Upon logging in, the user proceeds to page thumbnail 210, which is detailed in FIG. 108. Within FIG. 108, the user can view a list of all stores under her ownership that are integrated onto the Jane platform. The user may search for a specific listed store via text window 10802. The user may also view a certain store's staff by selecting button 10804 and proceeding to thumbnail 214, which is displayed within FIG. 110. Here, the user can view all managers and staff members assigned to a specific store location. By selecting button 11004, the user can edit the individual manager's info: name, email, assigned store, and user role (manager, delivery staff member, in-store staff member, delivery & in-store staff member). The same function applies to editing a staff member's info by selecting button 11006. Note that when a manager logs off the system via button 5104 in FIG. 51 or a staff member via button 7904 in FIG. 79, the user will be able to view their status in real-time. By selecting button 11002 would direct the user back to FIG. 108.

Figure 115:
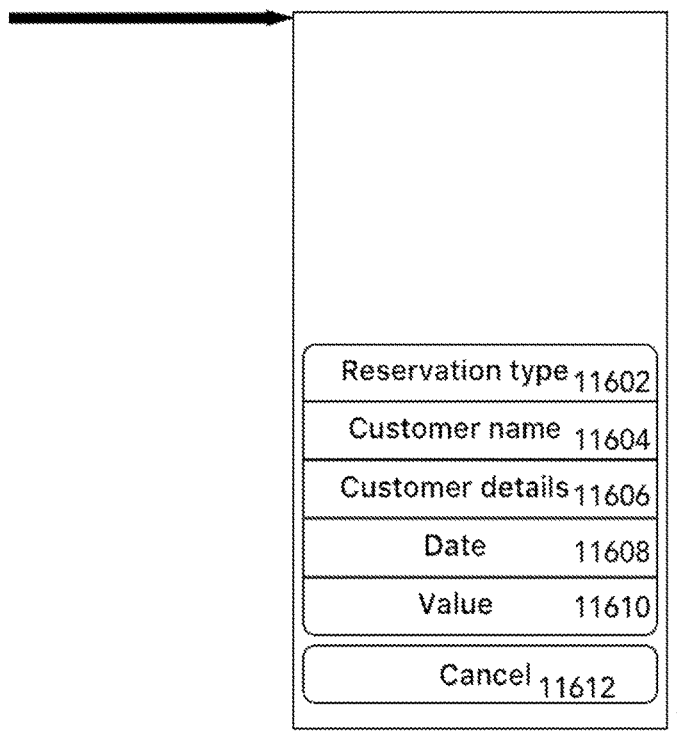
Figure 116:
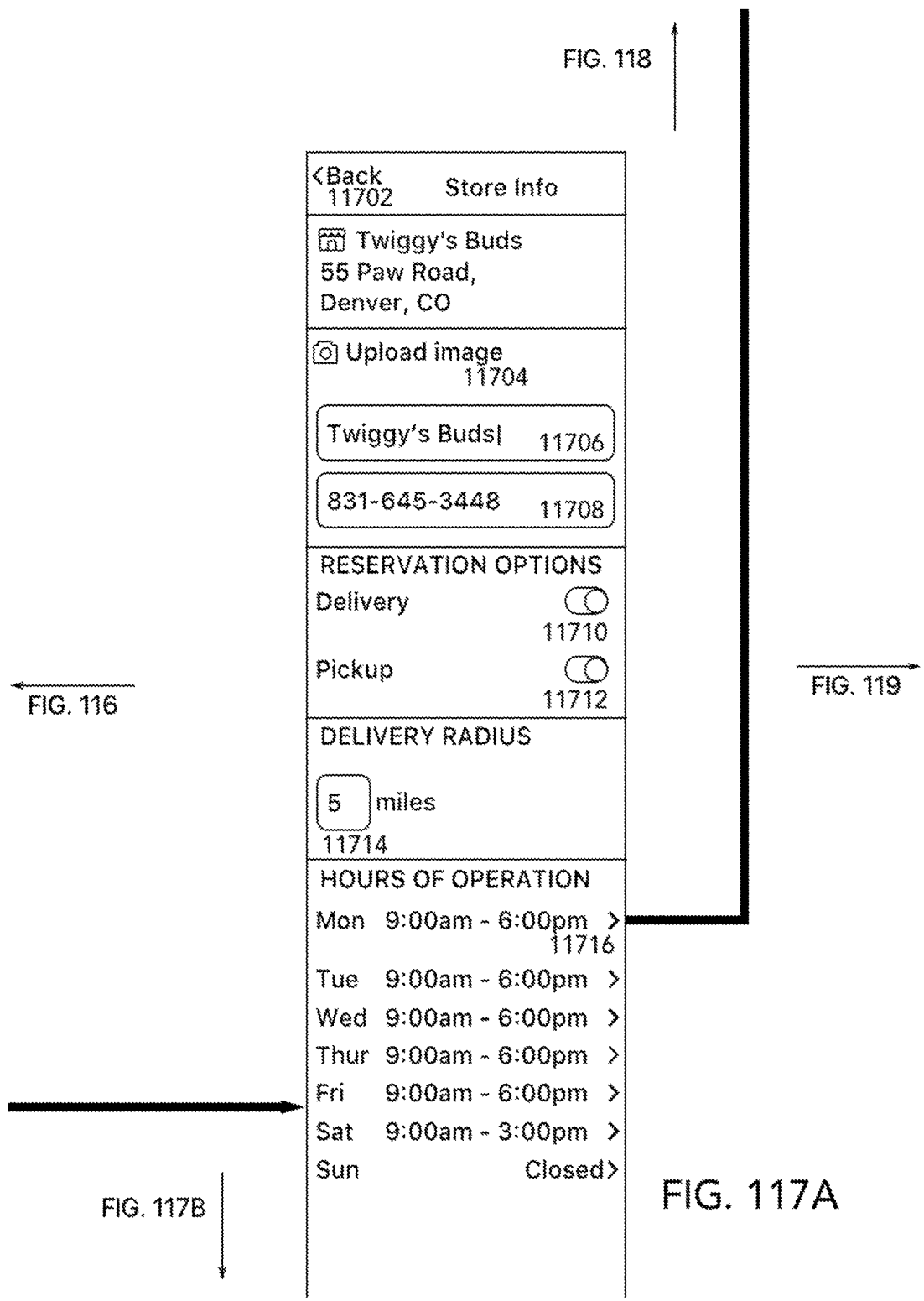

Continuing within FIG. 108, the user can view all completed reservations at a designated store by selecting button 10808 and proceeding to thumbnail 224, as outlined by FIG. 115. Within FIG. 115, the user can proceed back by pressing button 11502, or search for a specific reservation by tapping into search bar 11504. By selecting button 11506, the user can sort this scrollable list by the following parameters detailed in thumbnail 226 (FIG. 116): reservation type (button 11602), customer name (button 11604), customer details (button 11606), date (button 11608), or value (button 11610). The user may also cancel this action by pressing button 11612. Finally within FIG. 115, when tapping into a specific reservation, as shown in button 11508, the user proceeds to the detailed specific reservation screen, as previously described in FIG. 56.

Revisiting FIG. 108, the user may select tab 10810 in the bottom navigation panel. In doing so, the user proceeds to thumbnail 212, which is depicted in FIG. 109. Here, the user may view all manager users and staff member users from all stores that are integrated onto the platform. For manager users and staff member users who are already operating on the platform, the user may select buttons 10904 or 10906 edit respective manager or staff member details, as previously described in by selecting button 11004 of FIG. 110. In order to digitally invite new managers and staff members to join the platform, the user may select button 10902 and input such pre-designated details as the employee's name, email, store, and type (e.g. manager, delivery staff member, in-store staff member, delivery and in-store staff member).

Continuing back within FIG. 108, the user may edit general store information by activating button 10806. In doing so, the user proceeds to thumbnail 228, which is depicted in full within FIG. 117. Here, the user can adjust certain details throughout the store's digital storefront. For instance, by invoking link 11704, the user can upload an image associated with the store's display, which can be viewed by every customer on the Jane marketplace. The user may also adjust the name and phone number associated with the store by typing into respective text boxes 11706 and 11708. Furthermore, the user can adjust the type of store operations. For example, by activating the toggle 11710, the user makes his store available to fulfill delivery operations for customers on the Jane marketplace. Likewise, by activating toggle 11712, the user makes the store available to fulfill in-store pickup operations. Note that by deselecting either of these toggles, the user would make the store unavailable to fulfill certain types of operations (delivery or in-store pickup). Only when toggle 11710 is activated would the user have the ability to type into text box 11714 and set a delivery radius. In doing so, the user would make the store available to fulfill delivery operations only to those Jane marketplace customers who are actively (and in real-time) within the distance parameters. Those customers outside of the store's specific delivery radius would be unable to request a delivery reservation from that store. Further within FIG. 117, the user may select button 11716 to set the store's operational hours on a given day. In doing so, the user would invoke thumbnail 230 to appear, which is shown fully in FIG. 118.

For each day of the week, the user may set the store's hours of operation. First, the user selects either button 11802 or 11804 to adjust either the opening time or closing time, respectively. In doing so, the user may then scroll through a list of times, select a specific time slot 11810 and save it via link 11808. Upon tapping button 11812, the user would have completed the action of setting the opening or closing time for a specific day of the week. Returning to FIG. 117, the user can activate toggle 11718 to communicate to customers how the store includes taxes with its pricing. Also, the user can invoke button 11720 and proceed to thumbnail 232, which is detailed in FIG. 119. Within FIG. 119, the user may revert back via link 11902, or the user can proceed within this page to adjust the store's inventory display settings. In addition to having the ability to search for a specific menu item via search bar 11904, the user may also set which inventory items the store should make available to customers via button 11910. By integrating directly into the store's point-of-sale system, these user inputs will affect the store's digital menu in real-time. Furthermore, the user can select to feature certain menu items by activating button 11908. In doing so, this would showcase respective menu items for customers interacting with the store's digital storefront, also conducted in real-time. Lastly, the user may sort the list by invoking button 11906, and selecting to sort by name alphabetically either by buttons 12002 or 12004 in FIG. 120 (thumbnail 234).

Figure 117:
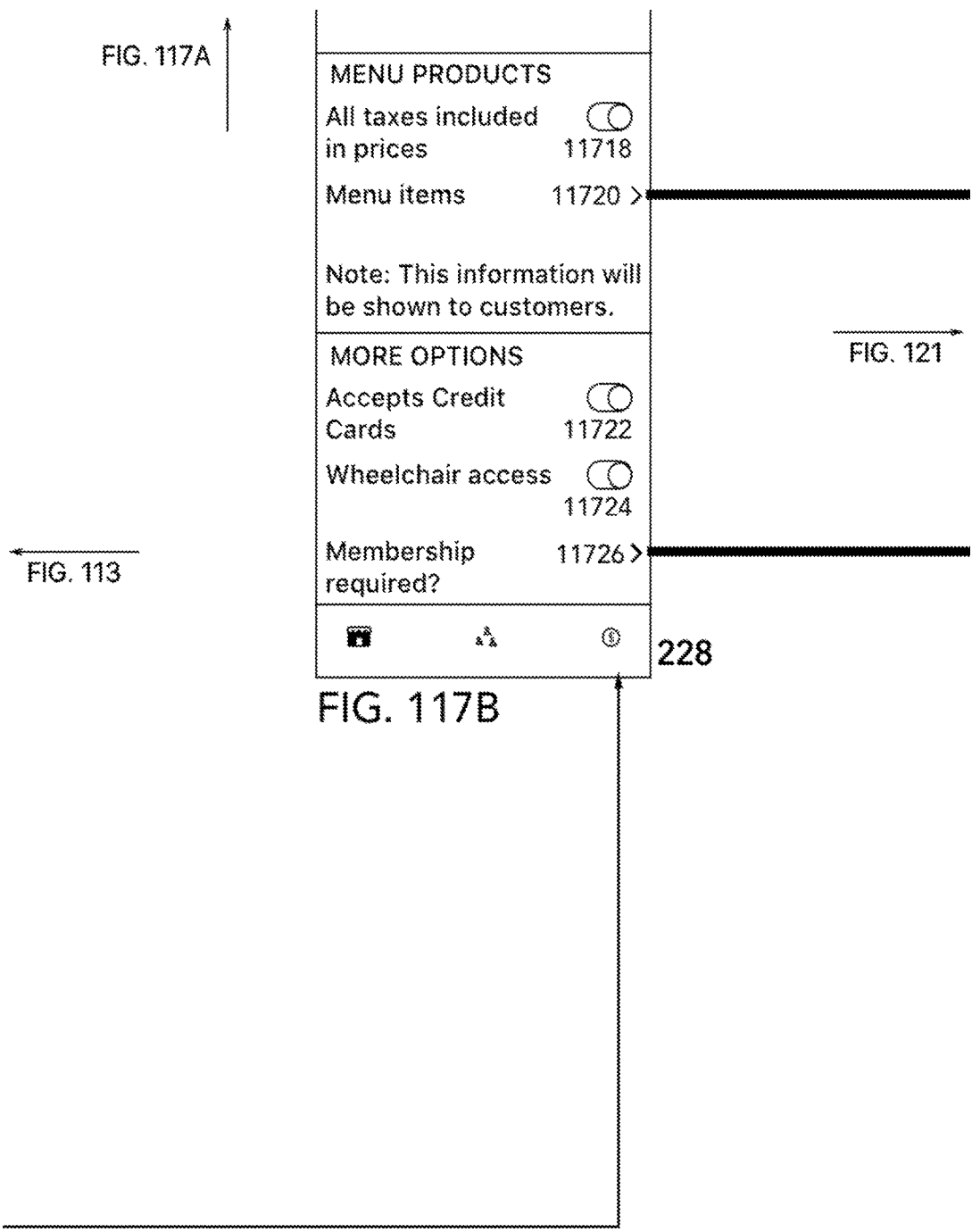
Figure 118:
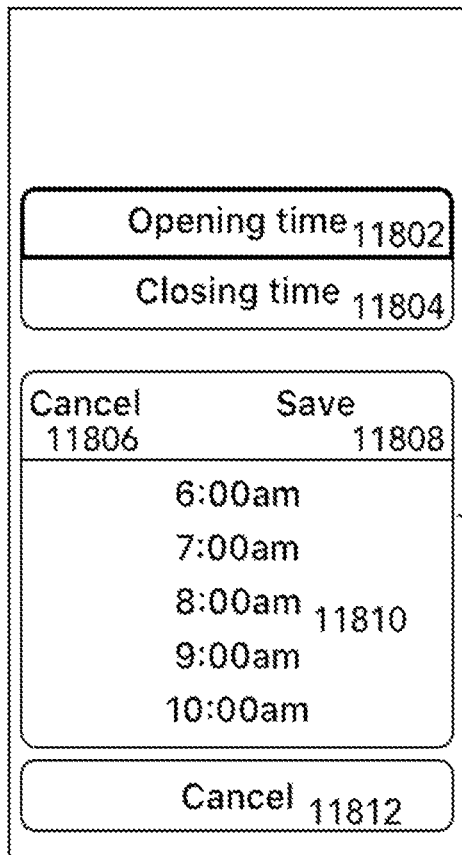
Figure 119:
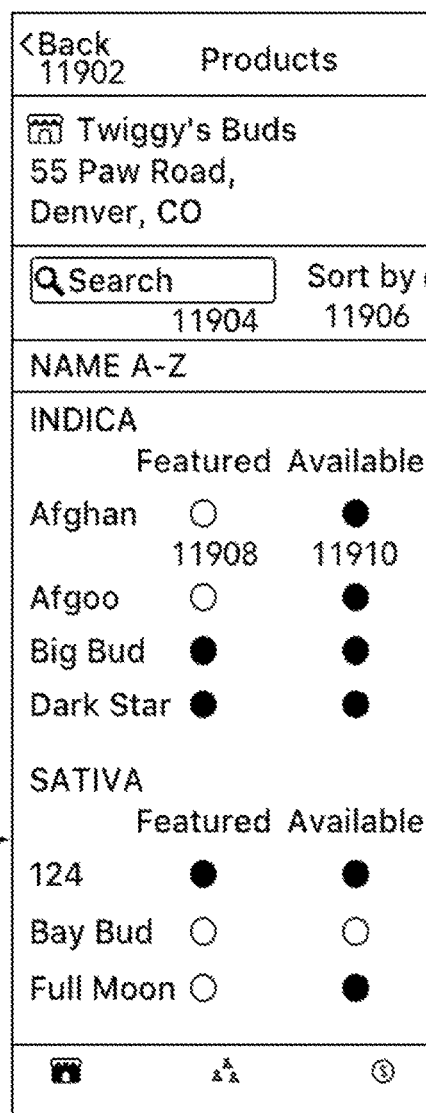
Figure 120:
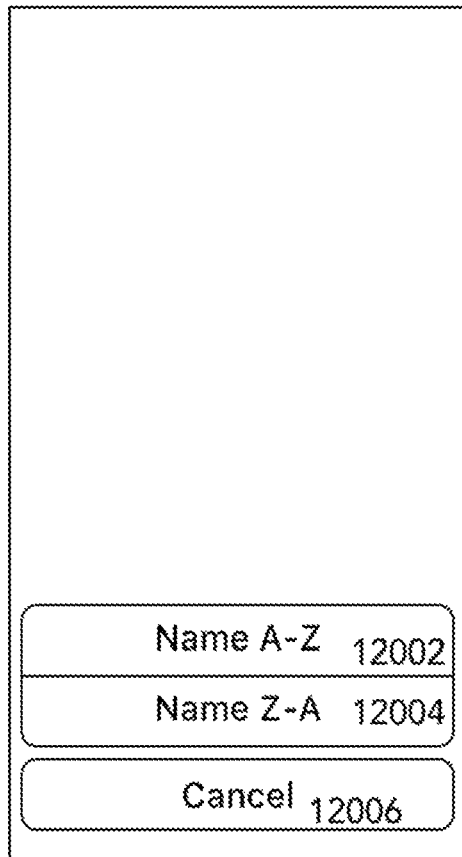
Figure 121:
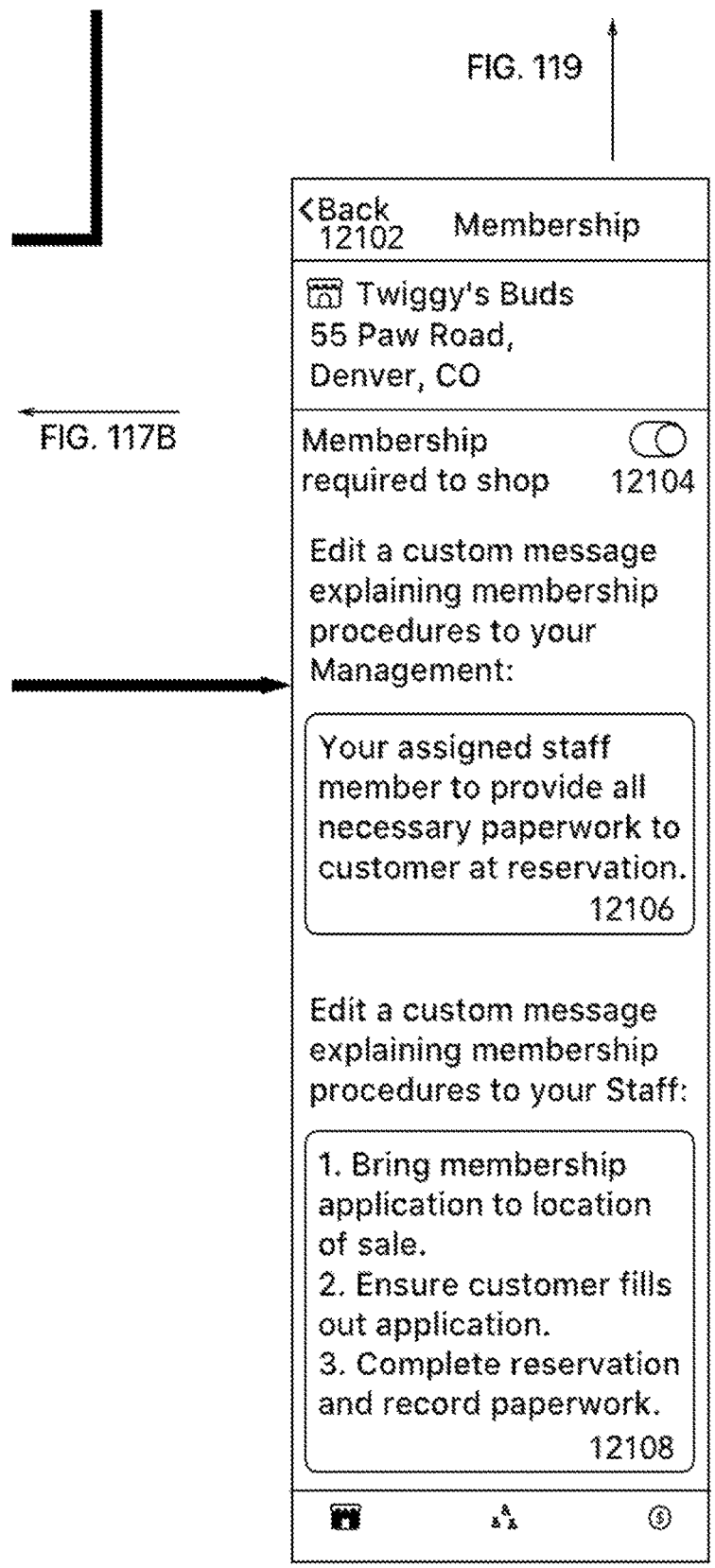

Continuing within FIG. 117, the user may activate toggle 11722 to display to marketplace customers that the store does accept certain types of payments (e.g. credit cards). Also, the user can switch on the toggle 11724 to display to marketplace customers that the store does provide certain services (e.g. wheelchair access). Where some stores may require additional requirements for its customers (e.g. signing membership paperwork), the user can select button 11726 and move to thumbnail 236, which is depicted within FIG. 121. Here, the user may revert back by selecting button 12102. Also within FIG. 121, by activating toggle 12104, the user can activate any additional requirements meant for its customers (e.g. requiring customers to complete required paperwork), and in doing so, the user will enable the input within text field 12106. Here, the user is able to compose a custom message to the store's management (see FIG. 64 for details) with reference to the store's additional customer requirements, and how to best handle such requirements. In addition, the user may also input text into field 12108 to compose a custom message to the store's staff member (see FIG. 66 for details) around how to best accommodate any additional customer requirements, as well. With reference back to FIG. 117, note that any information the user inputs will be updated to the store's customer-facing digital storefront in real-time. For example, by adjusting the store name in field 11700, the user will have affected what the customer sees at the top of FIG. 26. Similarly, if the user adjusts the toggle 11724 to accommodate wheelchair access, the customer will see this displayed by selecting "Information" button 2614. Finally within FIG. 117, the user may select button 11702 and revert back to FIG. 108.

Figure 111:
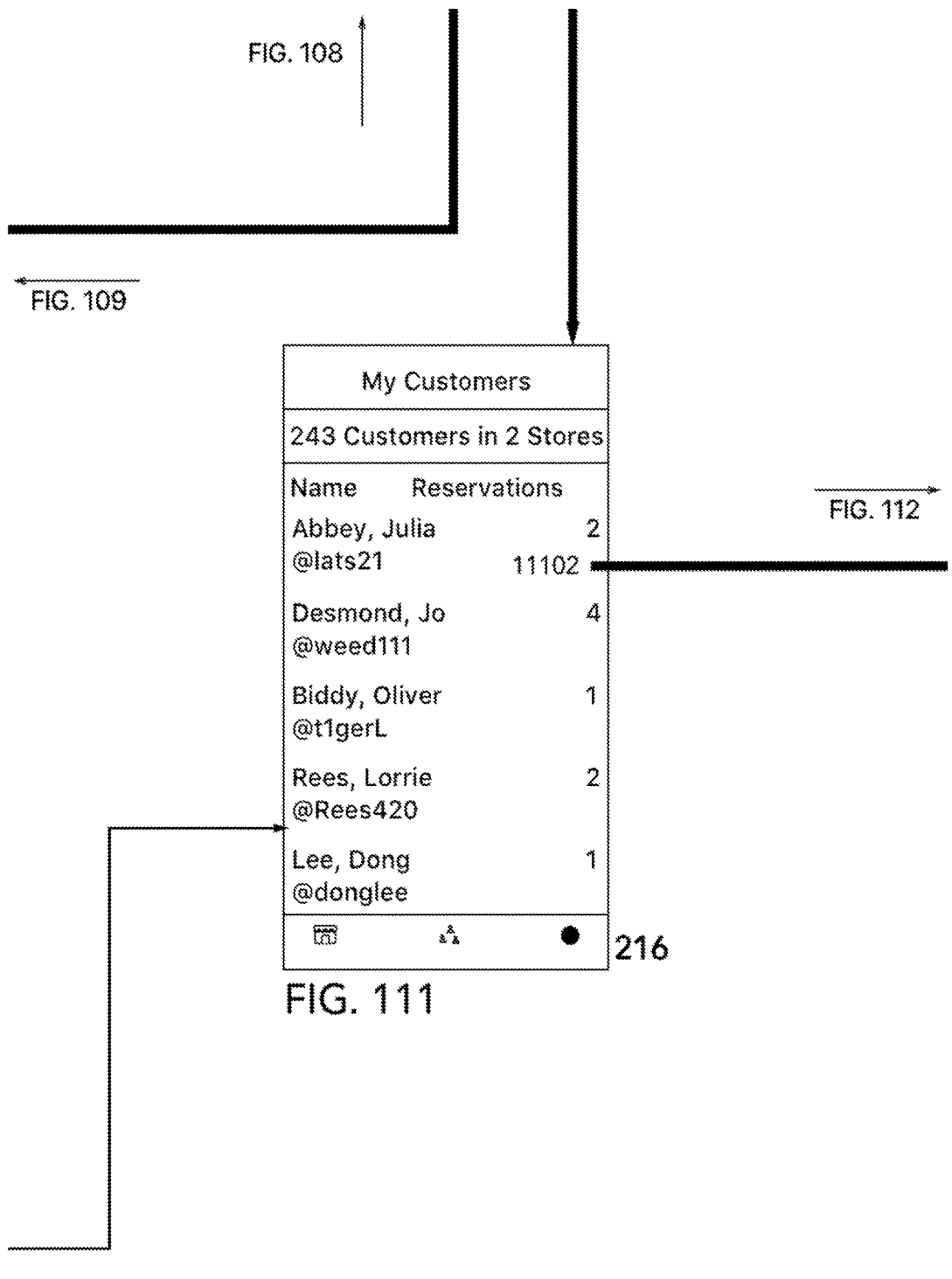
Figure 112:
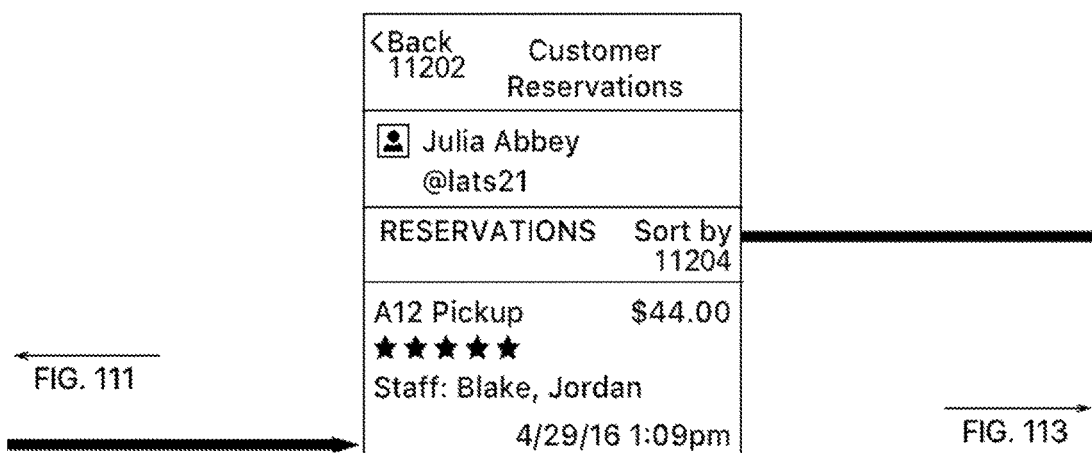
Figure 113:
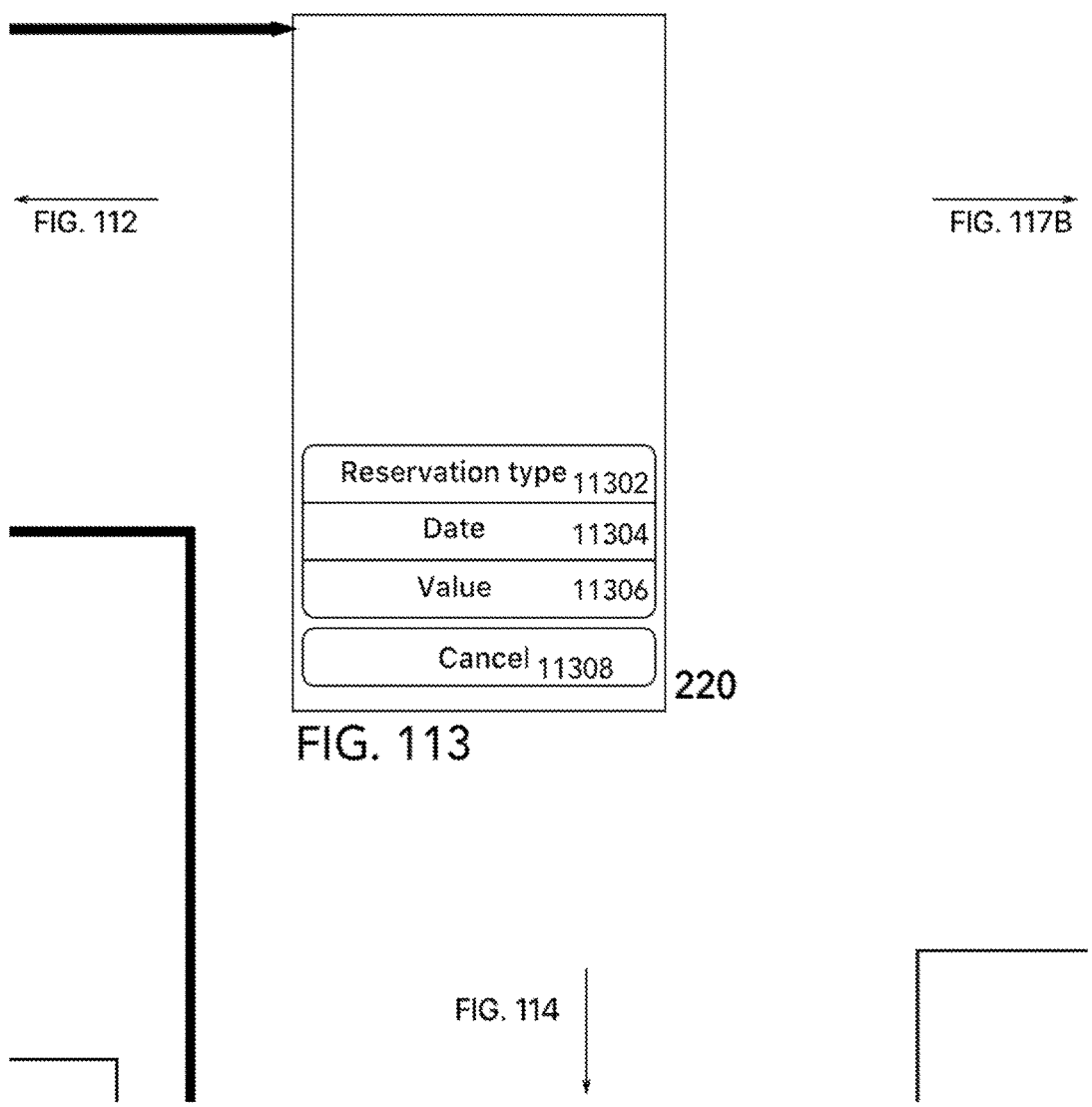
Figure 114:
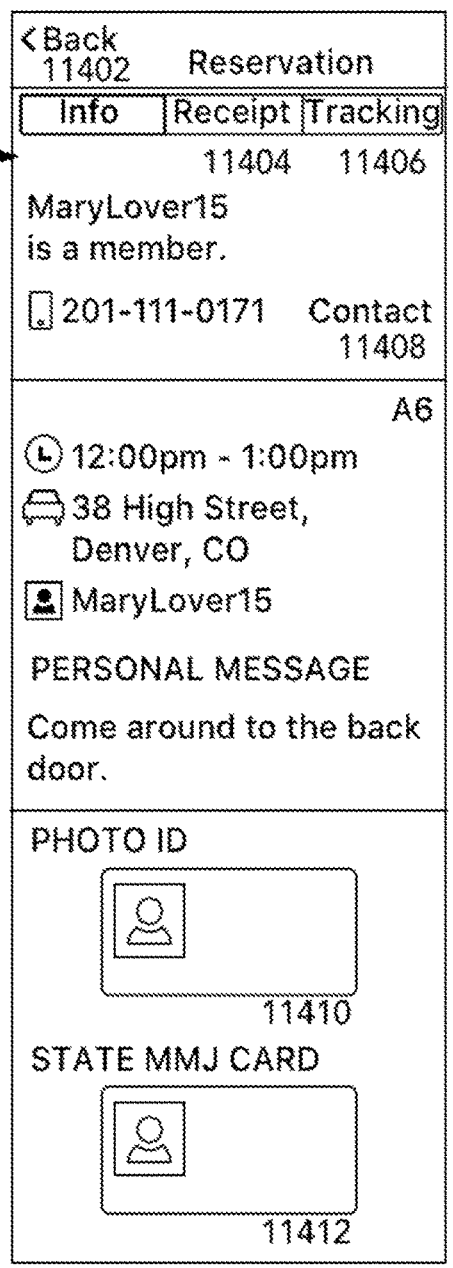

Continuing within FIG. 108, the user may select button 10812 in the bottom navigation panel, moving to thumbnail 216, which is portrayed in FIG. 111. Here, the user is able to view a historical listing of all customers who have ever made a successful (completed) reservation at the store(s) via the platform. By selecting a specific customer button 11102, the user proceeds to thumbnail 218, which is detailed in FIG. 112. Within FIG. 112, the user can view a historical list of all completed reservations fulfilled by the store for that specific customer via the platform. The user may revert back by selecting button 11202, or may sort the list by invoking link 11204. By invoking link 11204, the user can sort the list by such inputs as shown in thumbnail 220 and described in full in FIG. 113. Within FIG. 113, the user may sort by various attributes such as reservation type (button 11302), date of completion (11304, or value (button 11306). Lastly within FIG. 113, the user may cancel the action by selecting button 11308. With reference back to FIG. 112, the user may select an individual reservation button 11206 and move to thumbnail 222, which is displayed in FIG. 114. Within FIG. 114, the user can view an individual reservation page of any completed reservation on the platform. From here, the user can revert back by invoking link 11402, view the receipt of items by selecting tab 11404, or view the timestamped tracking of the reservation flow by selecting tab 11406. Also, the user may contact the customer by invoking link 11408 or select a detailed view of the various customer-uploaded images (e.g. ID card) by tapping thumbnail 11410 or 11412.

Figure 47:
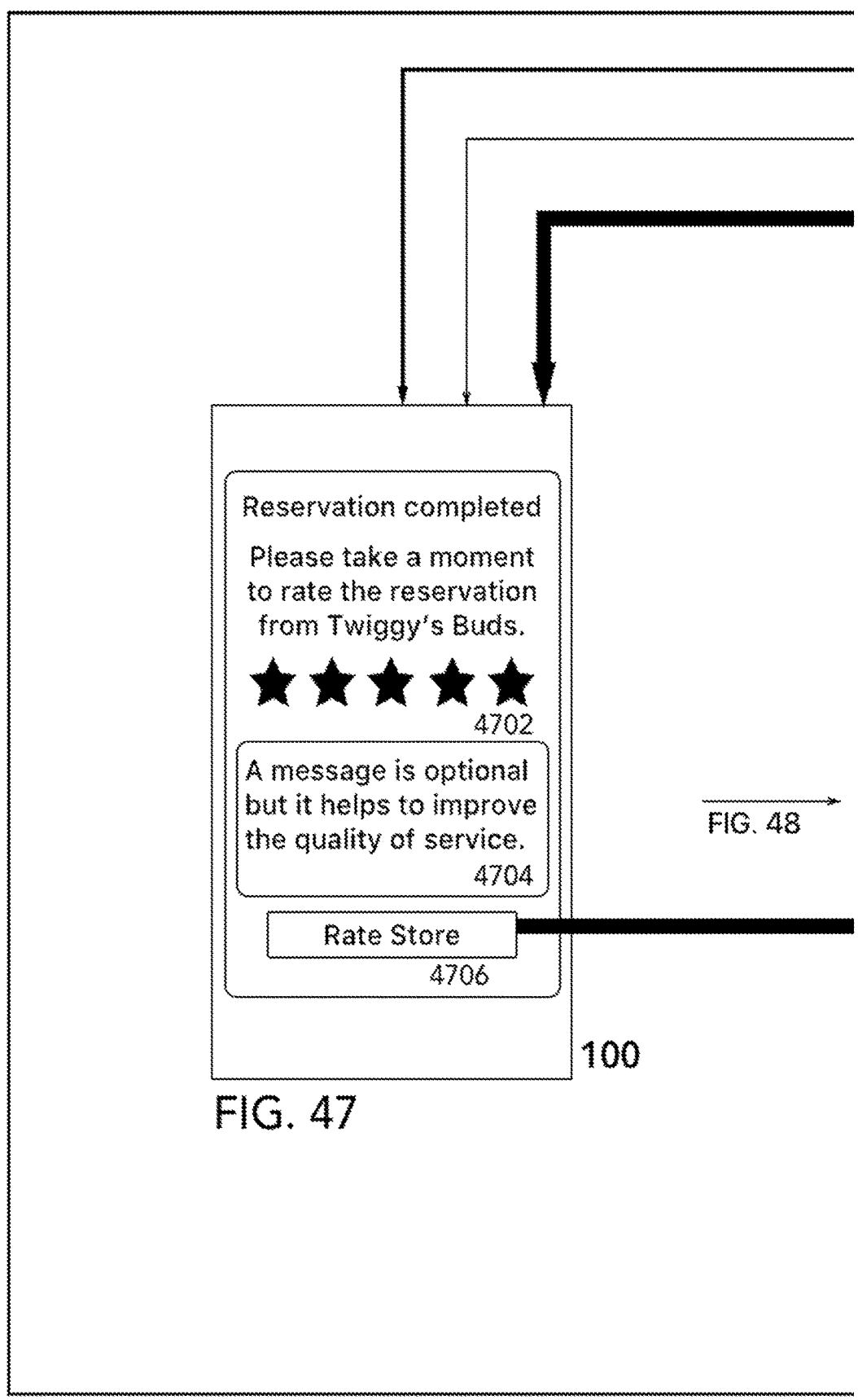
Figure 48:

Finally within FIG. 111, note that once the customer has rated the respective store in FIG. 47, not only does it register in real-time as shown on the customer tracking page in FIG. 48, but also it registers in real-time for the client user in FIG. 111 under the respective customer's name.

Other Applications

This technology is not limited to the cannabis industry. There exist many industries in which respective retail channels would also benefit from the same capability as applied to the cannabis industry. The platform could integrate, for example, into a retail liquor store's point-of-sale system and display their inventory to the customer's mobile device in real-time. The customer could then search, compare, and reserve items from an aggregated network of those liquor stores, and request those items to be delivered at an approved location or prepared for in-store pickup.

Once the reservation has been requested, the platform would notify the manager of the liquor store via his mobile device, and provide the capability for him to verify the customer's identification and assign the respective reservation to the liquor store's staff member for completion. All the while—just as the platform would allow in the cannabis industry, the staff member (delivery or in-store) would not only receive an assignment notification from the platform to his mobile device, but also he would have the capability to send status updates to the customer via the platform's notification system.

In addition to the liquor store, the system also could be applied to grocery stores, where customers could reserve various grocery items for delivery or in-store pickup, depending upon the grocery store's operational capabilities. Moreover, the system can be integrated into butcher shops, fish markets, or produce markets by attaching the platform directly into the respective point-of-sale systems. The system could also be integrated into retail pharmaceutical stores, where health and wellness products could be reserved by the customer via his mobile device and prepared by the retail store, itself. The platform could also support restaurants by displaying their menus in real-time via point-of-sale integration and enabling their staff to approve, assign, and complete the reservation via delivery or take-out from the restaurant location itself. Additionally, the platform could integrate into the flower industry, by integrating directly into the flower shop's point-of-sale system. On the platform, the customer could search, compare, and reserve items, while the shop's manager and staff member could track and fulfill the reservation from their store's platform accessed on their personal mobile devices. Even retail clothing stores could utilize the system. Customers could request certain clothing items from a specific retail store by viewing their inventory on the platform, the manager could validate the reservation and assign it to her staff member via the platform, and the staff member could update the status of that reservation from her mobile device, which would in turn notify the customer to pick-up in store or at an alternative location.

Furthermore, the numerous other industries to which this system could be in physical retail locations include (but is not limited to): record stores, sporting goods stores, book stores, general stores, hardware stores, pet stores, toy stores, automotive stores, home improvement stores, and discount and wholesale retailers.

Within the cannabis industry, there also exist many ways in which the system could be implemented differently than as previously described. For instance, instead of integrating into the retail store's point-of-sale systems, the system could integrate directly into the supplier's inventory system. Then, the customer could search, compare, and reserve items from the supplier directly instead of the specific retail location. Suppliers could be the cultivators of the cannabis flower, consumer packaged goods companies, or even large distributers within the cannabis industry. The manager (or equivalent) of the supplier could then validate the reservation request from her phone, and then assign it to be fulfilled by one of her staff members for delivery, shipment, or on-site pickup. Alternatively, the platform itself could provide the distribution services. For example, the customer could log on to the platform on his mobile device and search, compare and reserve a quantity of cannabis flower from a specific cultivator (supplier) to be delivered to the customer's authorized location. The platform itself would provide the distribution of the product (via third-party or organic to the platform itself) from the cultivator's location directly to the customer.

The system could also be implemented in the cannabis industry by enabling the store managers to assign reservations to a delivery service provided by a third-party or by the platform itself. For example, once the customer reserves an item from a store, the store manager would receive a notice via the platform and then assign that reservation to a member of a separate delivery service (instead of assigning the reservation to her staff member of the respective store). The member of the delivery service would then receive an assignment notification on his mobile device through the platform from the store manager's mobile device. Instead of the store's staff member fulfilling the reservation, the responsibility to deliver the product to the customer would belong to the member of the delivery service. He would have the capability to update the status of the reservation and communicate the information to the customer via the platform on his mobile device. Lastly, the customer could even add items from multiple stores under a single reservation request, with the member delivery service responsible for collecting those items from the multiple stores and delivering directly to the customer.

Note, the member of the delivery service could pre-stock the inventory of items from the stores he serves in his delivery vehicle, or he could pick up specific items from specific stores as customers reserve those items. Also note, the system would still integrate and showcase menu items directly from the store's point-of-sale systems.

Additionally, the system could automate the assignment of incoming reservations to available staff members. For example, for an incoming reservation request from a customer, the system could validate the reservation information and automatically assign reservations directly to staff members based on such parameters as staff member availability, location, and current reservations assigned.

Alternatively, the system could be implemented in the cannabis industry by the platform including its own point-of-sale system to be inside the retail store. Under this scenario, instead of integrating into the point-of-sale system, the platform would essentially serve as an extension of that point-of-sale system, as they would share the same access to data. For example, the store would operate on the platform's organic point-of-sale system instead of a third party's system. The customer, manager, and staff member would still operate within the platform via their respective mobile devices in the same way as described in the original system. The platform, however, would display menu items from its own point-of-sale system (and shared database) that is located inside the retail store instead of integrating into third-party point-of-systems.

In some applications of this system within the cannabis industry the store could itself manually upload menu items instead of the platform integrating into the point-of-sale system, and thus, automatically uploading menu items on the store's behalf. Under this scenario, the stores could also curate the content it manually uploads onto the platform to share with customers. For example, the store could potentially upload photos, custom descriptions, or even discounts on the items manually uploaded onto the platform. Note that under this system, all user roles (e.g. customer, manager, staff member) and functionality would not need to change from those described earlier.

Furthermore, this system could link together additional software platforms within the process. For example, the platform could link a customer from software that is native to a respective device (e.g. an iOS-specific app, an Android-specific app, etc.) to software that can be accessed from any device (e.g. a web app). Moreover, the individual store could display their menu items on their store's website that is linked and "powered by" Jane. Thus, when a customer selects a menu item from the store's website, the process then links the customer to the platform via native application software or web app to continue and complete the process.

Additionally, the system could be implemented in the cannabis industry by enabling notifications from the platform that are not push notifications. For instance, when the manager assigns a reservation to a staff member of the respective store, the platform would send a notification from the manager to his staff member via email and/or text message instead of a push notification (as originally depicted in the original system). Or under a similar circumstance, if a customer were to request a reservation, the platform would then send an email and/or text message to the store manager's device. Within that email or text message, a link could be applied that would direct the manager to the specific reservation request page within the platform, or the requested reservation's complete information (e.g. time, location cart items, documents, etc.) could be included in the notification message itself.

The benefits of the system extend to multiple stakeholders. No longer are customers subject to misinformation about the products available to them. By integrating directly into the store's point-of-sale system, the customer has access to menu items that are available to them in real-time. Furthermore, customers are no longer as vulnerable to "ghost reviews." That is, the reviews that help inform customers on the platform are obtained from registered users who have actually reserved real products from that specific store. In doing so, the platform prevents any store from inflating its ratings, and prohibits users from reviewing stores from which they have never completed a reservation. Real menus. Real reviews. Real information. Additionally, by aggregating stores onto a single platform, we provide customers with the power of choice. No longer are the customers limited to a single store's inventory and service, whether it is due to proximity, membership requirements, or even limited awareness. Instead of limiting the customer to the inventory and services from a single store, the platform allows customers to select a product first, and then decide the best stores that carry the product from an aggregated network of multiple stores.

The platform also enables stores to compete in a fair marketplace and encourages the best stores with the best products and services to be rewarded. Other platforms elevate the profile of a store based purely on how much money a store pays that platform. Instead, this platform empowers the store to compete on what matters—the quality of its products and the services it provides. The platform creates a fair marketplace rooted in quality of product and service, and vetted by real customers. In addition, stores are able to optimize volatile customer demand. By allowing customers to reserve items for in-store pickup, the stores can prepare the items in advance, which will reduce lines, optimize staff capacity, and ultimately lead to more satisfied customers.

Moreover, by enabling stores to update and notify customers on the status of their reservations, the platform provides the visibility required to prevent any potential miscommunication to occur (and any potential loss of sale to take place). Store managers and staff members alike are also empowered with the ability to confirm the customer's identification along with any other documents that may be required prior to accepting the reservation. This provides stores with the added security of vetting their customers, enables them to have full control over whom they choose to serve, and implements measures to ensure reservations are in compliance with the law. In addition, the platform brings accountability to store operations. Not only will store managers have the ability to monitor the entire reservation process as completed by their respective staff members, but also customers will know exactly who has prepared their reservation, and may contact them directly as required.

The platform also collects valuable data. Stores will have the ability to measure staff efficiency, inventory trends, and customer segmentation information. Also, the platform can link a specific customer to a specific store, and provide that store with her location, purchase history, time of reservation request, search history, and reviews. This data will help inform suppliers, stores, and even local governments about critical consumer insights that were previously unavailable to the industry. With respect to local governments, the platform will help remove the remaining "black markets" that exists in municipalities that do not allow retail cannabis locations. For example, for customers who reside in a municipality where retail stores are prohibited, the platform would provide access to a product legally instead of forcing customers to assume unnecessary risks to gain access to the product via "black markets."

Therefore, among the concepts that can be implemented and benefits that can be achieved by the technology that we have described are the following:

A. The system brings powerful selection capabilities to the industry in which it is applied, empowering customers to browse aggregated product items in real-time, to compare stores on an accurate and fair review system, and to customize reservations by time, location, type, or other services.

B. The system brings simplicity to the industry in which it is applied by supporting store management to optimize incoming demand across staff, to seamlessly integrate their on-site workstations into a mobile system available to an audience of active customers, and to instantly verify new and current customers without the unnecessary lines, forms, emails, or phone calls.

C. The system brings safety to the industry in which it is applied by enabling store management to ensure all components of the reservation are within compliance, staff members to verify customer information as required, and customers to communicate with the store management and specific staff members as necessary.

What is claimed:

1. A central server system to interact with two or more point-of-sale systems in two or more respective different physical retail stores and with two or more mobile devices of respective different customers and staff of the respective different physical retail stores, to coordinate the operations of and to enable a server of the central server system, a database of the central server system, the point-of-sale systems, and the mobile devices together to
   (a) present, in real-time and electronically through the mobile devices, steps of a shopping experience for customers for physical products in inventory at the respective different physical retail stores, the steps of the shopping experience including (i) the customers searching, comparing, and reserving physical products in inventories of the respective different physical retail stores, and (ii) the staff handling reservations of the customers for physical products in inventories of the respective different physical retail stores, and
   (b) to coordinate opportunities for immediate electronic communication between customers and staff physically present in the respective different physical retail stores in real time as the customers search, compare, and reserve physical products in inventories at the respective different physical retail stores, or as the staff handles reservations of the customers for physical products in inventories at the respective different physical retail stores,
   the central server system comprising:
   the server including a processor,
   a communication device coupled to a communication network,
   a database to be accessed by the processor and configured to receive from the point-of-sale systems, to store, and to update data about changing available inventories of the physical products at the respective different physical retail stores, the data being updated as the customers reserve physical products from inventories at the respective different physical retail stores, and
   storage containing instructions executable by the processor to coordinate the operations of the server, the database, the point-of-sale systems, and the mobile devices to present in real-time the steps of the shopping experience for the customers, the executable instructions implementing:
   an application programming interface through which the data about changing available inventories of the physical products at the respective different physical retail stores passes between the point-of-sale systems and the database and between the mobile devices of the customers and staff and the database,
   a page server to serve pages to the mobile devices of customers to present the shopping experience for customers of the physical retail stores and to serve pages to the mobile devices of staff to enable the staff to participate in the presentation of the shopping experience in real time while the customers are searching, comparing, and reserving physical products in inventory, the serving of pages enabling
      (a) the customers to view information about physical products subject to reservations and to invoke immediate communication with the physical retail store handling the physical products subject to the reservations of the customers, and
      (b) the staff physically present in the physical retail stores and responsible for handling the physical products subject to the reservations of the customers to view reservations of physical products subject to the reservations and invoke immediate communication with the customers,
   an inventory manager to maintain the data in the database about the changing available inventories of the physical products at the respective different physical retail stores, and
   a reservation platform to manage reservations for physical products received from customers and to be fulfilled at the different physical retail stores.

2. The system of claim 1 in which the database, the store platform, the inventory manager, and the reservation platform cooperate to maintain accurate real-time information about physical products in inventory at the respective different physical retail stores.

3. The system of claim 1 in which the database, the store platform, the inventory manager, and the reservation platform cooperate to maintain accurate real-time information about reservations for physical products in inventory at the respective different physical retail stores.

4. The system of claim 1 in which the server comprises a cloud server.

5. The system of claim 1 in which the database is coupled to the application programming interface.

6. The system of claim 1 in which the server sends catalog data through the communication network to the mobile devices of the customers, the catalog data comprising displayable information representing inventories of the physical available at the respective different physical retail stores.

7. The system of claim 1 in which the server sends control data through the communication network to point-of-sale systems at the respective different physical retail stores that enables the point-of-sale systems at the respective different physical retail stores to control the servicing of reservations.

8. The system of claim 1 in which the physical retail stores comprise competitive physical retail stores.

9. The system of claim 1 in which the server sends management data through the communication network to the point-of-sale systems at the respective different physical retail stores that enables the point-of-sale systems at the physical retail stores to manage allocation of reservations among staff of the physical retail stores.

\* \* \* \* \*